United States Patent
Hoshida et al.

(10) Patent No.: US 7,751,721 B2
(45) Date of Patent: Jul. 6, 2010

(54) OPTICAL DQPSK RECEIVER APPARATUS

(75) Inventors: Takeshi Hoshida, Kawasaki (JP); Kazuo Hironishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 884 days.

(21) Appl. No.: 11/392,754

(22) Filed: Mar. 30, 2006

(65) Prior Publication Data
US 2007/0127933 A1    Jun. 7, 2007

(30) Foreign Application Priority Data
Dec. 6, 2005   (JP) .............................. 2005-352671

(51) Int. Cl.
*H04B 10/00*   (2006.01)
(52) U.S. Cl. .................. 398/161; 398/188; 398/214
(58) Field of Classification Search ................. 398/191, 398/202, 207, 41, 161, 188, 205, 214
See application file for complete search history.

(56) References Cited

U.S. PATENT DOCUMENTS

| | | | |
|---|---|---|---|
| 4,868,896 | A | 9/1989 | Pietzsch |
| 7,272,327 | B2 * | 9/2007 | Epworth et al. ............. 398/212 |
| 2004/0081470 | A1 * | 4/2004 | Griffin ........................ 398/188 |
| 2007/0047966 | A1 * | 3/2007 | Hironishi et al. ........... 398/161 |
| 2007/0047972 | A1 * | 3/2007 | Ikeuchi et al. ............... 398/207 |

FOREIGN PATENT DOCUMENTS

| | | |
|---|---|---|
| DE | 3722936 A1 | 1/1989 |
| JP | A-11-163793 | 6/1999 |
| JP | 2004-516743 | 6/2004 |
| WO | WO02/51041 A2 | 6/2002 |
| WO | WO 03/063515 | 7/2003 |
| WO | WO03/063515 A2 | 7/2003 |

OTHER PUBLICATIONS

European Search Report, dated Feb. 5, 2007, Application No. 06006379.9-2415.

* cited by examiner

*Primary Examiner*—Dzung D Tran
(74) *Attorney, Agent, or Firm*—Staas & Halsey LLP

(57) ABSTRACT

A first interferometer comprises a first delay element and a first phase shift element, and a second interferometer comprises a second delay element and a second phase shift element. The amounts of phase shift in the first and second phase shift element are zero and π/2, respectively. A first photo detector comprises first and second photodiodes connected in parallel, and a second photo detector comprises third and fourth photodiodes connected in series. The first photodiode is provided with a first optical output of the first interferometer, the second photodiode is provided with a first optical output of the second interferometer, the third photodiode is provided with a second optical output of the first interferometer, and the fourth photodiode is provided with a second optical output of the second interferometer. A signal process circuit recovers transmitted data based on output signals of the first and second photo detectors.

14 Claims, 46 Drawing Sheets

| INPUT PHASE DIFFERENCE | : | 0 | $\pi/2$ | $\pi$ | $3\pi/2$ | |
|---|---|---|---|---|---|---|
| PHASE DIFFERENCE AFTER ZERO SHIFT ($\Delta\phi a$) | : | $\pi/4$ | $3\pi/4$ | $5\pi/4$ | $7\pi/4$ | |
| PHASE DIFFERENCE AFTER $-\pi/4$ SHIFT ($\Delta\phi b$) | : | $7\pi/4$ | $\pi/4$ | $3\pi/4$ | $5\pi/4$ | |
| OPTICAL CURRENT OF PD 1003a $\propto \sin^2(\Delta\phi a/2)$ | : | 0.15 | 0.85 | 0.85 | 0.15 | |
| OPTICAL CURRENT OF PD 1003b $\propto \cos^2(\Delta\phi a/2)$ | : | 0.85 | 0.15 | 0.15 | 0.85 | |
| OPTICAL CURRENT OF PD 1004a $\propto \sin^2(\Delta\phi b/2)$ | : | 0.15 | 0.15 | 0.85 | 0.85 | |
| OPTICAL CURRENT OF PD 1004b $\propto \cos^2(\Delta\phi b/2)$ | : | 0.85 | 0.85 | 0.15 | 0.15 | |
| (1) (CURRENT OF PD 1003b) − (CURRENT OF PD 1003a) | : | 0.7(1) | −0.7(0) | −0.7(0) | 0.7(1) | → OUTPUT LEVEL OF OPTICAL RECEIVER CIRCUIT 1003 (DECISION RESULT) |
| (2) (CURRENT OF PD 1004b) − (CURRENT OF PD 1004a) | : | 0.7(1) | 0.7(1) | −0.7(0) | −0.7(0) | → OUTPUT LEVEL OF OPTICAL RECEIVER CIRCUIT 1004 (DECISION RESULT) |

FIG. 2

| | | | | |
|---|---|---|---|---|
| INPUT PHASE DIFFERENCE | : | 0 | π/2 | π | 3π/2 |
| PHASE DIFFERENCE AFTER ZERO SHIFT (Δφa) | : | 0 | π/2 | π | 3π/2 |
| PHASE DIFFERENCE AFTER π/2 SHIFT (Δφb) | : | π/2 | π | 3π/2 | 0 |
| OPTICAL CURRENT OF PD41 ∝ Sin²(Δφa/2) | : | 0 | 0.5 | 1 | 0.5 |
| OPTICAL CURRENT OF PD42 ∝ Sin²(Δφb/2) | : | 0.5 | 1 | 0.5 | 0 |
| OPTICAL CURRENT OF PD51 ∝ Cos²(Δφa/2) | : | 1 | 0.5 | 0 | 0.5 |
| OPTICAL CURRENT OF PD52 ∝ Cos²(Δφb/2) | : | 0.5 | 0 | 0.5 | 1 |
| (1) (CURRENT OF PD41) + (CURRENT OF PD42) | : | 0.5(0) | 1.5(1) | 1.5(1) | 0.5(0) | → OUTPUT LEVEL OF OPTICAL RECEIVER CIRCUIT 40 (DECISION RESULT) |
| (2) (CURRENT OF PD52) − (CURRENT OF PD51) | : | −0.5(0) | −0.5(0) | 0.5(1) | 0.5(1) | → OUTPUT LEVEL OF OPTICAL RECEIVER CIRCUIT 50 (DECISION RESULT) |

F I G. 7

| | | | | |
|---|---|---|---|---|
| INPUT PHASE DIFFERENCE | : | 0 | π/2 | π | 3π/2 |
| PHASE DIFFERENCE AFTER ZERO SHIFT (Δφa) | : | 0 | π/2 | π | 3π/2 |
| PHASE DIFFERENCE AFTER π/2 SHIFT (Δφb) | : | π/2 | π | 3π/2 | 0 |
| OPTICAL CURRENT OF PD41 ∝ Cos²(Δφa/2) | : | 1 | 0.5 | 0 | 0.5 |
| OPTICAL CURRENT OF PD42 ∝ Cos²(Δφb/2) | : | 0.5 | 0 | 0.5 | 1 |
| OPTICAL CURRENT OF PD51 ∝ Sin²(Δφa/2) | : | 0 | 0.5 | 1 | 0.5 |
| OPTICAL CURRENT OF PD52 ∝ Sin²(Δφb/2) | : | 0.5 | 1 | 0.5 | 0 |
| (1) (CURRENT OF PD41) + (CURRENT OF PD42) | : | 1.5(1) | 0.5(0) | 0.5(0) | 1.5(1) | → OUTPUT LEVEL OF OPTICAL RECEIVER CIRCUIT 40 (DECISION RESULT) |
| (2) (CURRENT OF PD52) − (CURRENT OF PD51) | : | 0.5(1) | 0.5(1) | −0.5(0) | −0.5(0) | → OUTPUT LEVEL OF OPTICAL RECEIVER CIRCUIT 50 (DECISION RESULT) |

| | | | | |
|---|---|---|---|---|
| INPUT PHASE DIFFERENCE | 0 | π/2 | π | 3π/2 |
| PHASE DIFFERENCE AFTER ZERO SHIFT (Δφa) | 0 | π/2 | π | 3π/2 |
| PHASE DIFFERENCE AFTER π/4 SHIFT (Δφb) | π/4 | 3π/4 | 5π/4 | 7π/4 |
| OPTICAL CURRENT OF PD41 ∝ $Sin^2(Δφa/2)$ | 0 | 0.5 | 1 | 0.5 |
| OPTICAL CURRENT OF PD42 ∝ $Sin^2(Δφb/2)$ | 0.15 | 0.85 | 0.85 | 0.15 |
| OPTICAL CURRENT OF PD51 ∝ $Cos^2(Δφa/2)$ | 1 | 0.5 | 0 | 0.5 |
| OPTICAL CURRENT OF PD52 ∝ $Cos^2(Δφb/2)$ | 0.85 | 0.15 | 0.15 | 0.85 |
| (1) (CURRENT OF PD41) + (CURRENT OF PD42) | 0.15(0) | 1.35(1) | 1.85(1) | 0.65(0) | ← OUTPUT LEVEL OF OPTICAL RECEIVER CIRCUIT 40 (DECISION RESULT) |
| (2) (CURRENT OF PD52) − (CURRENT OF PD51) | −0.15(0) | −0.35(0) | 0.15(1) | 0.35(1) | ← OUTPUT LEVEL OF OPTICAL RECEIVER CIRCUIT 50 (DECISION RESULT) |

| | | | | |
|---|---|---|---|---|
| INPUT PHASE DIFFERENCE | : | 0 | π/2 | π | 3π/2 |
| PHASE DIFFERENCE AFTER ZERO SHIFT (Δφa) | : | 0 | π/2 | π | 3π/2 |
| PHASE DIFFERENCE AFTER π/4 SHIFT (Δφb) | : | 3π/4 | 5π/4 | 7π/4 | π/4 |
| OPTICAL CURRENT OF PD41 ∝ Sin²(Δφa/2) | : | 0 | 0.5 | 1 | 0.5 |
| OPTICAL CURRENT OF PD42 ∝ Sin²(Δφb/2) | : | 0.85 | 0.85 | 0.15 | 0.15 |
| OPTICAL CURRENT OF PD51 ∝ Cos²(Δφa/2) | : | 1 | 0.5 | 0 | 0.5 |
| OPTICAL CURRENT OF PD52 ∝ Cos²(Δφb/2) | : | 0.15 | 0.15 | 0.85 | 0.85 |
| (1) (CURRENT OF PD41) + (CURRENT OF PD42) | : | 0.85(0) | 1.35(1) | 1.15(1) | 0.65(0) | → OUTPUT LEVEL OF OPTICAL RECEIVER CIRCUIT 40 (DECISION RESULT) |
| (2) (CURRENT OF PD52) − (CURRENT OF PD51) | : | −0.85(0) | −0.35(0) | 0.85(1) | 0.35(1) | → OUTPUT LEVEL OF OPTICAL RECEIVER CIRCUIT 50 (DECISION RESULT) |

FIG. 14

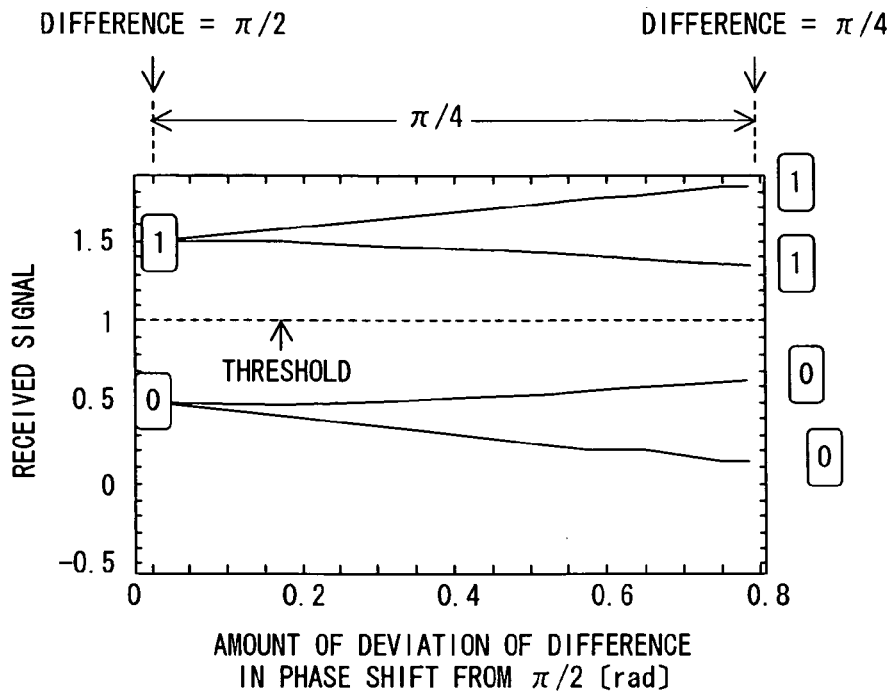
F I G. 15A
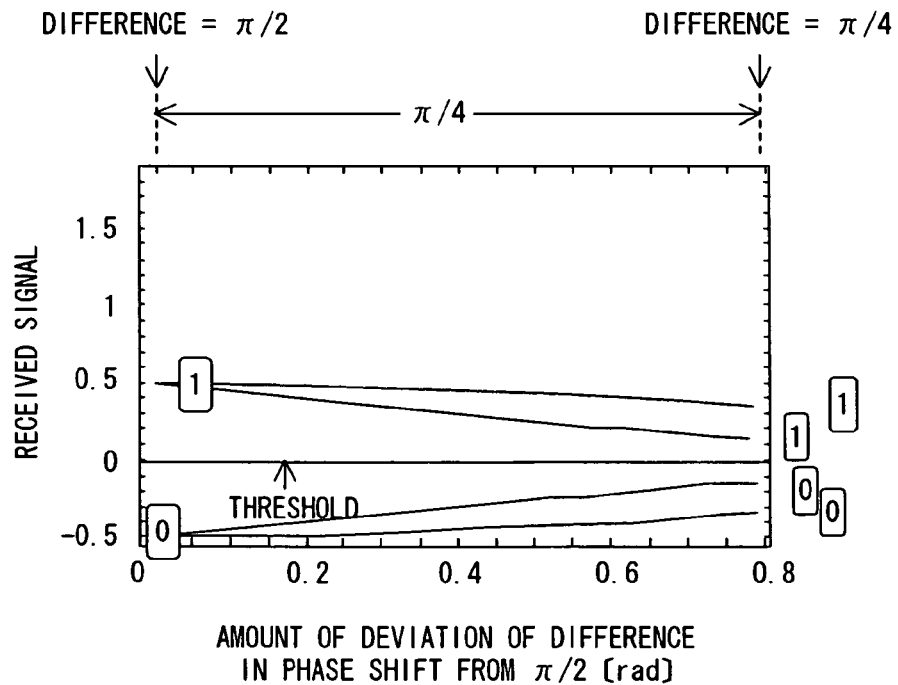
F I G. 15B

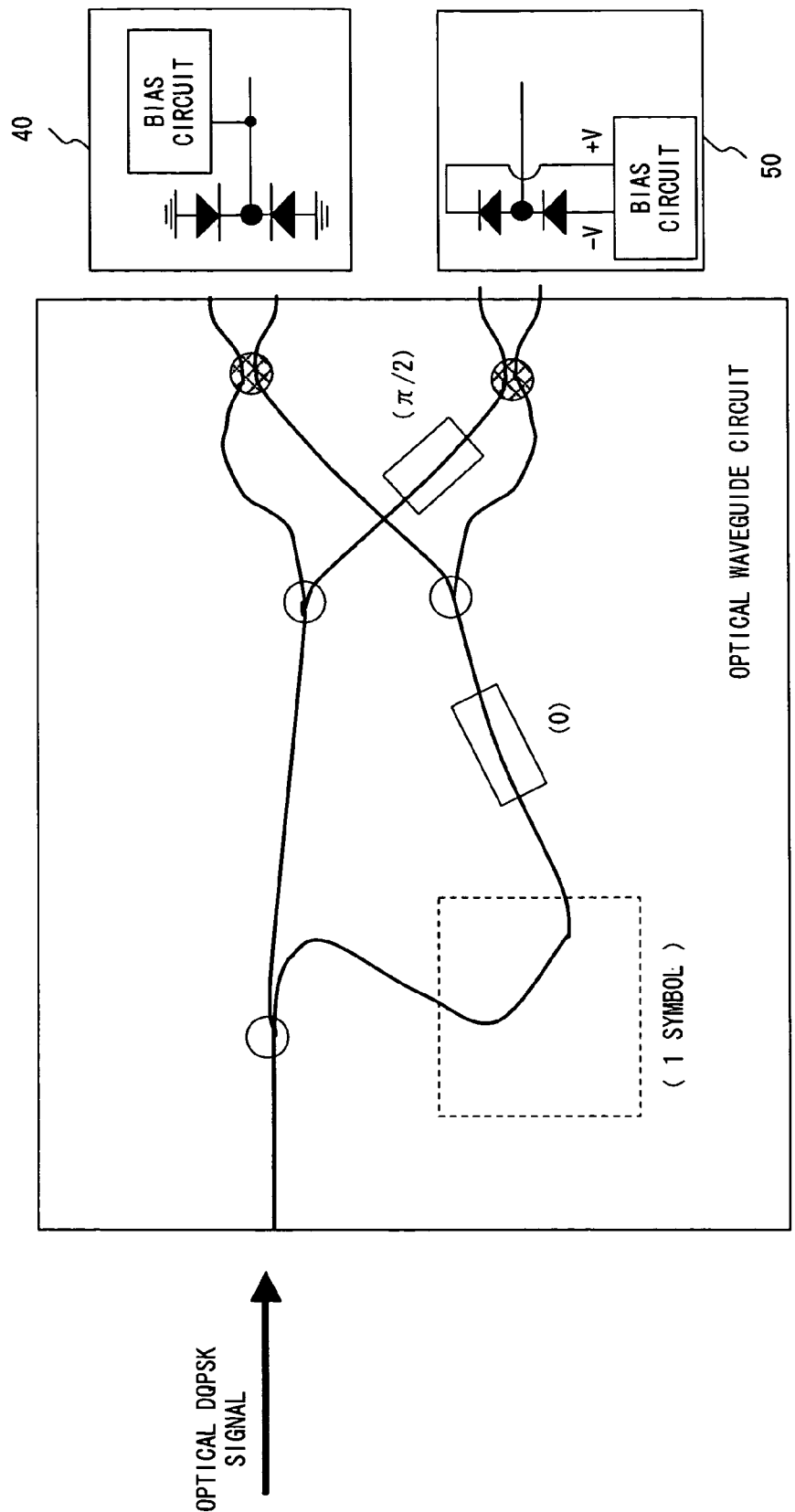
F I G. 37

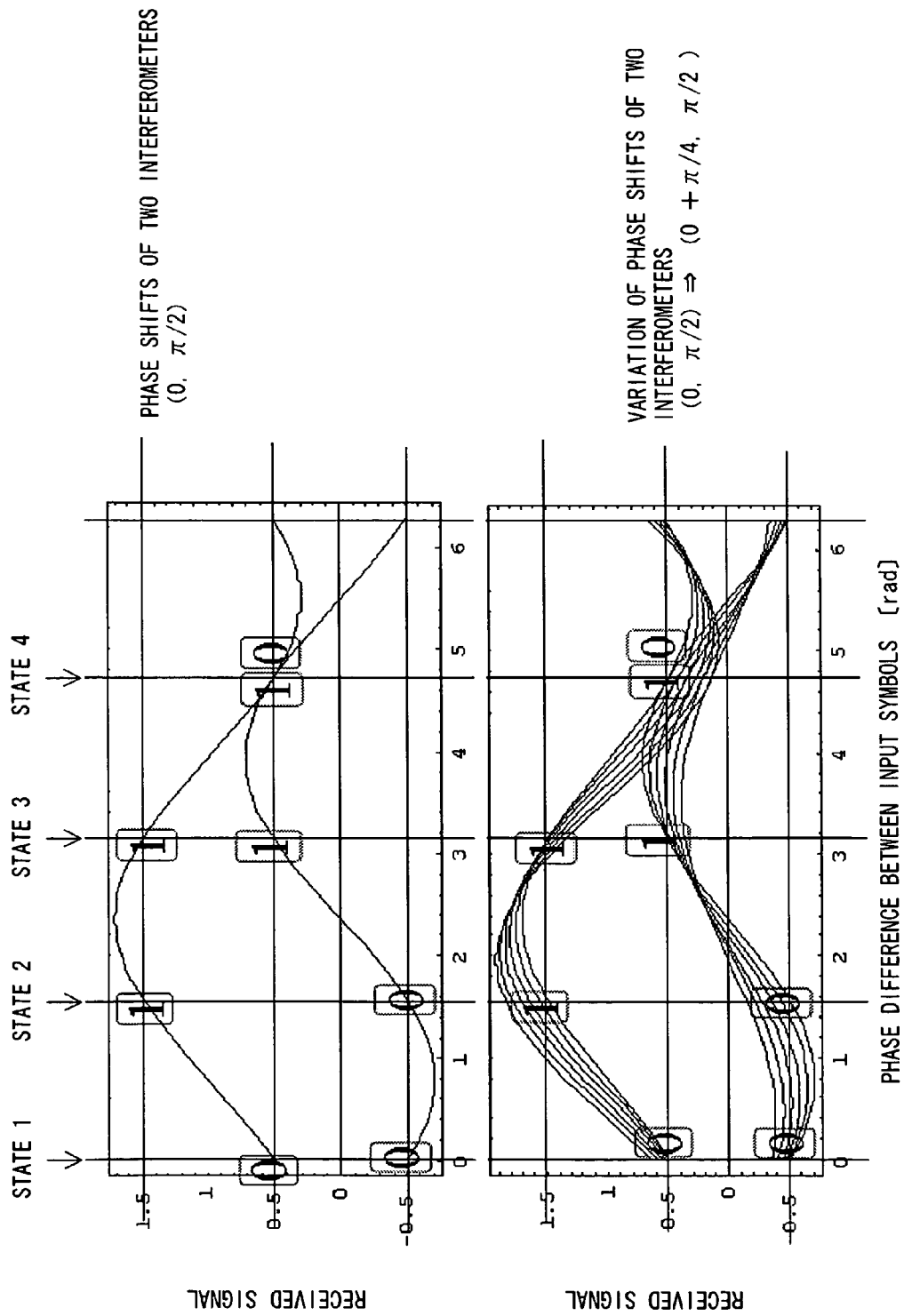
F I G. 43

OPTICAL DQPSK RECEIVER APPARATUS

BACKGROUND OF THE INVENTION

1. Field of the Invention

The present invention relates to an optical DQPSK receiver apparatus for receiving an optical signal modulated by DQPSK. The present invention is applicable to optical communications, optical signal processing, and optical measurements.

2. Description of the Related Art

Phase modulation has been in practical use as one of technologies to transmit signals in optical transmission systems. In the phase modulation, data is transmitted by shifting a phase of carrier wave in accordance with transmission data. For example, in Quadrature Phase Shift Keying (QPSK), respective "θ", "θ+π/2", "θ+π", or "θ+3π/2" is assigned to each of the corresponding symbol "00", "01", "11" or "10" comprised by 2-bit data. Here, "θ" is an arbitrary phase. The receiver equipment recovers transmitted data by detecting the phase of the received signal.

Differential Quadrature Phase Shift Keying (DQPSK) is known as a technology to realize a QPSK receiver in a relatively easy way. In DQPSK, the amount of change in the phase of a carrier wave between the value of a symbol transmitted previously and the value of a symbol transmitted next ("0", "π/2", "π", or "3π/2") is associated with the 2-bit transmission information. Therefore, the receiver equipment can recover transmission data by detecting the phase difference between the adjacent two symbols.

FIG. 1 is a diagram describing the configuration of an existing optical DQPSK receiver apparatus. An optical DQPSK receiver apparatus 1000 shown in FIG. 1 comprises a pair of interferometers 1001 and 1002, and an optical DQPSK signal is split by an optical splitter and guided to a pair of the interferometers 1001 and 1002. A 1-symbol delay element is provided to one arm of the interferometer 1001, and a π/4 phase shift element is provided to the other arm. A 1-symbol delay element is provided to one arm of the interferometer 1002, and −π/4 phase shift element is provided to the other arm. A photo detector circuit 1003 comprises a pair of photodiodes 1003a and 1003b connected in series with each other. A photo detector circuit 1004 comprises a pair of photodiodes 1004a and 1004b connected in series with each other. A pair of optical signals output from the interferometer 1001 is guided to the photodiodes 1003a and 1003b, and a pair of optical signals output from the interferometer 1002 is guided to the photodiodes 1004a and 1004b. Note that to connect in series refers to the state of two diodes being in series when the two diodes are modeled as current sources.

The photo detector circuits 1003 and 1004 output a difference in current generated by each of a pair of photodiodes (differential signal.). The differential signals generated by the photo detector circuits 1003 and 1004 are amplified by each of preamplifiers 1005 and 1006, and are transmitted to a signal process circuit. The signal process circuit recovers 2-bit data from these differential signals.

FIG. 2 is a diagram explaining operations of the optical DQPSK receiver apparatus shown in FIG. 1. In DQPSK, the phase difference between adjacent symbols is "0", "π/2", "π", or "3π/2". If the phase differences in the optical signals interfering with each other in the interferometers 1001 and 1002 are "Δφa" and "Δφb", respectively, the current generated by each photodiode is as shown in FIG. 2. In this case, the current value is normalized. Each of the photo detector circuits 1003 and 1004, then, output signal representing the difference between the current generated by a pair of photodiodes. Therefore, the output levels of the photo detector circuits 1003 and 1004 becomes "0.7" or "−0.7" in accordance with the phase difference between symbols adjacent to each other. Therefore, by using "threshold=0", 2-bit data corresponding to the phase difference between the symbols can be obtained. In the example of FIG. 2, for example, when the phase difference between symbols is "π/2", the output levels of the photo detector circuits 1003 and 1004 are "−0.7(<0)" and "0.7(>0)", and therefore, "0" and "1" are obtained.

The configuration and the operation of the optical DQPSK receiver apparatus are described in detail in a patent document 1 (published Japanese Translation of PCT patent application No. 2004-516743 (WO2002/051041 or US2004/0081470)) and a patent document 2 (WO 03/063515A2), for example.

In the conventional optical DQPSK receiver apparatus shown in FIG. 1, the amount of phase shift of a pair of interferometers 1001 and 1002 is "π/4" and "−π/4", and the difference between them is "π/2". However, when the difference in the amount of phase shift deviates from "π/2", the reception quality is degraded.

FIG. 3 is a diagram showing a relation between the difference in the amount of phase shift of a pair of interferometers and the recovered signal. In FIG. 3, the horizontal axis represents the deviation of the difference in the amount of phase shift from "π/2". The vertical axis represents the output level of the photo detector circuits 1003 and 1004. Here, if the difference in the amount of phase shift is "π/2 (horizontal axis=0)", the output level of the photo detector circuit is "0.7" or "−0.7". Therefore, using "threshold=0", the logical value of the output signal of the photo detector circuit (0 or 1) can be determined. However, as the deviation from "π/2" of the difference in the amount of phase shift becomes large, the output level of the photo detector circuit 1003 or 1004 is closer to zero. In other words, the difference between the output level of the photo detector circuit and the threshold becomes small. As a result, the probability of the error in decision of the logical value of the output signal of the photo detector circuit becomes high, and the reception quality is degraded. When the difference in the amount of a pair of the interferometers becomes "π/4 (or 3π/4)", the output level of one photo detector circuit becomes "0". In such a case, the logical value (0 or 1) of the output signal of the photo detector circuit cannot be determined using "threshold=0", and therefore, data cannot be recovered.

As explained above, in the conventional optical DQPSK receiver apparatus, when the amount of phase shift of the phase shift element in an interferometer deviates, reception quality is degraded. Note that the amount of phase shift of the phase shift element changes due to the thermal change and aging degradation etc.

When the optical DQPSK receiver apparatus receives high-speed data of several ten Gbps, the frequency characteristics of the photodiode constituting the photo detector circuits 1003 and 1004 have to be superior. However, such a high-speed photodiode is highly expensive in general. In other words, if the number of photodiode constituting the photo detector circuit can be reduced, it is possible to keep the cost of the optical DQPSK receiver apparatus low.

SUMMARY OF THE INVENTION

It is an object of the present invention to improve the reception quality of the optical DQPSK receiver apparatus. It is another object of the present invention to lower the cost of the optical DQPSK receiver apparatus.

An optical DQPSK receiver apparatus of the present invention comprises: an optical splitter for splitting an optical DQPSK signal and for guiding the signal to a first optical path and a second optical path; a first interferometer, connected to the first optical path, comprising a first delay element and a first phase shift element with the amount of phase shift α, and outputting a first optical signal and a second optical signal; a second interferometer, connected to the second optical path, comprising a second delay element and a second phase shift element with the amount of phase shift β, and outputting a third optical signal and a fourth optical signal; a first photo detector circuit for outputting a signal indicating a sum of current corresponding to the first optical signal and current corresponding to the third optical signal; and a second photo detector circuit for outputting a signal indicating a difference between current corresponding to the second optical signal and current corresponding to the fourth optical signal. A difference between α and β is π/4 or more and 3π/4 or less.

The amount of phase shift α in the first interferometer and the amount of phase shift β in the second interferometer are different from each other. For that reason, the optical DQPSK signal interferes under different conditions in the first and second interferometers. In recovering data from the optical DQPSK signal, the desirable difference between α and β is π/2.

Each photo detector circuit recovers data based on the optical signal from two interferometers providing different interference conditions. For that reason, change in the output level of each photo detector circuit is moderate with respect to change in the difference between α and β. Consequently, even if the amount of phase shift of each interferometer deviates, data can be recovered from the optical DQPSK signal.

In the above optical DQPSK receiver apparatus, the first photo detector circuit may comprise one photo detector, and the second photo detector circuit may comprise a pair of photo detectors connected in series with each other. In such a case, the first optical signal and the third optical signal are provided to the photo detector of the first photo detector circuit, and the second optical signal and the fourth optical signal are provided to the pair of the photo detectors of the second photo detector circuit. The photo detector of the first photo detector circuit generates a sum of the current corresponding to the first optical signal and the current corresponding to the third optical signal. According to this configuration, the number of the photo detector required for the optical DQPSK receiver apparatus is three.

According to the present invention, the reception quality of the optical DQPSK receiver apparatus can be improved. In addition, low cost of the optical DQPSK receiver apparatus can be realized.

BRIEF DESCRIPTION OF THE DRAWINGS

FIG. 2 is a diagram explaining operations of the optical DQPSK receiver apparatus shown in FIG. 1;

FIG. 7 is a diagram explaining the operations of the optical DQPSK receiver apparatus shown in FIG. 5;

FIG. 10 is a diagram explaining operations of the optical DQPSK receiver apparatus shown in FIG. 9;

FIG. 12 is a diagram explaining the operations of the optical DQPSK receiver apparatus shown in FIG. 11;

FIG. 14 is a diagram explaining the operations of the optical DQPSK receiver apparatus shown in FIG. 13;

FIG. 15A and FIG. 15B are diagrams showing relation between the difference in the amount of phase shift of a pair of interferometers and the recovered signal in the optical DQPSK receiver apparatus of the first embodiment;

FIG. 36 to FIG. 39 are examples of the optical DQPSK receiver apparatus configured by using an optical waveguide circuit;

FIG. 41 to FIG. 46 are diagrams showing an output signal of the photo detector circuit when the amount of phase shift of the phase shift element changes.

DESCRIPTION OF THE PREFERRED EMBODIMENTS

Figure 4:
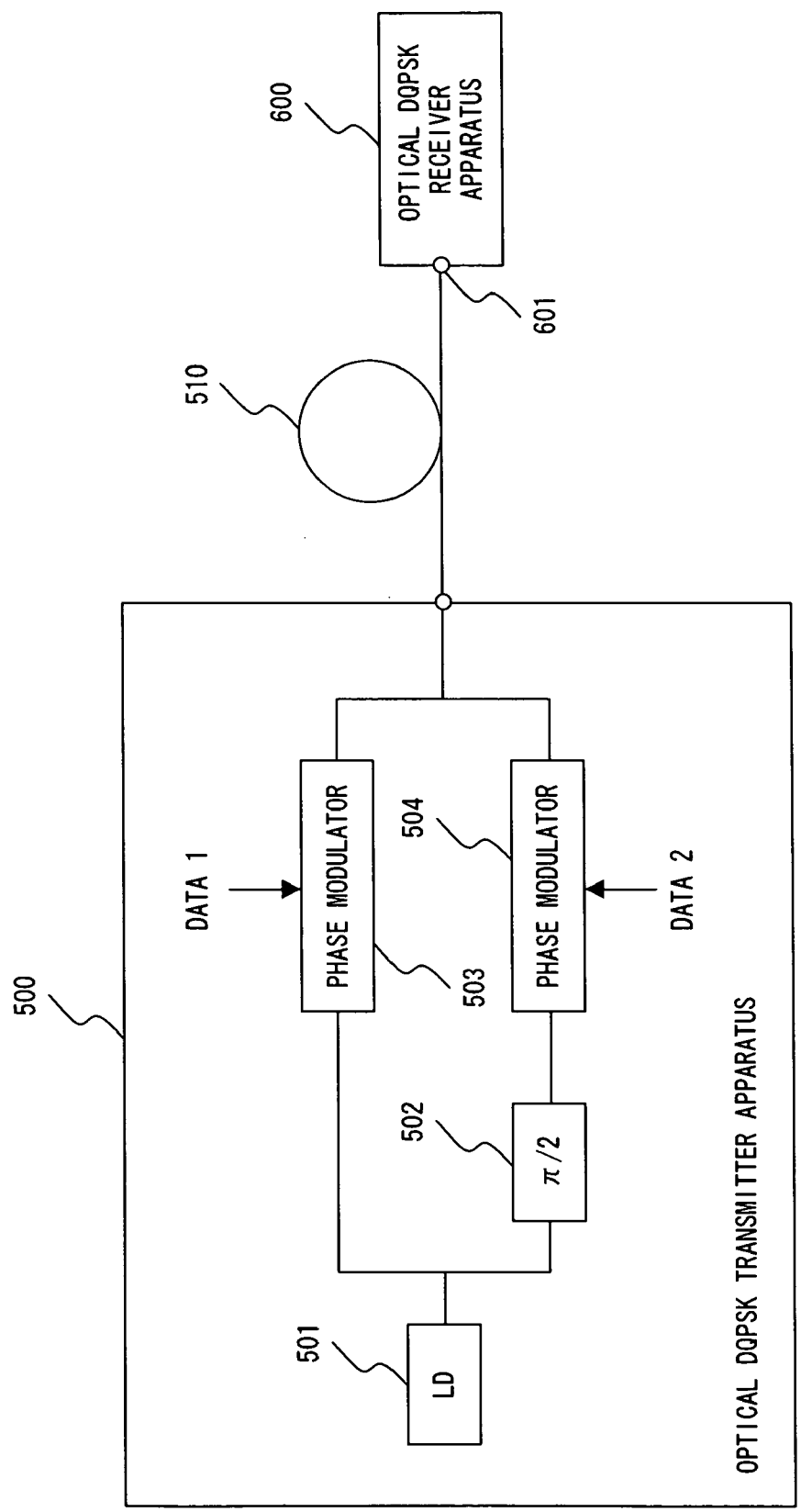
FIG. 4 is a diagram describing a configuration of an optical transmission system in which the optical DQPSK receiver apparatus of the present invention is employed.

FIG. 4 is a diagram describing a configuration of an optical transmission system in which the optical DQPSK receiver apparatus of the present invention is employed. In FIG. 4, an optical DQPSK transmitter apparatus 500 comprises an optical source (LD) 501, a π/2 phase shifter 502, and phase modulators 503 and 504. The optical source 501 generates an optical continuous wave (CW). The wavelength of the optical CW is not limited in particular; however, it is 1550 nm, for example. The π/2 phase shifter 502 provides the phase difference π/2 between a pair of optical CWs provided to the phase modulators 503 and 504. The phase modulators 503 and 504 modulate the optical CW using data 1 and data 2, respectively. Here, the data 1 and data 2 are bit streams generated by encoding transmission data by using a DQPSK pre-coder, not shown in the drawing. A pair of the optical CWs provided to the phase modulators 503 and 504 has phases different from each other by 90 degrees. For that reason, when optical signals generated from the phase modulators 503 and 504 are combined, "θ", "θ+π/2", "θ+π", or "θ+3π/2" is assigned, for example, to symbol "00", "01", "11" or "10", respectively. Then, the optical DQPSK transmitter apparatus 500 transmits the optical DQPSK signal generated in such a manner. It should be noted that the configuration of the described optical DQPSK transmitter apparatus 500 is just an example, and a number of other configurations can be employed. The receiver apparatus according to the present invention is applicable to any optical DQPSK transmitter apparatus, regardless of specific configurations.

The optical DQPSK signal is transmitted via an optical fiber 510, and is received by an optical DQPSK receiver apparatus 600. The optical DQPSK receiver apparatus 600 comprises an optical input port 601, and the optical DQPSK signal is guided to an optical DQPSK receiver circuit via the optical input port 601.

First Embodiment

Figure 5:
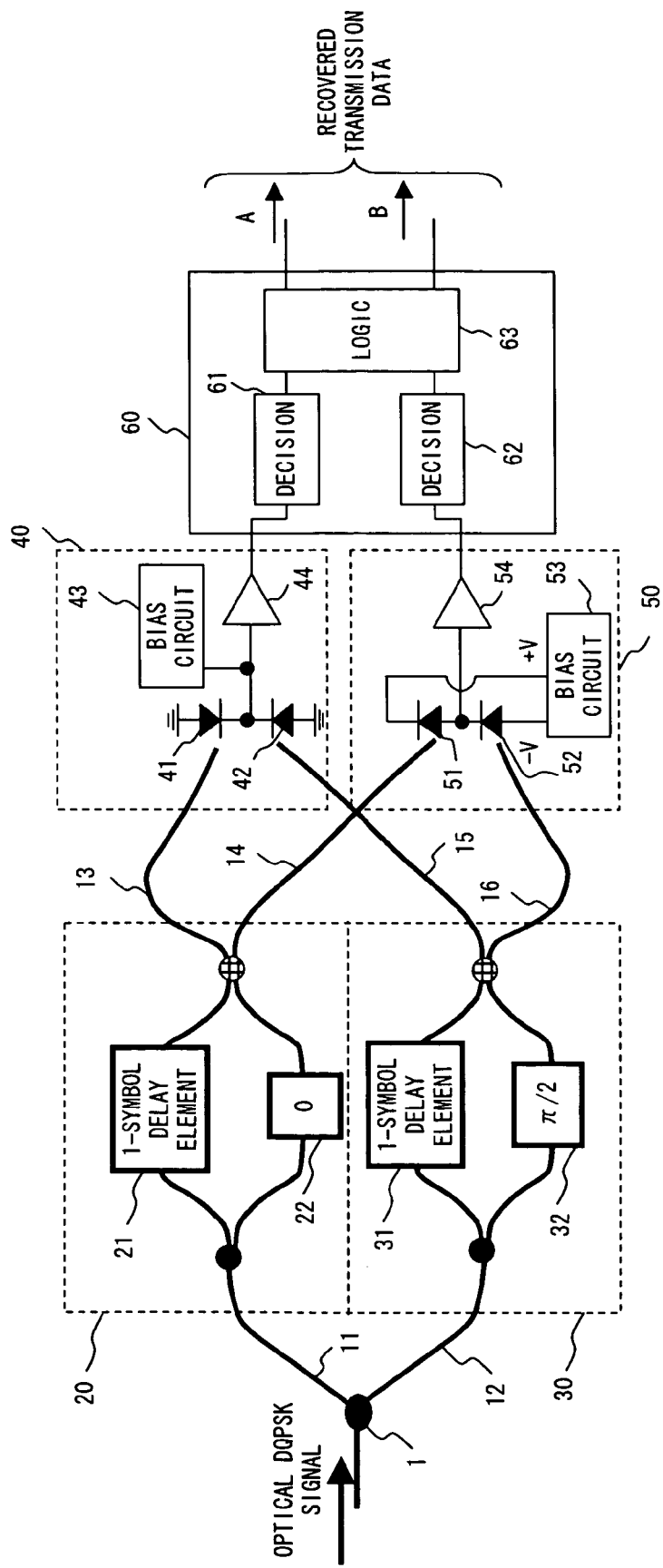
FIG. 5 is a diagram describing a first configuration of the optical DQPSK receiver apparatus of the first embodiment according to the present invention.

FIG. 5 is a diagram describing a first configuration of the optical DQPSK receiver apparatus of the first embodiment according to the present invention. This optical DQPSK receiver apparatus receives the optical DQPSK signal via the optical input port 601 shown in FIG. 4.

An optical splitter 1 splits an input optical DQPSK signal and outputs the split signals to an optical path 11 and an optical path 12. The splitting ratio of the optical splitter 1 is 1:1, and optical signals with equal optical power are transmitted to the optical path 11 and the optical path 12. The optical splitter 1 can be realized by a 1×2 optical coupler, for example. The optical paths 11 and 12 are connected to interferometers 20 and 30, respectively.

The interferometers 20 and 30 are Mach-Zehnder interferometers, for example. A 1-symbol delay element 21 is provided to an upper arm of the interferometer 20. The 1-symbol delay element 21 delays optical signals by 1 symbol time. Note that in DQPSK, two-bits of data is transmitted in one symbol, and therefore the 1-symbol time is equivalent to an inverse number of the transmission rate by a factor of two. A phase shift element 22 is provided to a lower arm of the interferometer 20. The phase shift element 22 shifts the phase of optical signals by "zero". That is, the phase shift element 22 provides a pair of the optical signals propagated via the upper arm and the lower arm of the interferometer 20 with zero phase shifts (2nπ (n is an integer including zero)). In other words, the phase shift element 22 adjusts the phase of at least one of a pair of optical signals so that the relative phase shift between the optical signals propagated via the upper arm and the lower arm of the interferometer 20 is to be zero (2nπ (n is an integer including zero)). The interferometer 20 outputs a pair of complementary optical signals to the optical paths 13 and 14. Note that the phase shift element 22 may be provided either in the upper arm or in the lower arm. The phase shift "zero" adjusted by the phase shift element 22 should include "approximately zero".

A 1-symbol delay element 31 is provided in the upper arm of the interferometer 30. The 1-symbol delay element 31 delays optical signals by 1 symbol time. A phase shift element 32 is provided in the lower arm of the interferometer 30. The phase shift element 32 shifts the phase of optical signals by "π/2". That is, the phase shift element 32 provides the phase difference π/2 (π/2+2mπ (m is an integer including zero)) between a pair of optical signals propagated via the upper arm and the lower arm of the interferometer 30. In other words, the phase shift element 32 adjusts the phase of at least one of a pair of optical signals so that the relative phase shift between the optical signals propagated via the upper arm and the lower arm of the interferometer 30 is to be π/2 (π/2+2mπ (m is an integer including zero)). The interferometer 30 outputs a pair of complementary optical signals to the optical paths 15 and 16. Note that the phase shift element 32 may be provided either in the upper arm or in the lower arm. The phase shift "π/2" adjusted by the phase shift element 32 should include "approximately π/2". It should be noted that in the above and the following explanation, the amount of delay of the interferometers 20 and 30 is described as 1 symbol; however, the amount of delay can be any integer multiple of 1 symbol time as disclosed in Patent Document 2.

The present embodiment examines a 1×2 optical coupler and a 2×2 optical coupler in the interferometer 20 and the interferometer 30 by using a 3 dB-split directional coupler of the same type as a model. However, as other implementation for all embodiments shown in the present invention, in addition to the present embodiment, there are a Multimode Interference (MMI) type, an adiabatic type, and an X type optical couplers. The amount of phase rotation may be different between an input waveguide and an output waveguide. If the interferometer is designed on the ground of the phase difference between the output ports of the optical couplers, the receiver apparatus can be still implemented by employing any type of couplers on the same principle as the above model.

A photo detector circuit 40 comprises photodiodes 41 and 42, a bias circuit 43 and an amplifier 44. The photodiodes 41 and 42 are connected in parallel to each other. To the photodiode 41, one of a pair of optical signals output from the interferometer 20 is provided via the optical path 13. To the photodiode 42, also, one of a pair of optical signals output from the interferometer 30 is provided via the optical path 15. The bias circuit 43 applies bias voltage to the photodiodes 41 and 42. The amplifier 44 is a transimpedance amplifier (TIA) for example, and converts the sum of current generated by the photodiodes 41 and 42 into a voltage signal.

Figure 6A:
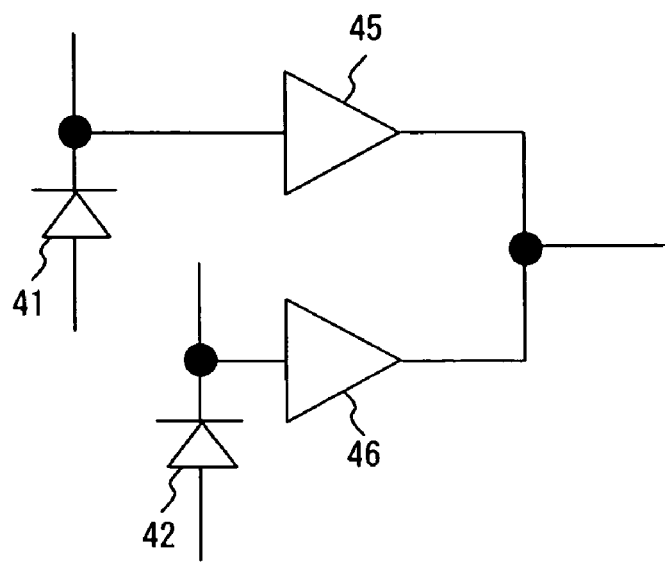
FIGS. 6A and 6B are diagrams showing modification examples of the photo detector circuit.

The photo detector circuit 40, as shown in FIG. 6A, may have a configuration employing preamplifiers 45 and 46 amplifying each current generated by the photodiodes 41 and 42. In such a case, the amplified current signals are summed. In this configuration, because floating capacitance of the input side of the preamplifiers 45 and 46 is small, the frequency characteristic is improved. The photo detector circuit 40 may also have a configuration employing a pair of amplifiers, which converts the each current generated by the photodiodes 41 and 42 into voltage. In such a case, a sum-up circuit is provided for summing up the output voltage of a pair of the amplifiers.

A photo detector circuit 50 comprises photodiodes 51 and 52, a bias circuit 53, and an amplifier 54. The photodiodes 51 and 52 are connected in series with each other. To the photodiode 51, another one of a pair of the optical signals output from the interferometer 20 is provided via the optical path 14. To the photodiode 52, another one of a pair of the optical signals output from the interferometer 30 is provided via the optical path 16. The bias circuit 53 applies bias voltage to the photodiodes 51 and 52. The amplifier 54 is a transimpedance amplifier (TIA) for example, and converts the difference of current generated by the photodiodes 51 and 52 into a voltage signal.

Figure 6B:
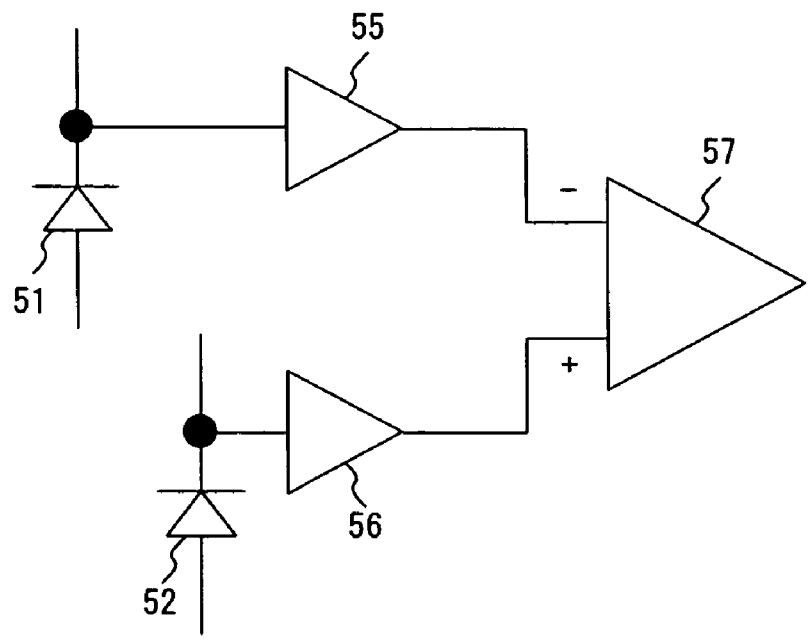

The photo detector circuit 50, as shown in FIG. 6B, may have a configuration employing a pair of amplifiers 55 and 56 for converting each current generated by the photodiodes 51 and 52 into corresponding voltage, and a subtracting circuit 57 for generating the difference in output voltages of a pair of the amplifiers 55 and 56.

A signal process circuit 60 recovers transmission data from the output signals of the photo detector circuits 40 and 50. A decision circuit 61 generates "0" or "1" by comparing a level (for example, voltage value) of the output signal of the photo detector circuit 40 with a threshold. In the same manner, a decision circuit 62 generates "0" or "1" by comparing a level of the output signal of the photo detector circuit 50 with a threshold. A logic circuit 63 recovers transmission data based on the data generated by the decision circuits 61 and 62.

Next, the operations of the optical DQPSK receiver apparatus with the above configuration are explained with reference to FIG. 7 and FIG. 8. The interferometer 20 of the optical DQPSK receiver apparatus shown in FIG. 5 comprises the 1-symbol delay element 21. In the interferometer 20, therefore, an optical signal with a symbol and an optical signal with the next symbol interfere each other. The amount of phase shift of the phase shift element 22 comprised in the interferometer 20 is zero. Therefore, if the phase difference between the adjacent symbols is "0", the phase difference in optical signals interfering with each other in the interferometer 20 is also "0". In the same manner, if the phase difference between the adjacent symbols is "$\pi/2$", "$\pi$" or "$3\pi/2$", the phase difference in optical signals interfering with each other in the interferometer 20 is "$\pi/2$", "$\pi$" or "$3\pi/2$", respectively.

The interferometer comprises the 1-symbol delay element 31. Therefore, also in the interferometer 30, optical signals in adjacent symbols interfere each other. However, the amount of phase shift of the phase shift element 32 comprised in the interferometer 30 is $\pi/2$. Therefore, if the phase difference between the adjacent symbols is "0", the phase difference in optical signals interfering with each other in the interferometer 30 is also "$\pi/2$". In the same manner, if the phase difference between the adjacent symbols is "$\pi/2$", "$\pi$" or "$3\pi/2$", the phase difference in optical signals interfering with each other in the interferometer 30 is "$\pi$", "$\pi/3$" or "0", respectively.

Assume that the phase difference of the optical signals interfering with each other in the interferometer 20 is "$\Delta\phi a$", power of the optical signal output from the interferometer 20 to the optical path 13 is proportional to $\sin^2(\Delta\phi a/2)$, and power of the optical signal output from the interferometer 20 to the optical path 14 is proportional to $\cos^2(\Delta\phi a/2)$. In the same manner, assume that the phase difference of the optical signals interfering with each other in the interferometer 30 is "$\Delta\phi b$", power of the optical signal output from the interferometer 30 to the optical path 15 is proportional to $\sin^2(\Delta\phi b/2)$, and power of the optical signal output from the interferometer 30 to the optical path 16 is proportional to $\cos^2(\Delta\phi b/2)$.

The current generated by the photodiode 41 is proportional to the power of the optical signal output from the interferometer 20 to the optical path 13. Thus, when the phase difference between the optical signals interfering with each other in the interferometer 20 is "0", the current generated in the photodiode 41 is "0". In the same way, if the phase difference between the optical signals interfering with each other in the interferometer 20 is "$\pi/2$", "$\pi$" or "$3\pi/2$", the current generated by the photodiode 41 is "0.5", "1", or "0.5", respectively.

The current generated by the photodiode 42 is proportional to the power of the optical signal output from the interferometer 30 to the optical path 15. Thus, if the phase difference between the optical signals interfering with each other in the interferometer 30 is "$\pi/2$", the current generated by the photodiode 42 is "0.5". In the same way, if the phase difference between the optical signals interfering with each other in the interferometer 30 is "$\pi$", "$3\pi/2$" or "0", the current generated by the photodiode 42 is "1", "0.5" or "0", respectively.

The current generated by the photodiode 51 is proportional to the power of the optical signals output from the interferometer 20 to the optical path 14. Thus, if the phase difference between the optical signals interfering with each other in the interferometer 20 is "0", the current generated by the photodiode 51 is "1". In the same way, if the phase difference between the optical signals interfering with each other in the interferometer 20 is "$\pi/2$", "$\pi$" or "$3\pi/2$", the current generated by the photodiode 51 is "0.5", "0" or "0.5", respectively.

The current generated by the photodiode 52 is proportional to the power of the optical signals output from the interferometer 30 to the optical path 16. Thus, if the phase difference between the optical signals interfering with each other in the interferometer 30 is "$\pi/2$", the current generated by the photodiode 52 is "0.5". In the same way, if the phase difference between the optical signals interfering with each other in the interferometer 30 is "$\pi$", "$3\pi/2$" or "0", the current generated by the photodiode 52 is "0", "0.5" or "1", respectively.

The photo detector circuit (parallel PD) 40 generates a signal indicating a sum of currents generated by the photodiodes 41 and 42. Hence, if the phase difference between the adjacent symbols of the input DQPSK signal is "0" (i.e. the phase difference between the optical signals interfering with each other in the interferometer 20 is "0", and the phase difference between the optical signals interfering with each other in the interferometer 30 is "$\pi/2$"), the output signal of the photo detector circuit 40 is "0.5(=0+0.5)". In the same manner, if the phase difference between the adjacent symbols is "$\pi/2$", "$\pi$" or "$3\pi/2$", the output signal of the photo detector circuit 40 is "1.5(=0.5+1)", "1.5(=1+0.5)" or "0.5(=0.5+0)", respectively.

The photo detector circuit (differential PD) 50 generates a signal indicating a difference between the currents generated by the photodiodes 51 and 52. Hence, if the phase difference between the adjacent symbols of the input optical DQPSK signal is "0" (i.e. the phase difference between the optical signals interfering with each other in the interferometer 20 is "0", and the phase difference between the optical signals interfering with each other in the interferometer 30 is "$\pi/2$"), the output signal of the photo detector circuit 50 is "−0.5 (=0.5−1)". In the same manner, the phase difference between the adjacent symbols is "$\pi/2$", "$\pi$" or "$3\pi/2$", the output signal of the photo detector circuit 50 is "−0.5(=0−0.5)", "0.5(=0.5−0)" or "0.5(=1−0.5)", respectively.

The decision circuit 61 compares the output signal of the photo detector circuit 40 with a predetermined threshold. In this example, "1" is used as a threshold of the decision circuit 61. By so doing, the output signal of the decision circuit 61 is "1" when the phase difference between the adjacent symbols of the input optical DQPSK signal is "$\pi/2$" or "$\pi$", and is "0" when the phase difference is "0" or "$3\pi/2$". The decision circuit 62 compares the output signal of the photo detector circuit 50 with a predetermined threshold. In this example, "0" is used as a threshold of the decision circuit 62. By so doing, the output signal of the decision circuit 62 is "1" when the phase difference between the adjacent symbols of the input optical DQPSK signal is "$\pi$" or "$3\pi/2$", and is "0" when the phase difference is "0" or "$\pi/2$". Consequently, 2-bit data (00, 10, 11, or 01) corresponding to the phase difference between the adjacent symbols of the input optical DQPSK signal (0, $\pi/2$, $\pi$, or $3\pi/2$) is obtained.

Figure 8:
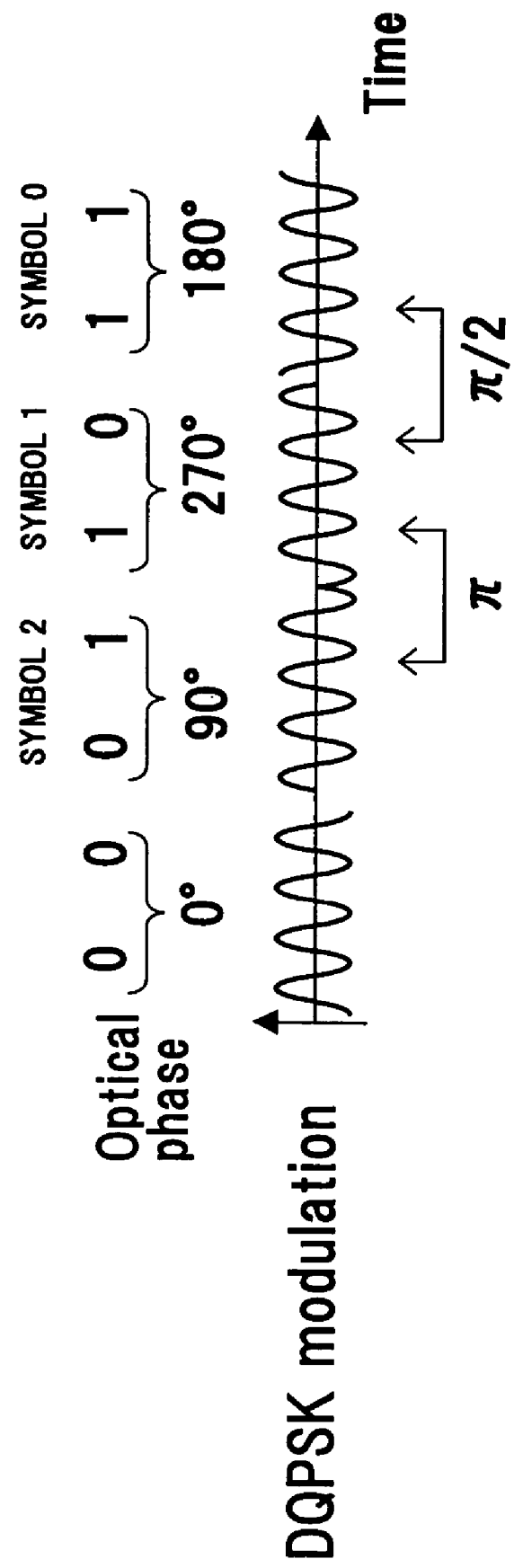
FIG. 8 is a diagram showing an example of the optical DQPSK signal.

For example, when a symbol 1 of the optical DQPSK signal shown in FIG. 8 is input, the phase difference between a symbol 0 and the symbol 1 is "π/2". In this case, the phase difference between the optical signals interfering with each other in the interferometer 20 is "π/2", and the phase difference between the optical signals interfering with each other in the interferometer 30 is "π". Then, the currents generated by the photodiodes 41, 42, 51 and 52 are "0.5", "1", "0.5" and "0", respectively. Therefore, 2-bit data "10" is obtained in the signal process circuit 60.

The subsequent phase difference between the symbol 1 and a symbol 2 is "π". In such a case, the phase difference between the optical signals interfering with each other in the interferometer 20 is "π", and the phase difference between the optical signals interfering with each other in the interferometer 30 is "3π/2". Then, the currents generated by the photodiodes 41, 42, 51 and 52 are "1", "0.5", "0" and "0.5", respectively. Therefore, 2-bit data "11" is obtained in the signal process circuit 60.

As described above, the optical DQPSK receiver apparatus shown in FIG. 5 can generate 2-bit data corresponding to the phase difference between the symbols of the optical DQPSK signal. Note that if the logic of the output signals of the decision circuits 61 and 62 are inverted in the logic circuit 63, the correspondence between the phase difference between symbols and the recovered 2-bit data becomes the same as the correspondence in the optical DQPSK receiver apparatus shown in FIG. 1.

In the optical DQPSK receiver apparatus described above, the configurations of the photo detector circuits 40 and 50 are different from each other. In other words, in the photo detector circuit 40, the photodiodes 41 and 42 are connected in parallel with each other, whereas in the photo detector circuit 50, the photodiodes 51 and 52 are connected in series with each other. This causes a difference in LC resonance frequency of the input side circuit of the amplifier 44 and that of the input side circuit of the amplifier 54. For this reason, even if the photo detector circuits 40 and 50 are arranged in proximity, electromagnetic crosstalk between those circuits is kept small. This fact proves that the configuration of the present embodiment contributes improvement of reception quality.

Figure 9:
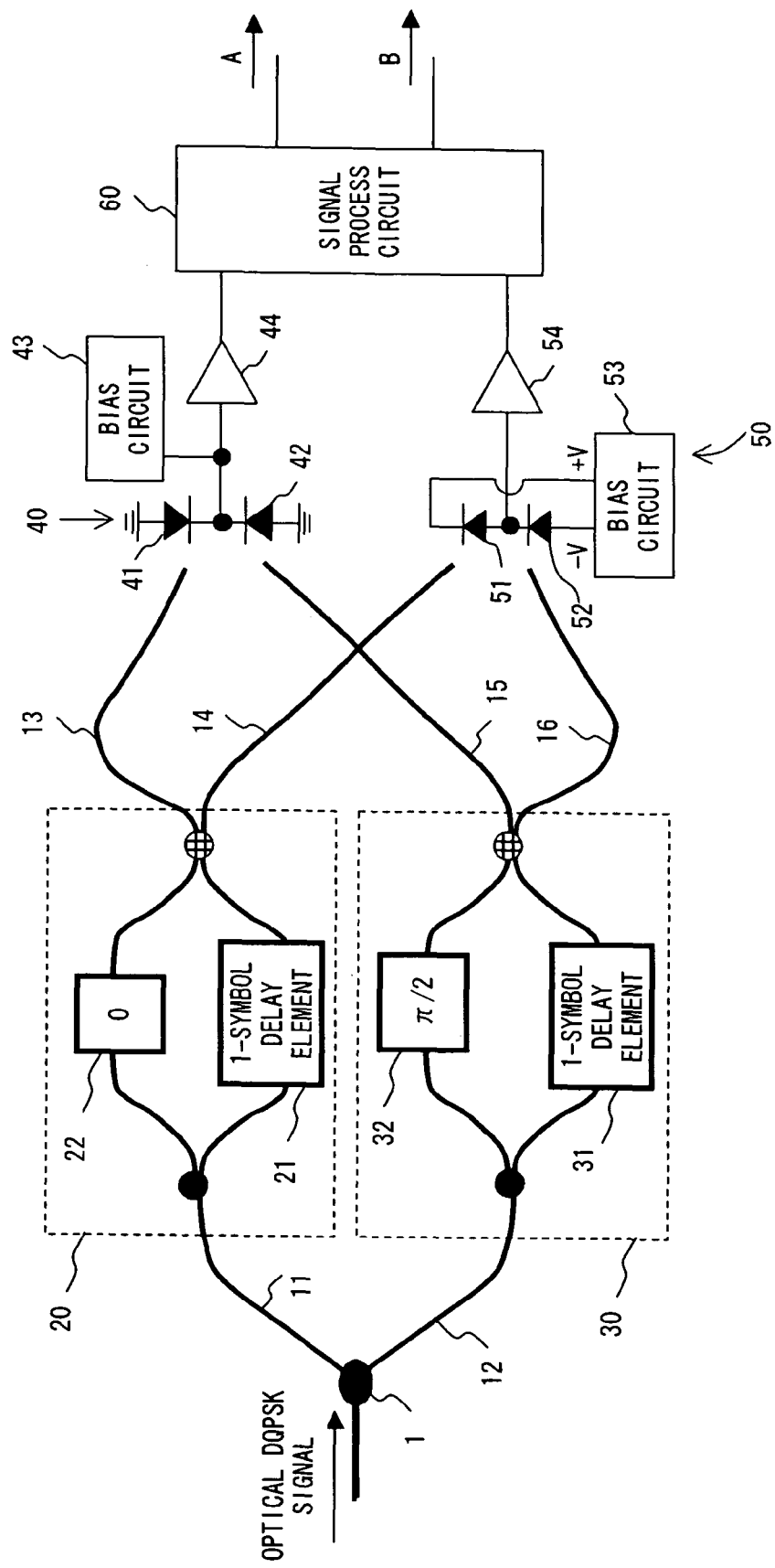
FIG. 9 is a diagram describing the second configuration of the optical DQPSK receiver apparatus of the first embodiment according to the present invention.

FIG. 9 is a diagram describing the second configuration of the optical DQPSK receiver apparatus of the first embodiment according to the present invention. FIG. 10 is a diagram explaining operations of the optical DQPSK receiver apparatus shown in FIG. 9.

In the optical DQPSK receiver apparatus shown in FIG. 9, the phase shift element 22 is provided in the upper arm of the interferometer 20, and the 1-symbol delay element 21 is provided in the lower arm. Therefore, assume that the phase difference between the optical signals interfering with each other in the interferometer 20 is "Δφa", power of the optical signal output from the interferometer 20 to the optical path 13 is proportional to $\cos^2(\Delta\phi a/2)$, and power of the optical signal output from the interferometer 20 to the optical path 14 is proportional to $\sin^2(\Delta\phi a/2)$.

The phase shift element 32 is provided in the upper arm of the interferometer 30, and the 1-symbol delay element 31 is provided in the lower arm. Consequently, assume that the phase difference of the optical signals interfering with each other in the interferometer 30 is "Δφb", power of the optical signal output from the interferometer 30 to the optical path 15 is proportional to $\cos^2(\Delta\phi b/2)$, and power of the optical signal output from the interferometer 30 to the optical path 16 is proportional to $\sin^2(\Delta\phi b/2)$.

The operations of the optical DQPSK receiver apparatus shown in FIG. 9 are basically the same as the operations of the optical DQPSK receiver apparatus shown in FIG. 5. However, in the optical DQPSK receiver apparatus of FIG. 5, respective 2-bit data of "00", "10", "11" or "01" is obtained corresponding to the phase difference between the adjacent symbols of the input optical DQPSK signal of "0", "π/2", "π" or "3π/2". On the other hand, in the optical DQPSK receiver apparatus of FIG. 9, respective 2-bit data of "11", "01", "00" or "10" is obtained corresponding to the phase difference between the adjacent symbols of the input optical DQPSK signal of "0", "π/2", "π" or "3π/2". When the data obtained in the optical DQPSK receiver apparatus of FIG. 9 is inverted, it is the same as the data obtained in the optical DQPSK receiver apparatus of FIG. 5. This inversion process is performed by a logic circuit provided in, for example, later stage of the decision circuit.

In general, an optical DQPSK receiver apparatus comprises a pair of interferometers. The apparatus sets different interference states to a pair of the interferometers, and recovers transmission data based on the output optical signals of the pair of the interferometers. Therefore, in the pair of interferometers comprised in an optical DQPSK receiver apparatus, phase shift elements having the amount of phase shift different from one another are provided. At this point, the difference in the amount of phase shift between the pair of interferometers needs to be appropriately set, in order to recover transmission data from the optical DQPSK signal. It is known that the optimal difference in the amount of phase shift in this case is "π/2". For example, in the conventional optical DQPSK receiver apparatus shown in FIG. 1, each of the amount of phase shift of a pair of interferometers is "π/4" and "−π/4", and the difference in the amount of phase shift is "π/2".

In the optical DQPSK receiver apparatus shown in FIG. 5, the amounts of phase shift of the phase shift elements 22 and 32 are "0" and "π/2", respectively, and the difference in the amount of phase shift is "π/2". However, in the optical DQPSK receiver apparatus according to the present invention, even if the difference in the amounts of phase shift of a pair of interferometers deviates from "π/2", transmission data can be still recovered. Therefore, in the following description, examples in which the difference in the amounts of phase shift is changed are presented as third and fourth configurations of the first embodiment.

Figure 11:
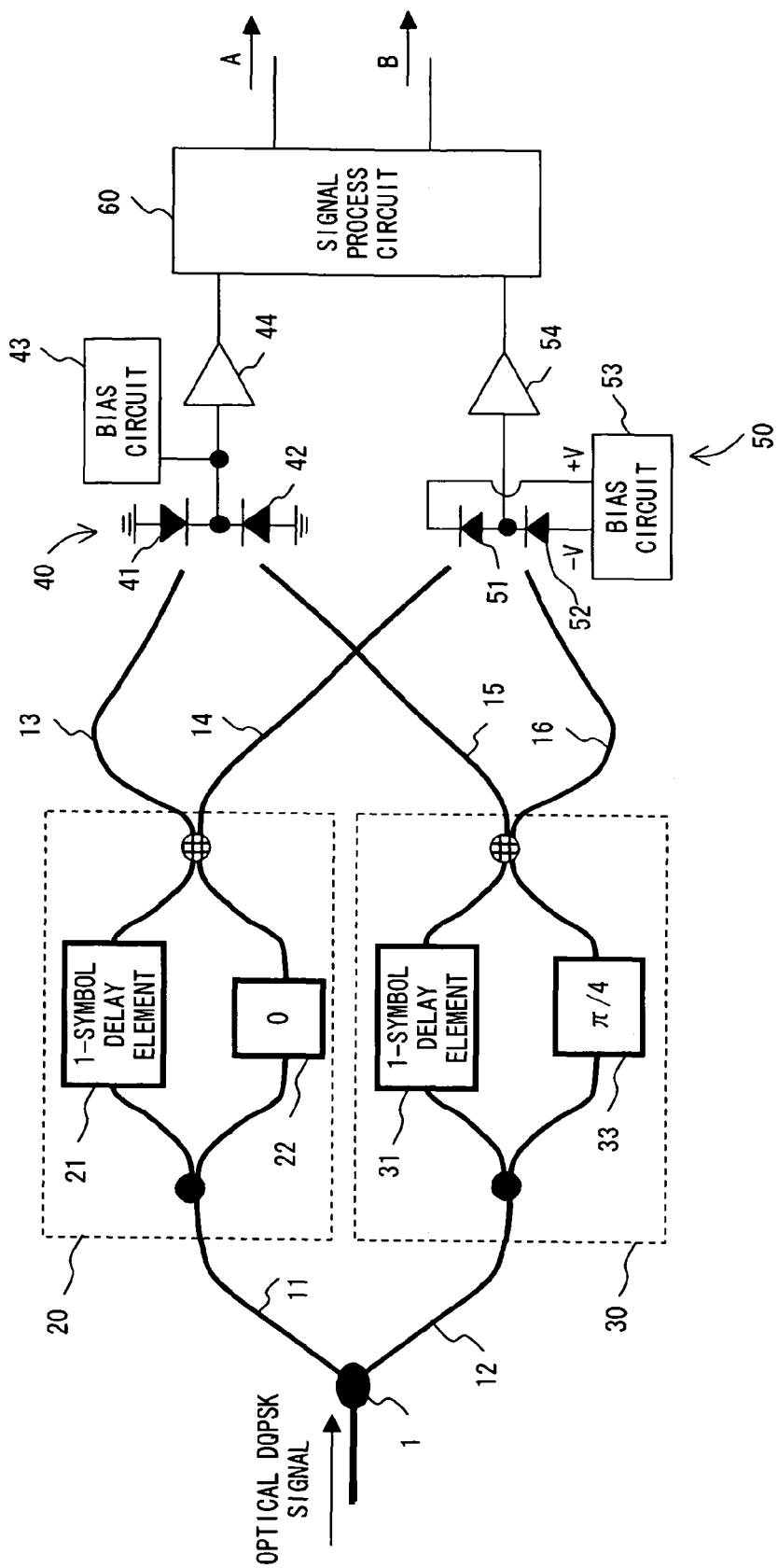
FIG. 11 is a diagram describing the third configuration of the optical DQPSK receiver apparatus of the first embodiment according to the present invention.

FIG. 11 is a diagram describing the third configuration of the optical DQPSK receiver apparatus of the first embodiment according to the present invention. FIG. 12 is a diagram explaining the operations of the optical DQPSK receiver apparatus shown in FIG. 11.

The third configuration shown in FIG. 11 is basically the same as the first configuration shown in FIG. 5. However, in the third configuration, the amount of phase shift of the phase shift element 33 provided in the lower arm of the interferometer 30 is "π/4". In other words, the phase shift element 33 provides the phase difference π/4 (π/4+2nπ (n is an integer including zero)) between a pair of optical signals propagated via the upper arm and the lower arm of the interferometer 30.

The operations of the optical DQPSK receiver apparatus shown in FIG. 11 is basically the same as those of the optical DQPSK receiver apparatus of FIG. 5. However, the amount of phase shift of the phase shift element 33 is "π/4". For that reason, when the phase difference between the adjacent symbols is "0", "π/2", "π" or "3π/2", the phase difference between the optical signals interfering with each other in the interferometer 30 is, respectively, "π/4", "3π/4", "5π/4" or "7π/4". When the phase difference in the optical signals interfering with each other in the interferometer 30 is "$\pi/4$", "$3\pi/4$", "$5\pi/4$" or "$7\pi/4$", the current generated by the photodiode 42 is, respectively, "0.15", "0.85", "0.85" or "0.15", and the current generated by the photodiode 52 is "0.85", "0.15", "0.15" or "0.85".

Consequently, the phase difference between the adjacent symbols of the input optical DQPSK signal is "0" (i.e. the phase difference between the optical signals interfering with each other in the interferometer 20 is "0", and the phase difference between the optical signals interfering with each other in the interferometer 30 is "$\pi/4$"), the output signal of the photo detector circuit 40 is "0.15(=0+0.15)". In the same manner, when the phase difference between the adjacent symbols is "$\pi/2$", "$\pi$" or "$3\pi/2$", the output signal of the photo detector circuit 40 is "1.35 (=0.5+0.85)", "1.85(=1+0.85)", or "0.65(=0.5+0.15)", respectively. The phase difference between the adjacent symbols of the input optical DQPSK signal is "0", "$\pi/2$", "$\pi$" or "$3\pi/2$", the output signal of the photo detector circuit 50 is, respectively, "−0.15(=0.85−1)", "−0.35(=0.15−0.5)", "0.15(=0.15−0)" or "0.35(=0.85−0.5)".

"1" is used as a threshold of the decision circuit 61. Then, the output signal of the decision circuit 61 is "1" when the phase difference between the adjacent symbols of the input optical DQPSK signal is "$\pi/2$" or "$\pi$", and is "0", when the phase difference is "0" or "$3\pi/2$". "0" is used as a threshold of the decision circuit 62. Then, the output signal of the decision circuit 62 is "1" when the phase difference between the adjacent symbols of the input optical DQPSK signal is "$\pi$" or "$3\pi/2$", and is "0" when the phase difference is "0" or "$\pi/2$". Therefore, 2-bit data (00, 10, 11, or 01) corresponding to the phase difference between the adjacent symbols of the input optical DQPSK signal (0, $\pi/2$, $\pi$, or $3\pi/2$) is obtained. In other words, the optical DQPSK apparatus shown in FIG. 11 can perform data recovery equivalent to the optical DQPSK apparatus shown in FIG. 5.

Figure 13:
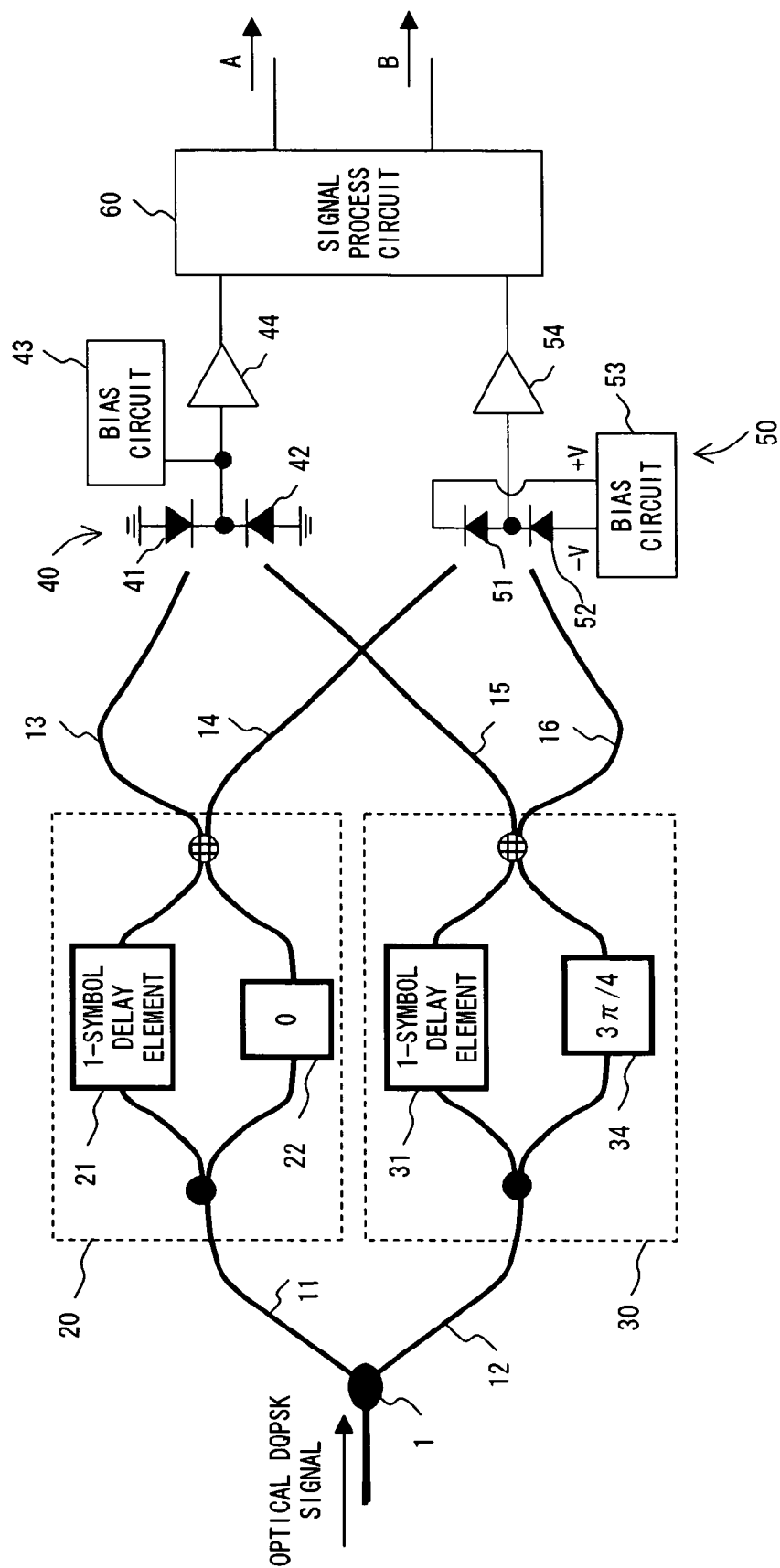
FIG. 13 is a diagram describing a fourth configuration of the optical DQPSK receiver apparatus of the first embodiment according to the present invention.

FIG. 13 is a diagram describing a fourth configuration of the optical DQPSK receiver apparatus of the first embodiment according to the present invention. FIG. 14 is a diagram explaining the operations of the optical DQPSK receiver apparatus shown in FIG. 13.

The fourth configuration shown in FIG. 13 is basically the same as the configuration shown in FIG. 5 or FIG. 11. However, in the forth configuration, the amount of phase shift of the phase shift element 34 provided in the lower arm of the interferometer 30 is "$3\pi/4$". In other words, the phase shift element 34 provides the phase difference $3\pi/4$ ($3\pi/4+2n\pi$ (n is an integer including zero)) between a pair of optical signals propagated via the upper arm and the lower arm of the interferometer 30.

In the optical DQPSK receiver apparatus shown in FIG. 13, if the phase difference between the adjacent symbols of the input optical DQPSK signal is "0", "$\pi/2$", "$\pi$" or "$3\pi/2$", the output signal of the photo detector circuit 40 is, respectively, "0.85(=0+0.85)", "1.35(=0.5+0.85)", "1.15(=1+0.15)" or "0.65(=0.5+0.15)". When the phase difference between the adjacent symbols is "0", "$\pi/2$", "$\pi$" or "$3\pi/2$", the output signal of the photo detector circuit 50 is, respectively, "−0.85 (=0.15−1)", "−0.35(=0.15−0.5)", "0.85(=0.85−0)", or "0.35 (=0.85−0.5)". Thus, thresholds of the decision circuits 61 and 62 are "1" and "0", respectively, in the optical DQPSK receiver apparatus also, 2-bit data (00, 10, 11, or 01) corresponding to the phase difference between the adjacent symbols of the input optical DQPSK signal (0, $\pi/2$, $\pi$, or $3\pi/2$) is obtained. In other words, the optical DQPSK receiver apparatus shown in FIG. 13 can perform data recovery equivalent to that of the optical DQPSK receiver apparatus shown in FIG. 5.

In the first embodiment, as described above, assuming that the amount of phase shift of the phase shift element 22 of the interferometer 20 is zero, even if the amount of the phase shift of the phase shift element of the interferometer 30 changes within a range between $\pi/4$ to $3\pi/4$, the transmission data can be properly recovered.

However, in the optical DQPSK receiver apparatus shown in FIG. 5, the difference between the signal level and the threshold, compared by the decision circuits 61 and 62 is large. Specifically, the signal level to be compared by the decision circuit 61 is, as shown in FIG. 7, "0.5" or "1.5". When the threshold is "1", the difference between the signal level and the threshold is "0.5". Similarly, the signal level to be compared by the decision circuit 62 is "0.5" or "−0.5". When the threshold is "0", the difference between the signal level and the threshold is "0.5".

On the other hand, in the optical DQPSK receiver apparatus shown in FIG. 11 and FIG. 13, the minimum value of the difference between the signal level and the threshold compared by the decision circuits 61 and 62 is small. For example, in the configuration shown in FIG. 11, the signal level to be compared by the decision circuit 62 is, as shown in FIG. 12, "−0.15", "−0.35", "0.15" or "0.35". When the threshold is "0", the minimum value of the difference between the signal level and the threshold is "0.15". Likewise, in the configuration shown in FIG. 13, the signal level to be compared by the decision circuit 61 is, as shown in FIG. 14, "0.85", "1.35", "1.15" or "0.65". When the threshold is "1", the minimum value of the difference between the signal level and the threshold is "0.15".

As explained above, the optical DQPSK receiver apparatus shown in FIG. 5 has lower probability of data error occurrence in the receiver apparatus, compared with the optical DQPSK receiver apparatus shown in FIG. 11 and FIG. 13. In other words, the difference in the amount of phase shift in the interferometers 20 and 30 is between $\pi/4$ to $3\pi/4$ ($\pi/4+2n\pi$ to $3\pi/4+2n\pi$ (n is an integer)), transmission data can be recovered; however, it is desirable to set the difference in the amount of phase shift at $\pi/2$ ($\pi/2+2n\pi$ (n is an integer)).

FIG. 15A and FIG. 15B are diagrams showing relation between the difference in the amount of phase shift of a pair of interferometers and the recovered signal in the optical DQPSK receiver apparatus of the first embodiment. In the graphs, the horizontal axis represents the deviation of the difference in the phase shift from the "$\pi/2$". The vertical axis represents the output level of the photo detector circuits 40 and 50.

FIG. 15A shows the characteristic of the photo detector circuit 40 and that of the decision circuit 61. As shown in FIG. 15A, the difference in the amount of phase shift is "$\pi/2$ (i.e. the configuration shown in FIG. 5)", the output level of the photo detector circuit 40 is "1.5" or "0.5". In this case, by using "threshold=1", the logical value of the output of the photo detector circuit (0 or 1) can be determined. As the difference in the amount of phase shift changes, the output level of the photo detector circuit changes. However, the change in the output level of the photo detector circuit is moderate with respect to the change in the difference in the amount of phase shift. For that reason, the difference in the amount of phase shift changes to "$\pi/4$ (i.e. the configuration shown in FIG. 11)", the output level of the photo detector circuit 40 is "0.15", "1.35", "1.85" or "0.65". Therefore, using "threshold=1", the logical value of the output of the photo detector circuit (0 or 1) can be determined. Likewise, even if the difference in the amount of phase shift is "$3\pi/4$ (i.e. the configuration shown in FIG. 13)", the logical value of the output of the photo detector circuit can be determined.

FIG. 15B shows the characteristics of the photo detector circuit 50 and the decision circuit 62. As shown in FIG. 15B, if the difference in the amount of phase shift is "$\pi/2$ (i.e. the configuration shown in FIG. 5)", the output level of the photo detector circuit 50 is "0.5" or "−0.5". In this case, using "threshold=0", the logical value of the output of the photo detector circuit (0 or 1) can be determined. The difference in the amount of phase shift changes to the "$\pi/4$ (i.e. the configuration shown in FIG. 11)", the output level of the photo detector circuit 50 is "−0.15", "−0.35", "0.15" or "0.35". Therefore, using "threshold=0", the logical value of the output of the photo detector circuit (0 or 1) can be determined. Likewise, the difference in the amount of phase shift is "$3\pi/4$ (i.e. the configuration shown in FIG. 13)", the logical value of the output of the photo detector circuit can be determined.

As described above, in the optical DQPSK receiver apparatus of the first embodiment according to the present invention, even if the difference in the amount of phase shift in the interferometers 20 and 30 deviates from "$\pi/2$" by $\pm\pi/4$, transmission data can be recovered. On the other hand, in the conventional optical DQPSK receiver apparatus shown in FIG. 1, if the difference in the amount of phase shift in the interferometers 1001 and 1002 deviates from "$\pi/2$" by $\pm\pi/4$, transmission data cannot be recovered. In other words, the optical DQPSK receiver apparatus of the embodiment has less degradation in the reception quality, compared with the conventional configurations, when the amount of phase shift of the phase shift element comprised in each interferometer is deviated.

FIG. 16 to FIG. 22 are diagrams describing a fifth configuration of the optical DQPSK receiver of the first embodiment according to the present invention. The optical circuits in the optical DQPSK receiver apparatus of the fifth configuration is equivalent of the interferometers 20 and 30 in the first and the second configurations explained above. The photo detector circuits 40 and 50 and the signal process circuit 60 of the fifth configuration are the same as described above. Therefore, the fifth configuration is, as a whole, substantially equivalent of the first and the second configurations.

Figure 16:
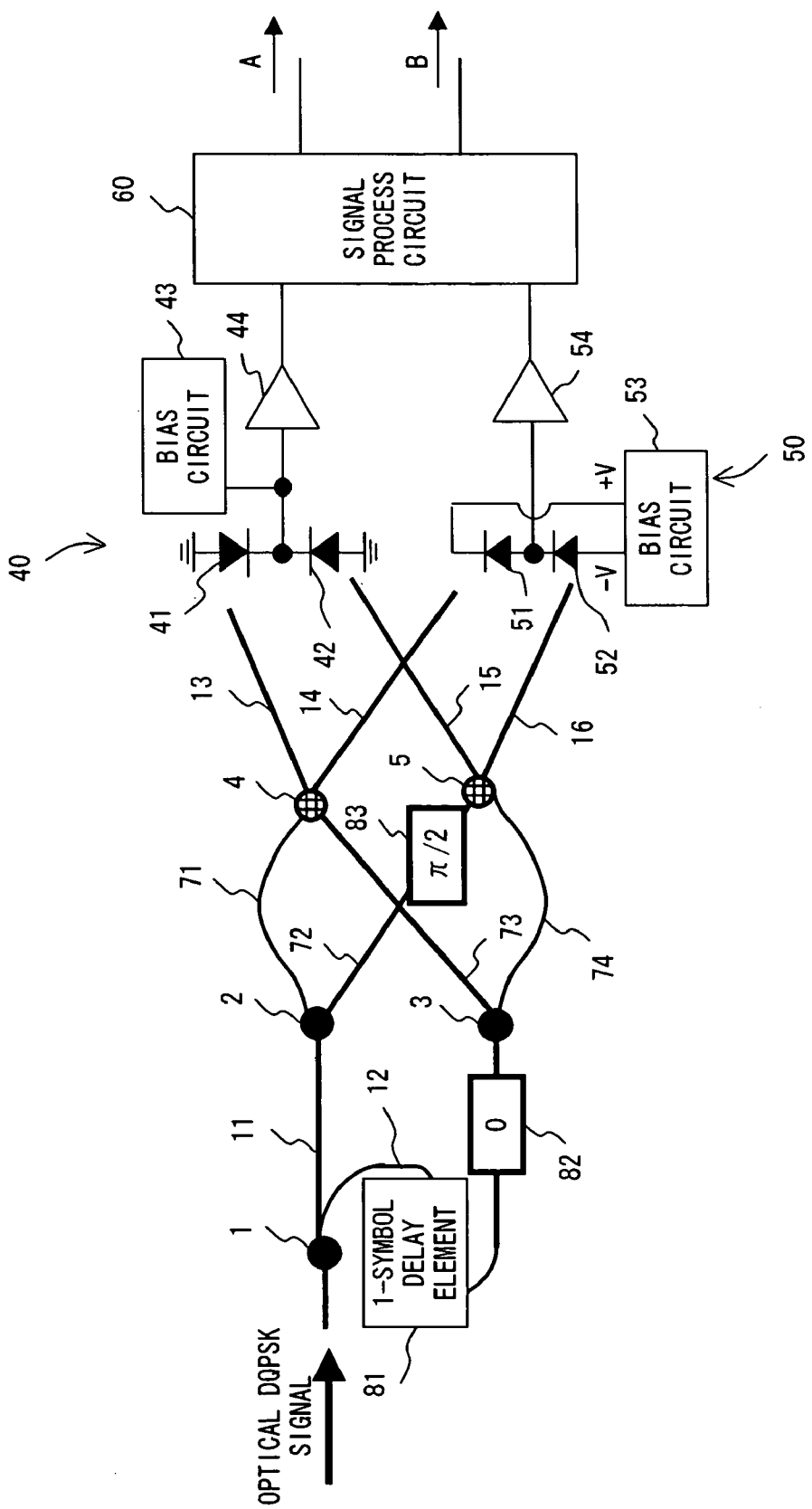
FIG. 16 to FIG. 22 are diagrams describing a fifth configuration of the optical DQPSK receiver of the first embodiment.

In FIG. 16, the optical splitter 1, as explained above, splits an input optical DQPSK signal, and outputs the signals to the optical path 11 and the optical path 12. An optical splitter 2 splits an optical signal provided via the optical path 11, and outputs the signals to an optical path 71 and an optical path 72. The splitting ratio of the optical splitter 2 is 1:1, and therefore, optical signals with equal optical power are transmitted via the optical path 71 and the optical path 72. The optical path 71 is connected to an optical coupler 4, and the optical path 72 is connected to the optical coupler 5. Likewise, the optical splitter 3 splits an optical signal provided via the optical path 12, and outputs the signals to an optical path 73 and an optical path 74. The splitting ratio of the optical splitter 3 is also 1:1, and therefore, optical signals with equal optical power are transmitted via the optical path 73 and the optical path 74. The optical path 73 is connected to an optical coupler 4, and the optical path 74 is connected to an optical coupler 5. In FIG. 16 to FIG. 34, if there is no phase difference between two output ports in each optical splitter of the optical splitter 2 and the optical splitter 3 and there is a phase difference between two output ports of the optical splitter 1, which is equivalent to the case that the optical coupler 4 or the optical coupler 5 is used as 1-input-2-output coupler, designing of the receiver apparatus can be facilitated.

In the optical coupler 4, the optical signal propagated via the optical path 71 interferes with the optical signal propagated via the optical path 73. Likewise, in the optical coupler 5, the optical signal propagated via the optical path 72 interferes with the optical signal propagated via the optical path 74.

In the optical path 12 connecting the optical splitter 1 and the optical splitter 3, a 1-symbol delay element 81 and a zero phase shift element 82 are provided. The 1-symbol delay element 81 elongates the propagation time of the optical signal from the optical splitter 1 to the optical coupler 4 via the optical splitter 3 by "1-symbol time" comparing with the propagation time of the optical signal from the optical splitter 1 to the optical coupler 4 via the optical splitter 2. It also elongates the propagation time of the optical signal from the optical splitter 1 to the optical coupler 5 via the optical splitter 3 by "1-symbol time" comparing with the propagation time of the optical signal from the optical splitter 1 to the optical coupler 5 via the optical splitter 2. The 1-symbol delay element 81 can be realized by increasing the optical path length of the optical path 12 so as to be longer than that of the optical path 11 by "a length equivalent to 1 symbol time", for example. The differences in propagation time of the optical signal in the optical paths 71-74 are significantly smaller than 1 symbol time.

The zero phase shift element 82 adjusts phases of the optical signals so that the relative phase shift between the optical signal from the optical splitter 1 to the optical coupler 4 via the optical paths 11 and 71 and the optical signal from the optical splitter 1 to the optical coupler 4 via the optical paths 12 and 73 is zero (i.e. $2n\pi$ (n is an integer including zero)). The zero phase shift element 82 can be realized by, for example, adjusting the optical path length of the optical path 12.

In the optical path 72 connecting the optical splitter 2 and the optical coupler 5, a $\pi/2$ phase shift element 83 is provided. The $\pi/2$ phase shift element 83 adjust phases of the optical signals so that the relative phase shift between the optical signal from the optical splitter 1 to the optical coupler 5 via the optical paths 11 and 72 and the optical signal from the optical splitter 1 to the optical coupler 5 via the optical paths 12 and 74 is $\pi/2$ (i.e. $\pi/2+2n\pi$ (n is an integer including zero)). The $\pi/2$ phase shift element 83 can be realized by, for example, adjusting the optical path length of the optical path 72.

In the above configuration, the optical circuit, which has an optical path from the optical splitter 1 to the optical coupler 4 via the optical splitter 2, and an optical path from the optical splitter 1 to the optical coupler 4 via the optical splitter 3, comprises the 1-symbol delay element and the zero phase shift element. Therefore, this optical circuit is equivalent of the interferometer 20 shown in FIG. 5. The optical circuit, which has an optical path from the optical splitter 1 to the optical coupler 5 via the optical splitter 2, and an optical path from the optical splitter 1 to the optical coupler 5 via the optical splitter 3, comprises the 1-symbol delay element and the $\pi/2$ phase shift element. Therefore, this optical circuit is equivalent to the interferometer 30 shown in FIG. 5. Hence the optical DQPSK receiver apparatus shown in FIG. 16 performs substantially the same operations as the optical DQPSK receiver apparatus shown in FIG. 5.

Figure 17:
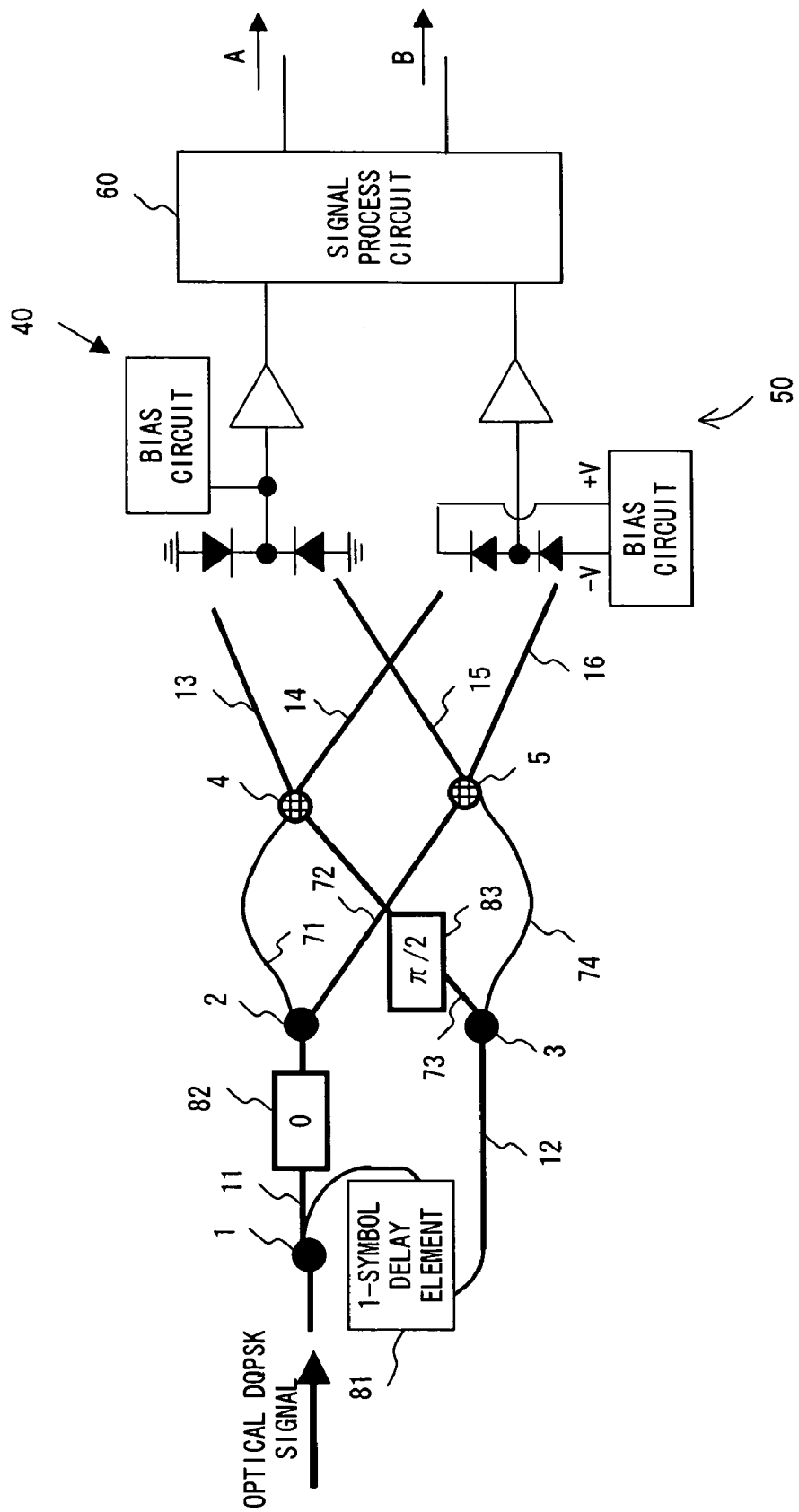

In the optical DQPSK receiver apparatus shown in FIG. 17, the 1-symbol delay element 81 is provided in the optical path 12, the zero phase shift element 82 is provided in the optical path 11, the $\pi/2$ phase shift element 83 is provided in the optical path 73. Thus, an optical circuit, which has an optical path from the optical splitter 1 to the optical coupler 4 via the optical splitter 2 and an optical path from the optical splitter 1 to the optical coupler 4 via the optical splitter 3, comprises the 1-symbol delay element and the $\pi/2$ delay element. In other words, this optical circuit is equivalent of the interferometer 30 shown in FIG. 5. An optical circuit, which has an optical path from the optical splitter 1 to the optical coupler 5 via the optical splitter 2 and an optical path from the optical splitter 1 to the optical coupler 5 via the optical splitter 3, comprises the 1-symbol delay element and the zero phase shift element. Therefore, this optical circuit is equivalent of the interferometer 20 shown in FIG. 5. Hence, the optical DQPSK receiver apparatus shown in FIG. 17 performs substantially the same operations as the optical DQPSK receiver apparatus shown in FIG. 5.

Figure 18:
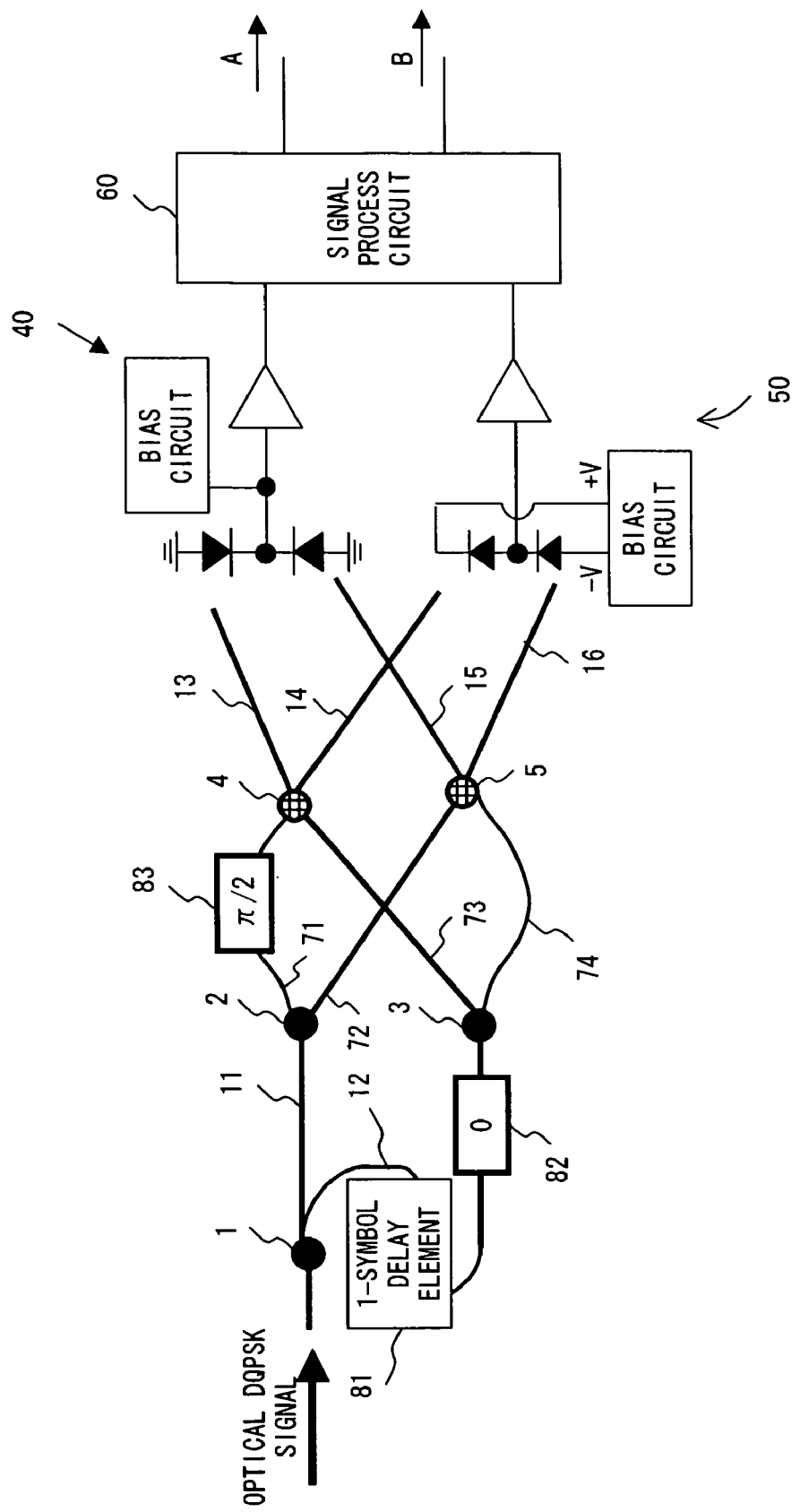

In the optical DQPSK receiver apparatus shown in FIG. 18, the 1-symbol delay element 81 and the zero phase shift element 82 are provided in the optical path 12, and the $\pi/2$ phase shift element 83 is provided in the optical path 71. Thus, an optical circuit, which has an optical path from the optical splitter 1 to the optical coupler 4 via the optical splitter 2 and an optical path from the optical splitter 1 to the optical coupler 4 via the optical splitter 3, comprises the 1-symbol delay element and the $\pi/2$ phase shift element. That is, this optical circuit is equivalent of the interferometer 30 shown in FIG. 5. An optical circuit, which has an optical path from the optical splitter 1 to the optical coupler 5 via the optical splitter 2 and an optical path from the optical splitter 1 to the optical coupler 5 via the optical splitter 3, comprises the 1-symbol delay element and the zero phase shift element. That is, this optical circuit is equivalent of the interferometer 20 shown in FIG. 5. Thus, the optical DQPSK receiver apparatus shown in FIG. 18 performs substantially the same operations as the optical DQPSK receiver apparatus shown in FIG. 5.

Figure 19:
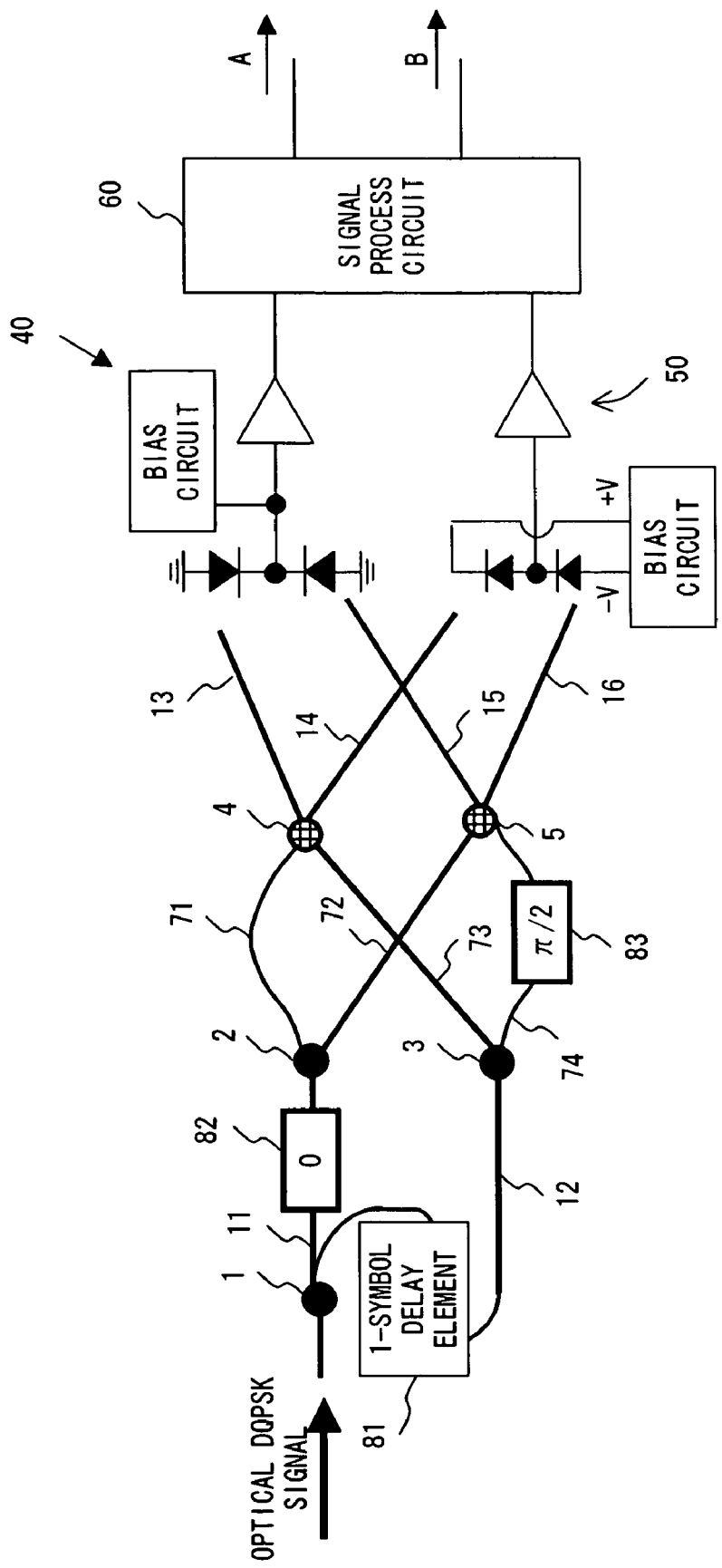

In the optical DQPSK receiver apparatus shown in FIG. 19, the 1-symbol delay element 81 is provided in the optical path 12, the zero phase shift element 82 is provided in the optical path 11, and the $\pi/2$ phase shift element 83 is provided in the optical path 74. Therefore, an optical circuit, which has an optical path from the optical splitter 1 to the optical coupler 4 via the optical splitter 2 and an optical path from the optical splitter 1 to the optical coupler 4 via the optical splitter 3, comprises the 1-symbol delay element and the zero phase shift element. That is, this optical circuit is equivalent of the interferometer 20 shown in FIG. 5. An optical circuit, which has an optical path from the optical splitter 1 to the optical coupler 5 via the optical splitter 2 and an optical path from the optical splitter 1 to the optical coupler 5 via the optical splitter 3, comprises the 1-symbol delay element and the $\pi/2$ phase shift element. In other words, this optical circuit is equivalent of the interferometer 30 shown in FIG. 5. Therefore, the optical DQPSK receiver apparatus shown in FIG. 19 performs substantially the same operations as the optical DQPSK receiver apparatus shown in FIG. 5.

Figure 20:
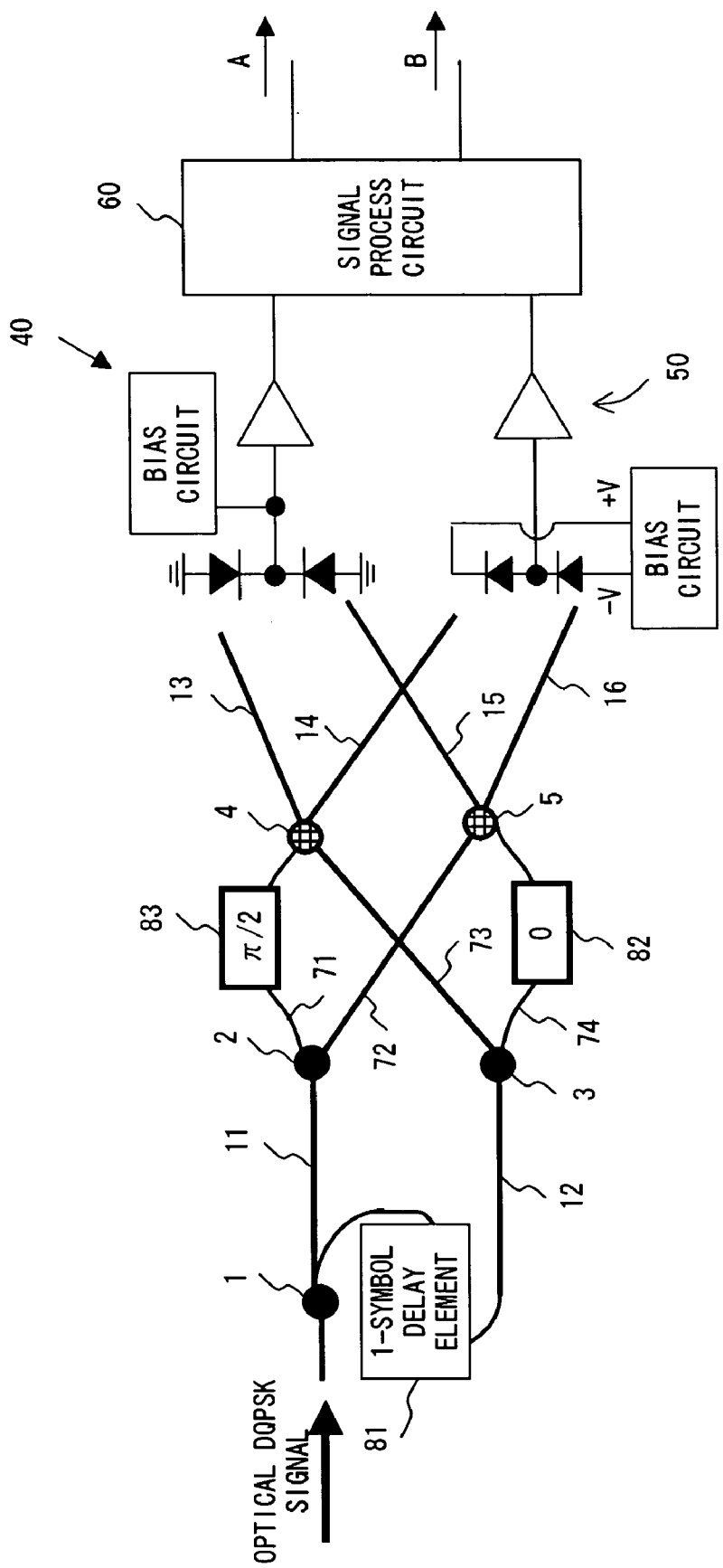

In the optical DQPSK receiver apparatus shown in FIG. 20, the 1-symbol delay element 81 is provided in the optical path 12, the zero phase shift element 82 is provided in the optical path 74, and the $\pi/2$ phase shift element 83 is provided in the optical path 71. Therefore, an optical circuit, which has an optical path from the optical splitter 1 to the optical coupler 4 via the optical splitter 2 and an optical path from the optical splitter 1 to the optical coupler 4 via the optical splitter 3, comprises the 1-symbol delay element and the $\pi/2$ phase shift element. That is, this optical circuit is equivalent of the interferometer 30 shown in FIG. 5. An optical circuit, which has an optical path from the optical splitter 1 to the optical coupler 5 via the optical splitter 2 and an optical path from the optical splitter 1 to the optical coupler 5 via the optical splitter 3, comprises the 1-symbol delay element and the zero phase shift element. In other words, this optical circuit is equivalent of the interferometer 20 shown in FIG. 5. Therefore, the optical DQPSK receiver apparatus shown in FIG. 20 performs substantially the same operations as the optical DQPSK receiver apparatus shown in FIG. 5.

Figure 21:
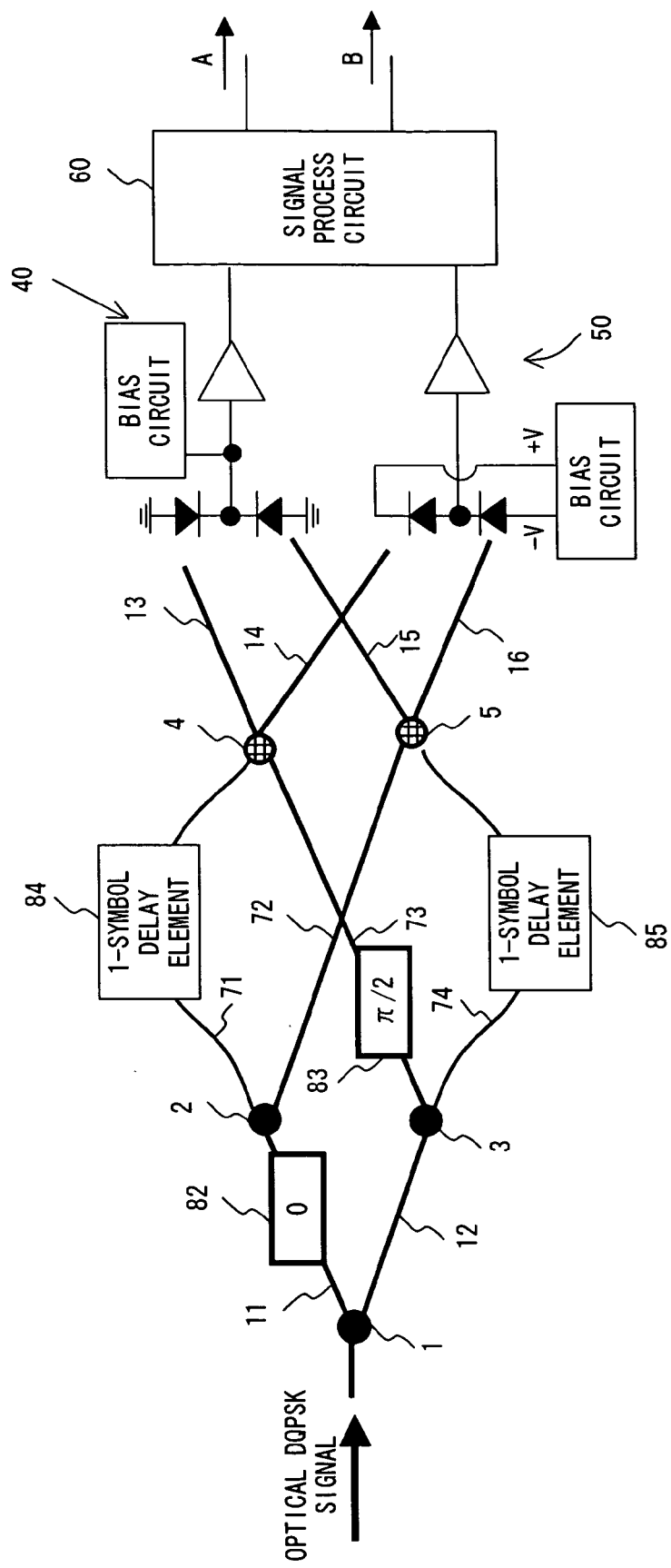

In the optical DQPSK receiver apparatus shown in FIG. 21, the 1-symbol delay elements 84 and 85 are provided in the optical paths 71 and 74, respectively, the zero phase shift element 82 is provided in the optical path 11, and the $\pi/2$ phase shift element 83 is provided in the optical path 73. Therefore, an optical circuit, which has an optical path from the optical splitter 1 to the optical coupler 4 via the optical splitter 2 and an optical path from the optical splitter 1 to the optical coupler 4 via the optical splitter 3, comprises the 1-symbol delay element and the $\pi/2$ phase shift element. That is, this optical circuit is equivalent of the interferometer 30 shown in FIG. 5. An optical circuit, which has an optical path from the optical splitter 1 to the optical coupler 5 via the optical splitter 2 and an optical path from the optical splitter 1 to the optical coupler 5 via the optical splitter 3, comprises the 1-symbol delay element and the zero phase shift element. In other words, this optical circuit is equivalent of the interferometer 20 shown in FIG. 5. Therefore, the optical DQPSK receiver apparatus shown in FIG. 21 performs substantially the same operations as the optical DQPSK receiver apparatus shown in FIG. 5.

Figure 22:
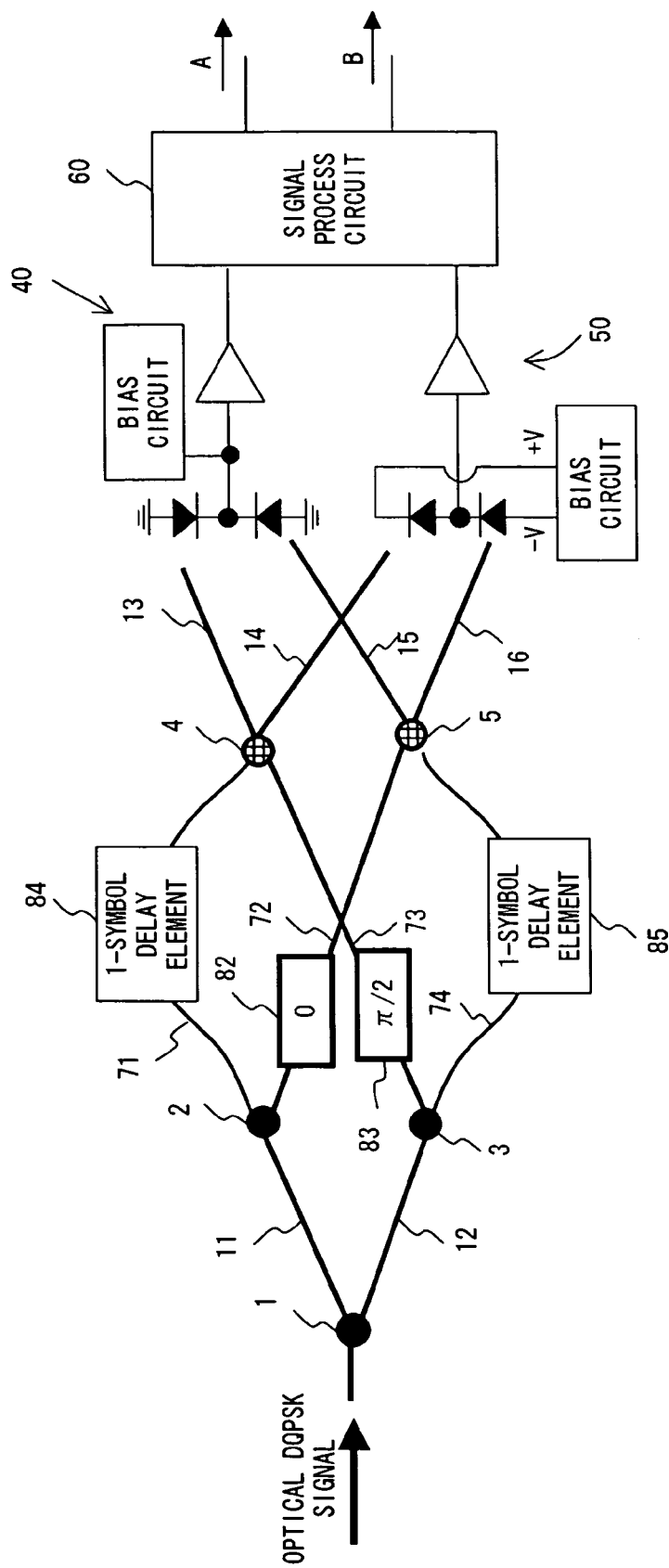

In the optical DQPSK receiver apparatus shown in FIG. 22, the 1-symbol delay elements 84 and 85 are provided in the optical paths 71 and 74, respectively, the zero phase shift element 82 is provided in the optical path 72, and the $\pi/2$ phase shift element 83 is provided in the optical path 73. Therefore, an optical circuit, which has an optical path from the optical splitter 1 to the optical coupler 4 via the optical splitter 2 and an optical path from the optical splitter 1 to the optical coupler 4 via the optical splitter 3, comprises the 1-symbol delay element and the $\pi/2$ phase shift element. That is, this optical circuit is equivalent of the interferometer 30 shown in FIG. 5. An optical circuit, which has an optical path from the optical splitter 1 to the optical coupler 5 via the optical splitter 2 and an optical path from the optical splitter 1 to the optical coupler 5 via the optical splitter 3, comprises the 1-symbol delay element and the zero phase shift element. In other words, this optical circuit is equivalent of the interferometer 20 shown in FIG. 5. Therefore, the optical DQPSK receiver apparatus shown in FIG. 22 performs substantially the same operations as the optical DQPSK receiver apparatus shown in FIG. 5.

Figure 23:
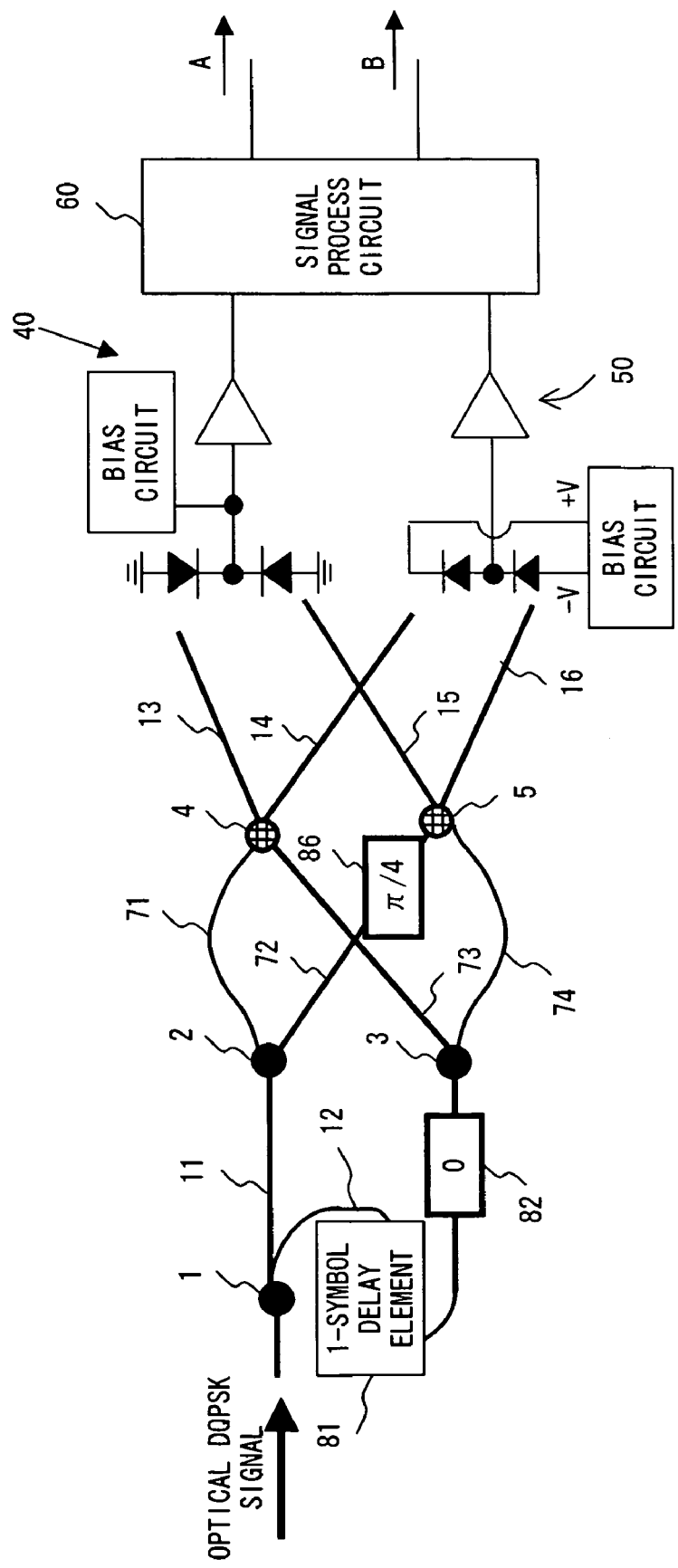
FIG. 23 is a diagram describing the sixth configuration of the optical DQPSK receiver apparatus of the first embodiment according to the present invention.

FIG. 23 is a diagram describing the sixth configuration of the optical DQPSK receiver apparatus of the first embodiment according to the present invention. The sixth configuration can be obtained by replacing the $\pi/2$ phase shift element 83 of the optical DQPSK receiver apparatus shown in FIG. 16 with the $\pi/4$ phase shift element 86. Therefore, the optical DQPSK receiver apparatus of the sixth configuration is equivalent of the optical DQPSK receiver apparatus in FIG. 11.

Second Embodiment

The optical DQPSK receiver apparatus of the first embodiment shown in FIG. 5 etc. comprises photo detector circuits 40 and 50 in the latter stage of the optical circuit (interferometer 20 or 30). The photo detector circuit 40 comprises photodiodes 41 and 42, and outputs a signal indicating a sum of the current corresponding to the first optical output from the interferometer 20 and the current corresponding to the first optical output from the interferometer 30. The photo detector circuit 50 comprises photodiodes 51 and 52, and outputs a signal indicating a difference of the current corresponding to the second optical output of the interferometer 20 and the current corresponding to the second optical output of the interferometer 30. Transmission data is recovered based on the combination of the outputs of the photo detector circuits 40 and 50.

The optical circuit of the optical DQPSK receiver apparatus of the second embodiment is the same as that of the first embodiment. However, the photo detector circuit of the optical DQPSK receiver apparatus of the second embodiment is different from that of the first embodiment. In the following description, the second embodiment is explained with reference to the drawings.

Figure 24:
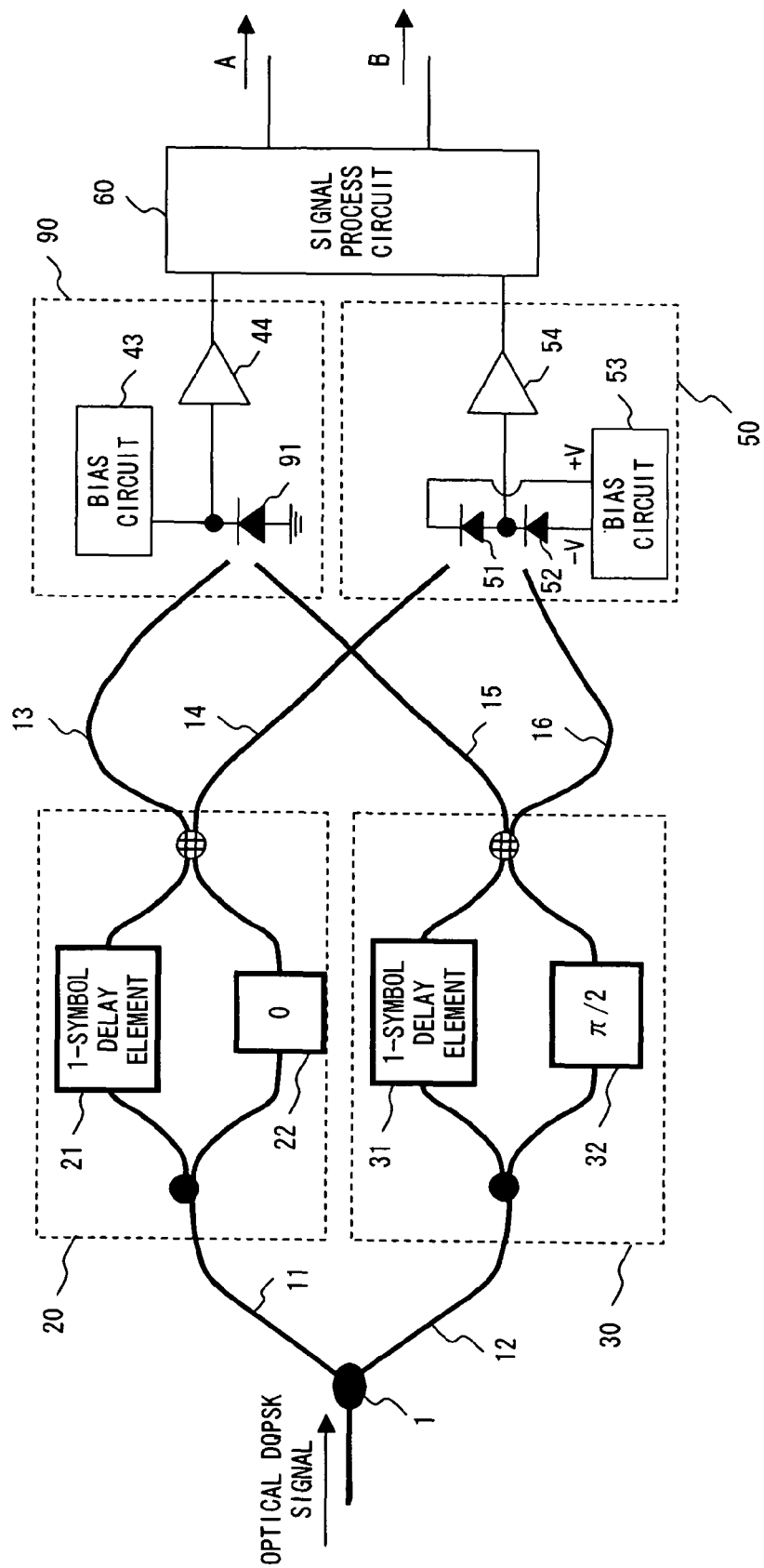
FIG. 24 is a diagram showing the first configuration of the optical DQPSK receiver circuit of the second embodiment according to the present invention.

FIG. 24 is a diagram showing the first configuration of the optical DQPSK receiver circuit of the second embodiment according to the present invention. The optical circuit (interferometers 20 and 30) of the optical DQPSK receiver apparatus shown in FIG. 24 is the same as the first configuration of the first embodiment shown in FIG. 5. However, in the optical DQPSK receiver apparatus of the second embodiment, a photo detector circuit 90 is provided instead of the photo detector circuit 40 of the first embodiment. The photo detector circuit 50 and the signal process circuit 60 are basically the same in the first and the second embodiments.

The photo detector circuit 90 comprises a photodiode 91, the bias circuit 43, and the amplifier 44. The bias circuit 43 applies bias voltage to the photodiode 91. The amplifier 44 converts, for example, the current generated by the photodiode 91 into a voltage signal.

Both an optical signal output from the interferometer 20 to the optical path 13 and an optical signal output from the interferometer 30 to the optical path 15 are provided to the photodiode 91. Here, a pair of these optical signals is incident on the photodiode 91 with less interference between them. The pair of the signals is incident, for example, on the different positions on the optical receiver surface of the photodiode 91. This configuration is described in, for example, Japanese Patent Laid-open Application No. H11-163793. Or, the optical input to the optical DQPSK receiver apparatus may be linearly polarized, and a pair of the optical signals is incident on the photodiode 91 while the polarization directions of the signals transmitted to the optical paths 13 and 15 are rotated by 90 degrees. In addition, before the optical signals from the optical path 13 and the optical path 15 are combined, by passing at least one optical signal through a medium with a state of a sufficient number of random phases over the beam area, an interfere effect can be averaged out. Or, the interfere effect can be averaged out by the incidence of the optical signals output from the optical paths 13 and 15 on the photo detector surface of the photodiode 91 with incident angles sufficiently different from each other.

The photodiode 91 outputs a sum of the current corresponding to each optical signal when a pair of optical signals is provided as explained above. Therefore, the operations of the photo detector circuit 90 are the same as the photo detector circuit 40 of the first embodiment. In other words, the operations of the optical DQPSK receiver apparatus shown in FIG. 24 are the same as the operations shown in FIG. 7.

As described above, the optical DQPSK receiver apparatus of the second embodiment, compared with the optical DQPSK receiver apparatus of the first embodiment, has a difference in the configuration of the photo detector circuit; however, others are the same in both apparatuses. The optical DQPSK receiver apparatus of the second configuration has the following advantage, compared with the optical DQPSK receiver apparatus.

The optical DQPSK receiver apparatus of the first embodiment requires four photodiodes (41, 42, 51 and 52); however, the optical DQPSK receiver apparatus of the second embodiment can realize the photo detector circuit with three photodiodes (91, 51 and 52). Here, assume that the optical DQPSK receiver apparatus receives high-speed data (for example, several ten Gbps), these photodiodes are very expensive. Therefore, reduction of the number of photodiodes greatly contributes low cost of the optical DQPSK receiver apparatus. Compared with the configuration in which the photodiodes are connected in parallel with each other, capacity of one photodiode is small, and therefore, improvement in the high-frequency characteristics is expected.

Figure 25:
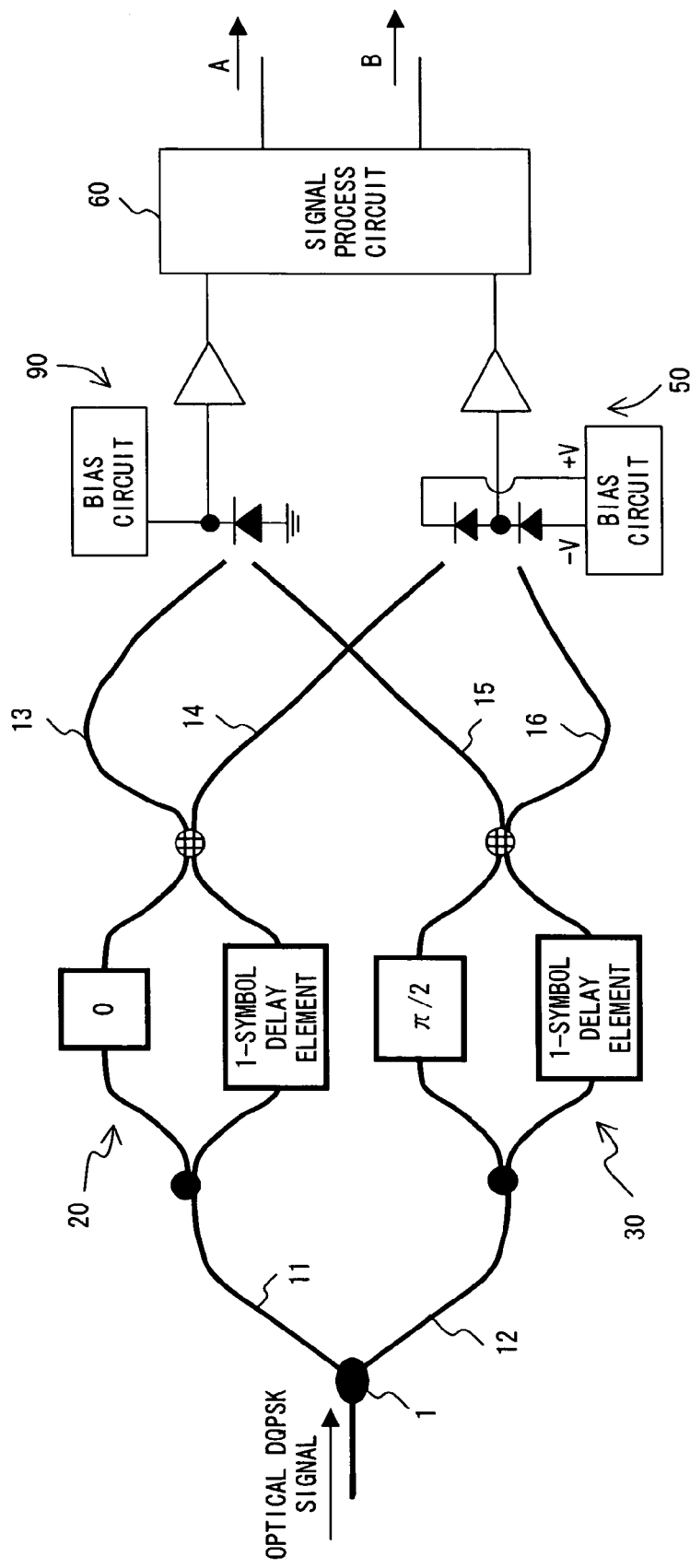
FIG. 25 is a diagram describing a second configuration of the optical DQPSK receiver apparatus of the second embodiment.

FIG. 25 is a diagram describing a second configuration of the optical DQPSK receiver apparatus of the second embodiment. This optical DQPSK receiver apparatus can be implemented by replacing the photo detector circuit 40 of the optical DQPSK receiver apparatus show in FIG. 9 with the photo detector circuit 90. Therefore, the operations of the optical DQPSK receiver apparatus are basically as explained with reference to FIG. 10.

Figure 26:
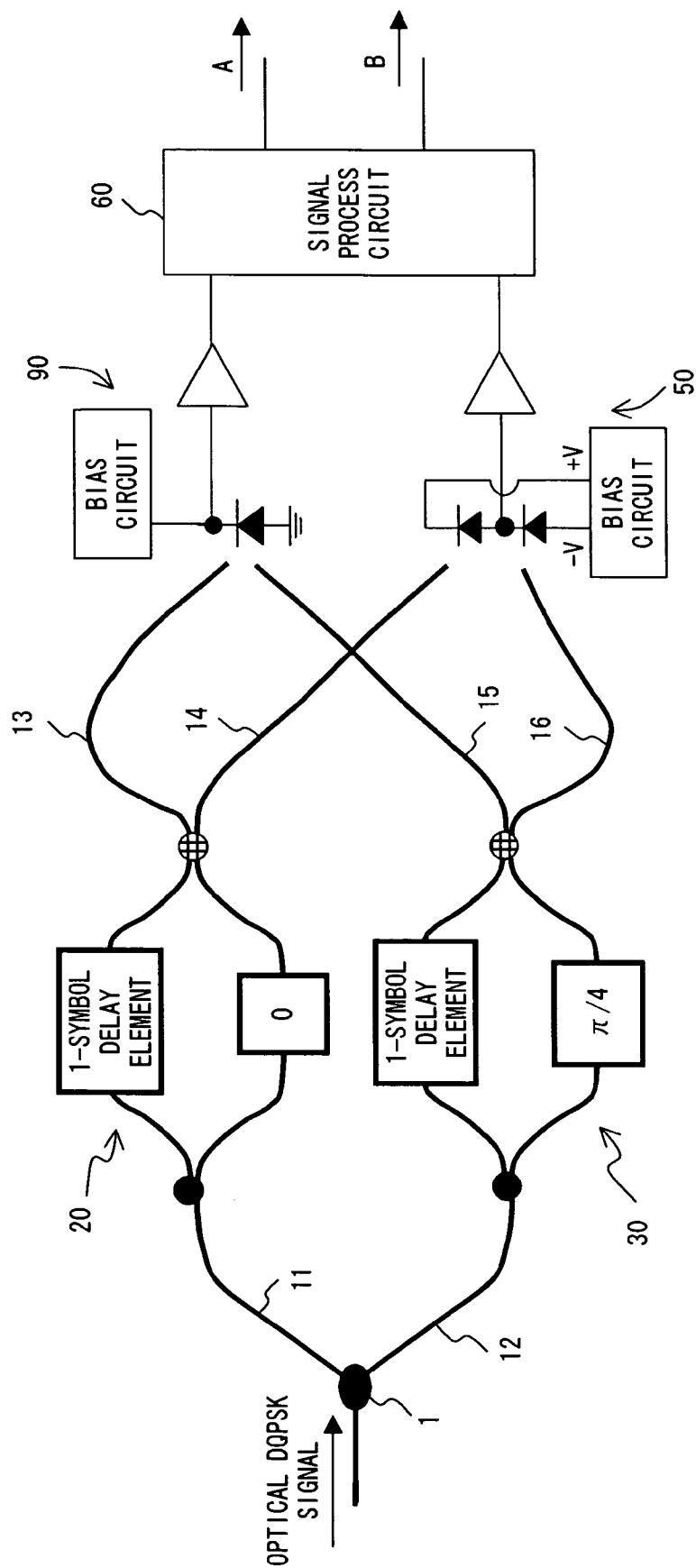
FIG. 26 is a diagram describing a third configuration of the optical DQPSK receiver apparatus of the second embodiment.
Figure 27:
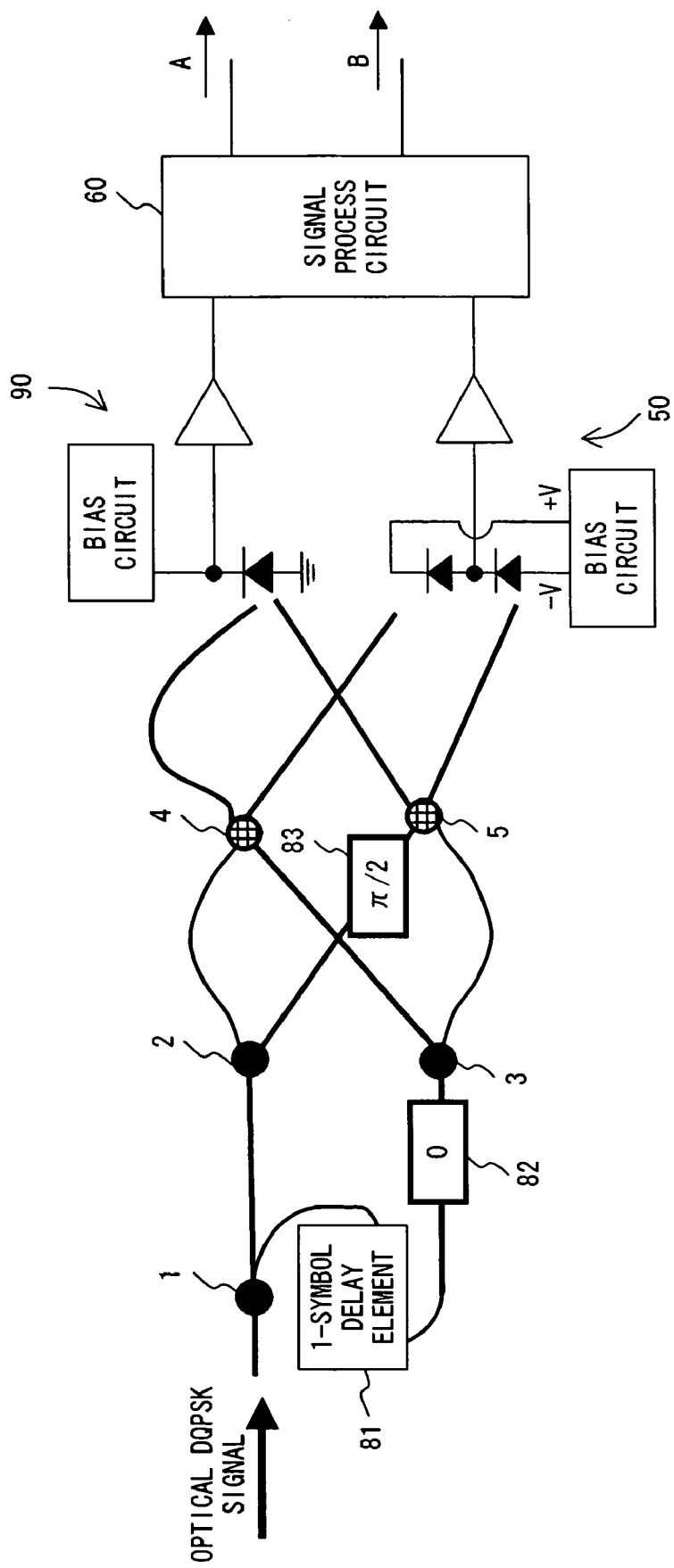
FIG. 27 to FIG. 34 are diagrams showing a fourth configuration of the optical DQPSK receiver apparatus of the second embodiment.
Figure 28:
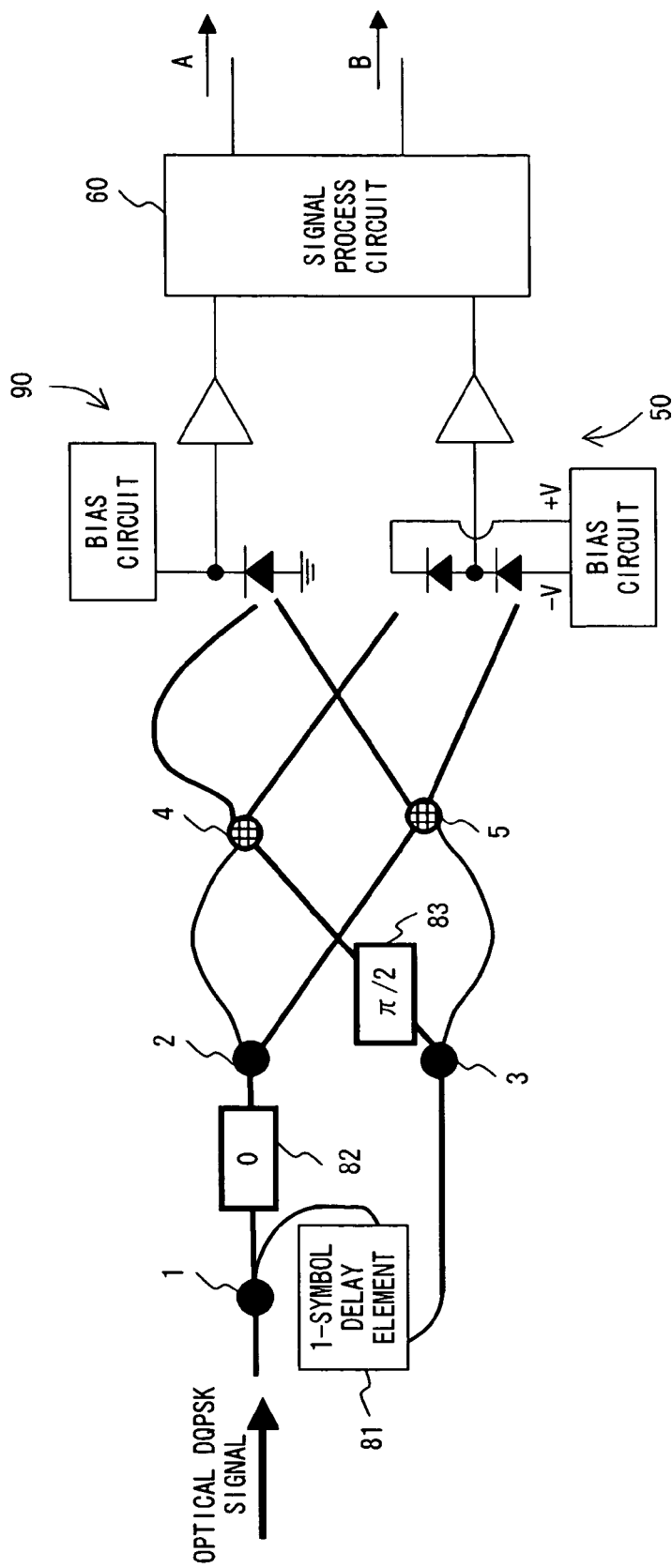
Figure 29:
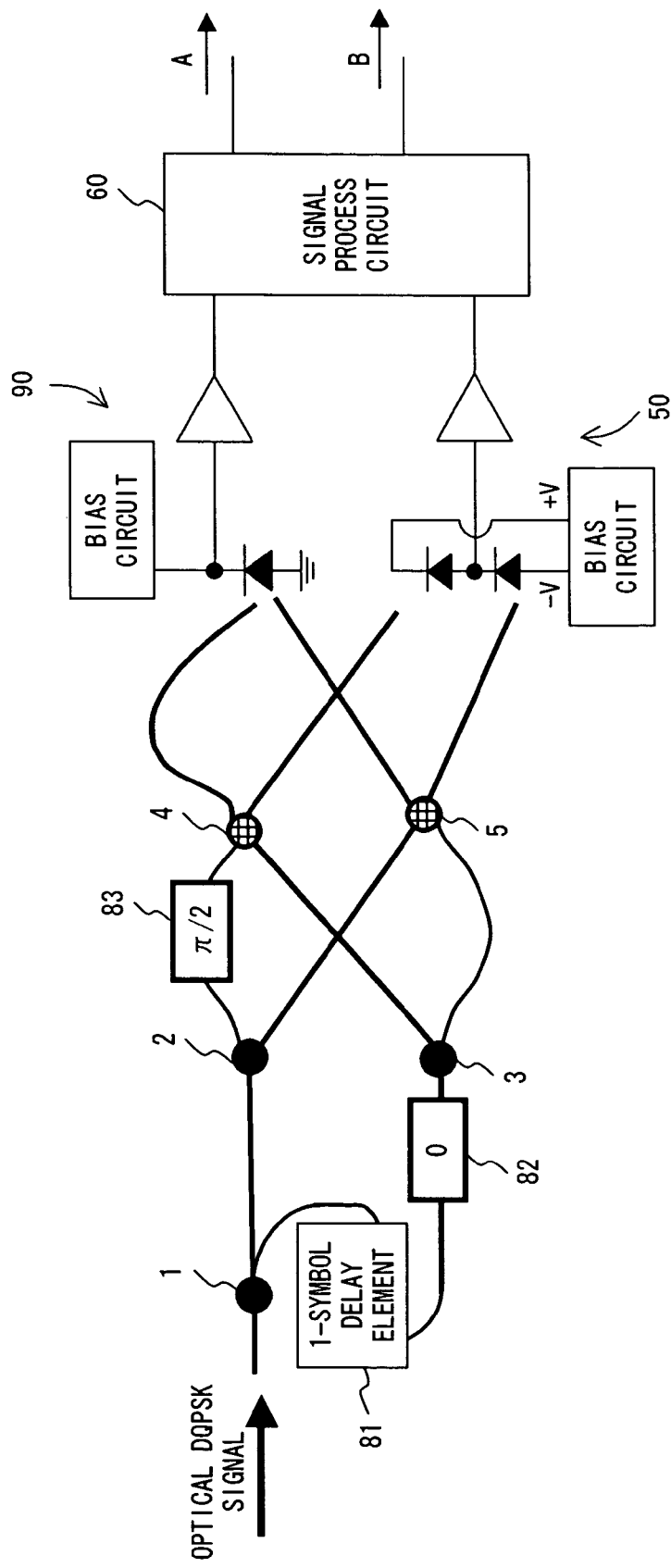
Figure 30:
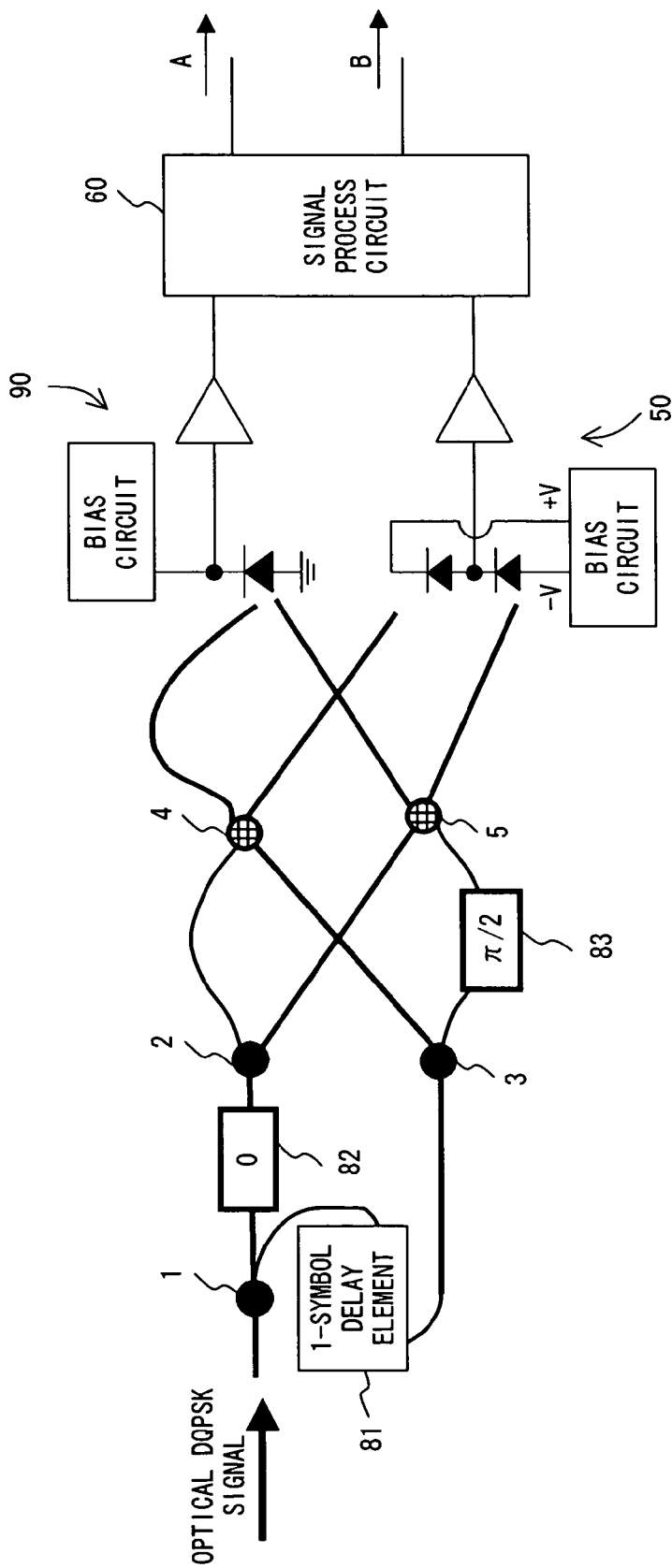
Figure 31:
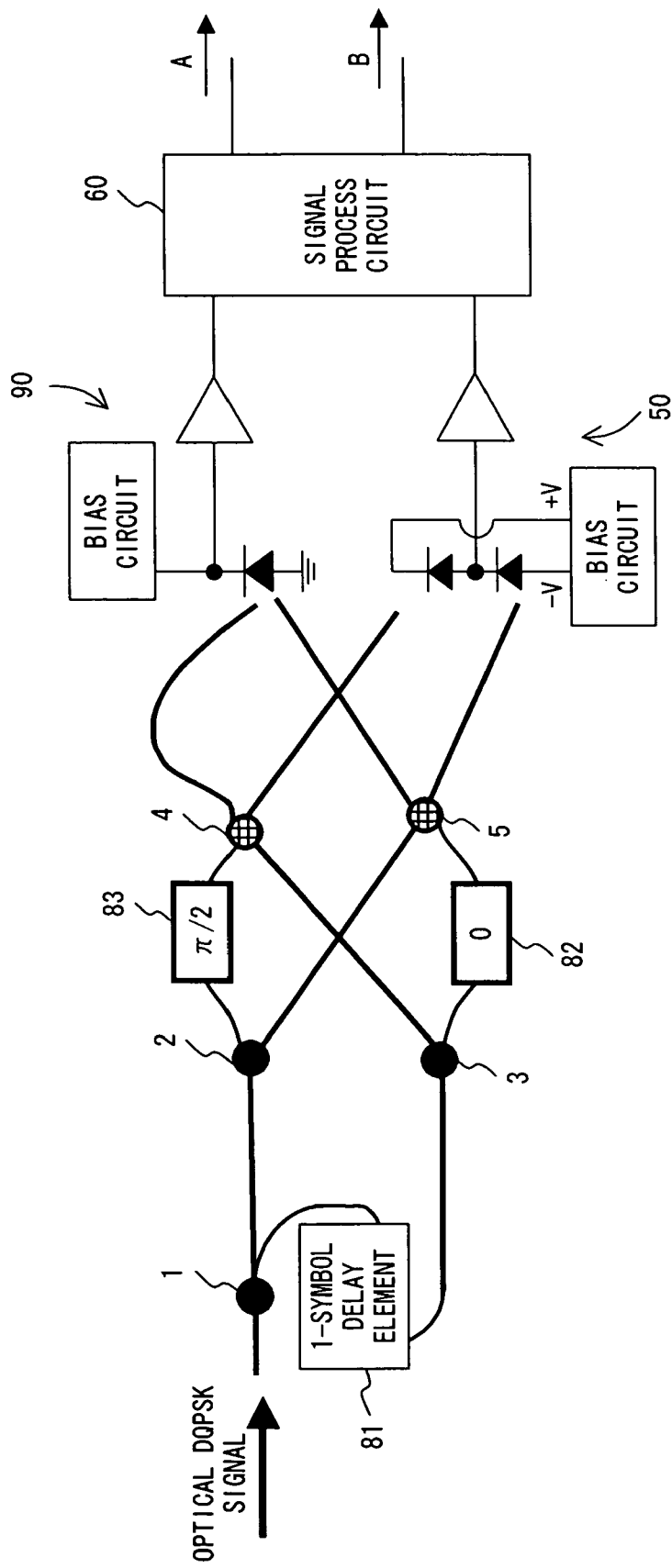
Figure 32:
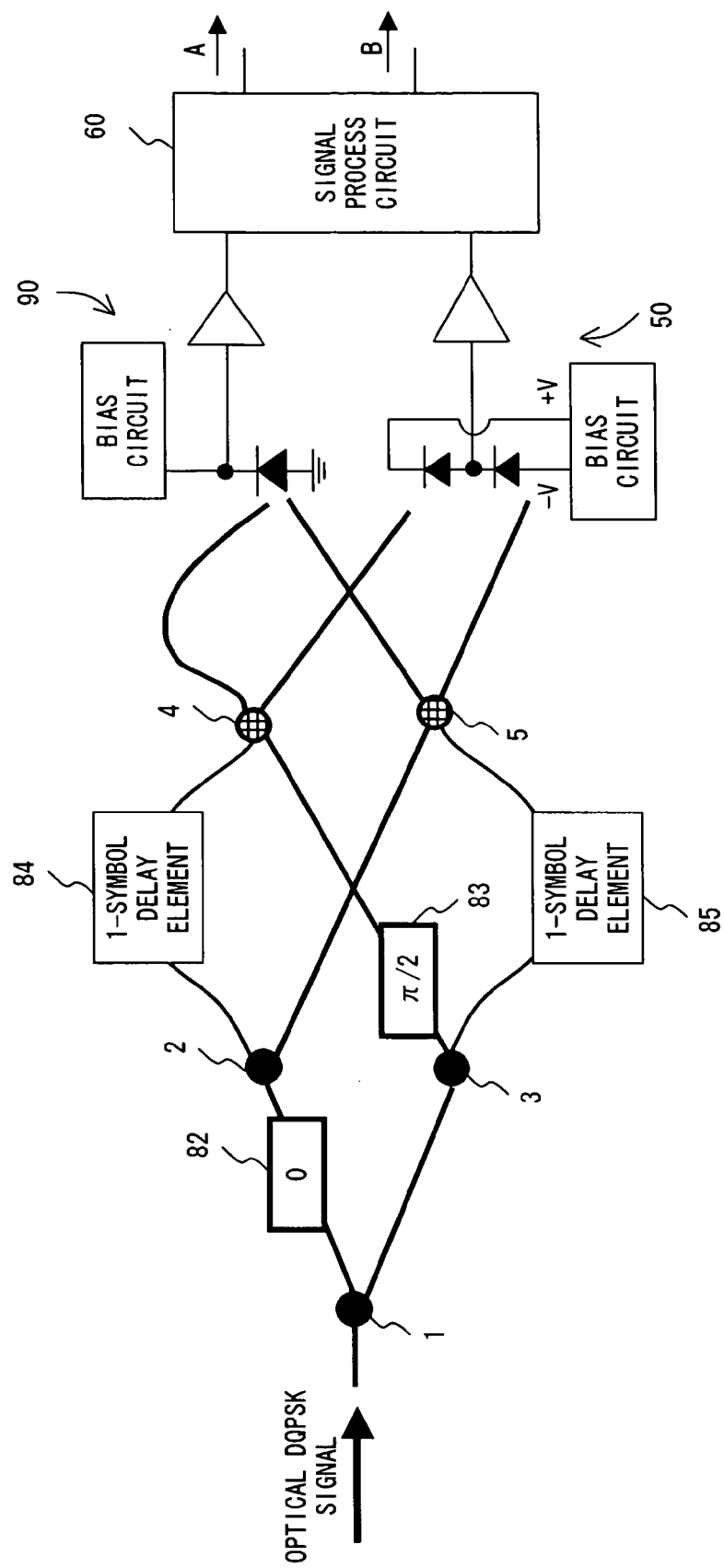
Figure 33:
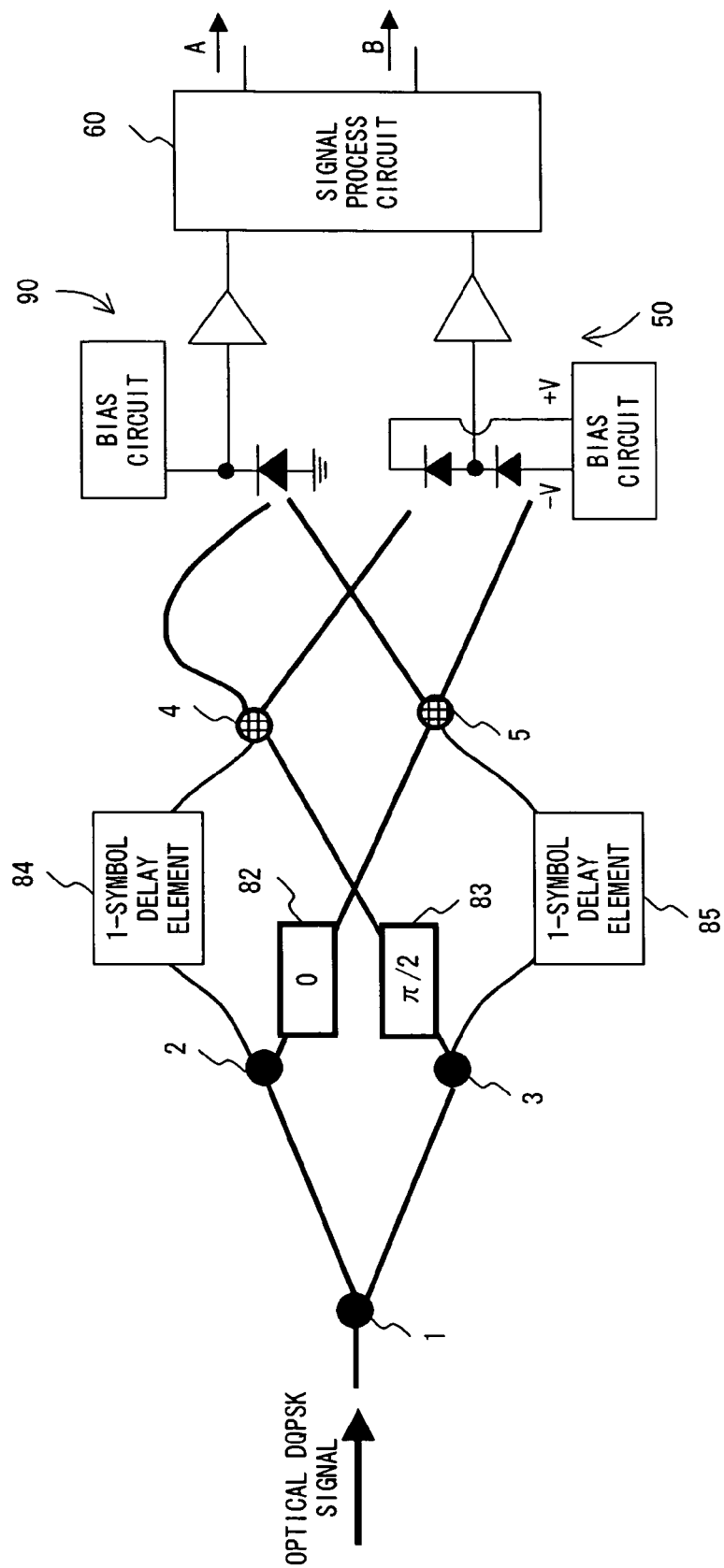
Figure 34:
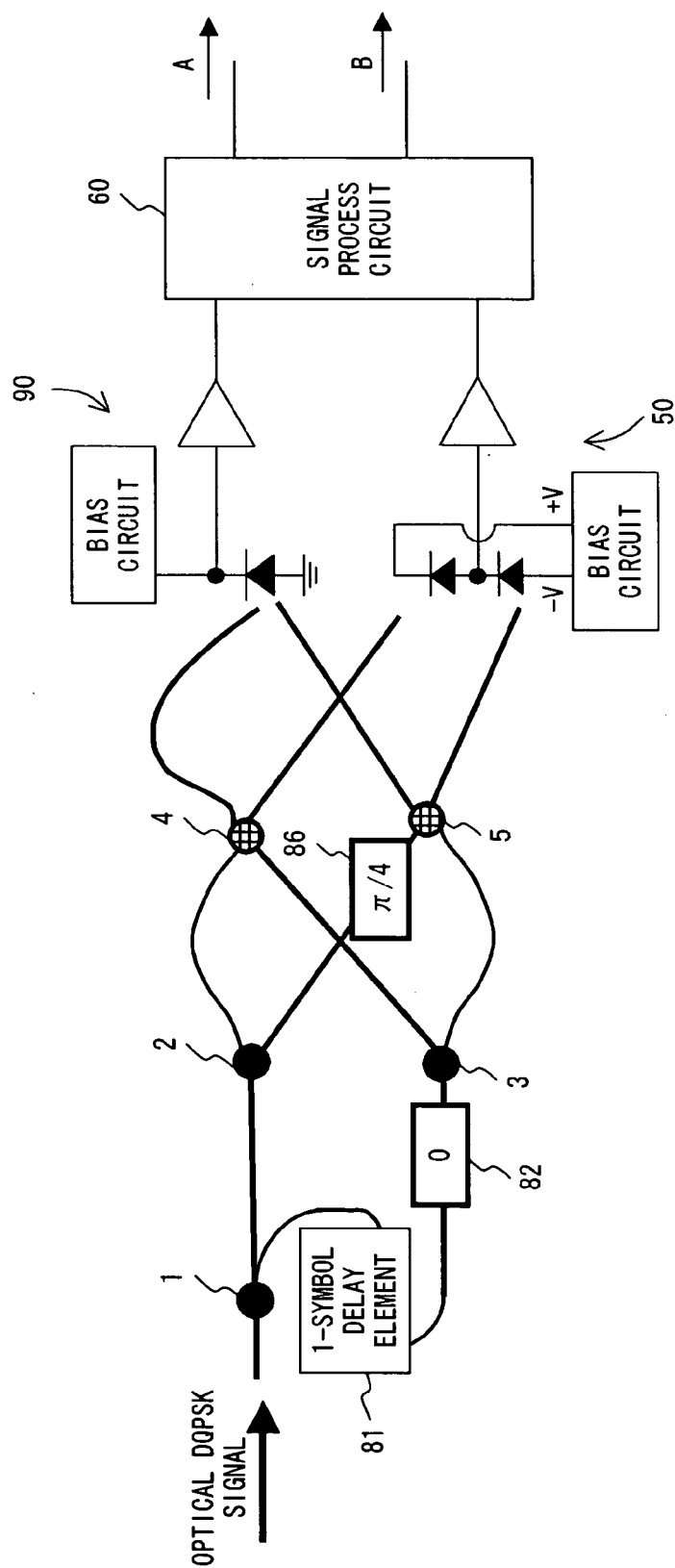

FIG. 26 is a diagram describing a third configuration of the optical DQPSK receiver apparatus of the second embodiment. This optical DQPSK receiver apparatus can be implemented by replacing the photo detector circuit 40 of the optical DQPSK receiver apparatus shown in FIG. 11 with the photo detector circuit 90. Therefore, the operations of the optical DQPSK receiver apparatus is, basically, the same as explained with reference to FIG. 12. Note that, although it is not shown in particular, in the optical DQPSK receiver apparatus shown in FIG. 26, if the $\pi/4$ phase shift element 33 is replaced with the $\pi/4$ phase shift element 34, substantially the same operations as the optical DQPSK receiver apparatus shown in FIG. 13 can be obtained. Thus, in the second embodiment, the difference in the amount of phase shift in the interferometers 20 and 30 changes in a range from $\pi/4$ to $3\pi/4$, transmission data can be recovered.

FIG. 27 to FIG. 34 are diagrams showing the fourth configuration of the optical DQPSK receiver apparatus of the second embodiment. Each of these optical DQPSK receiver apparatus can be implemented by replacing the photo detector circuit 40 of the optical DQPSK receiver apparatus shown in FIG. 16 to FIG. 23 with the photo detector circuit 90.

In the first and the second embodiments, each phase shift element (22, 32, 33, 34, 82, 83, 86), for example, is configured as a part of an optical path (including optical waveguide, and optical fiber). The amount of phase shift of each phase shift element is adjusted by changing the optical path length of the optical path.

Figure 35:
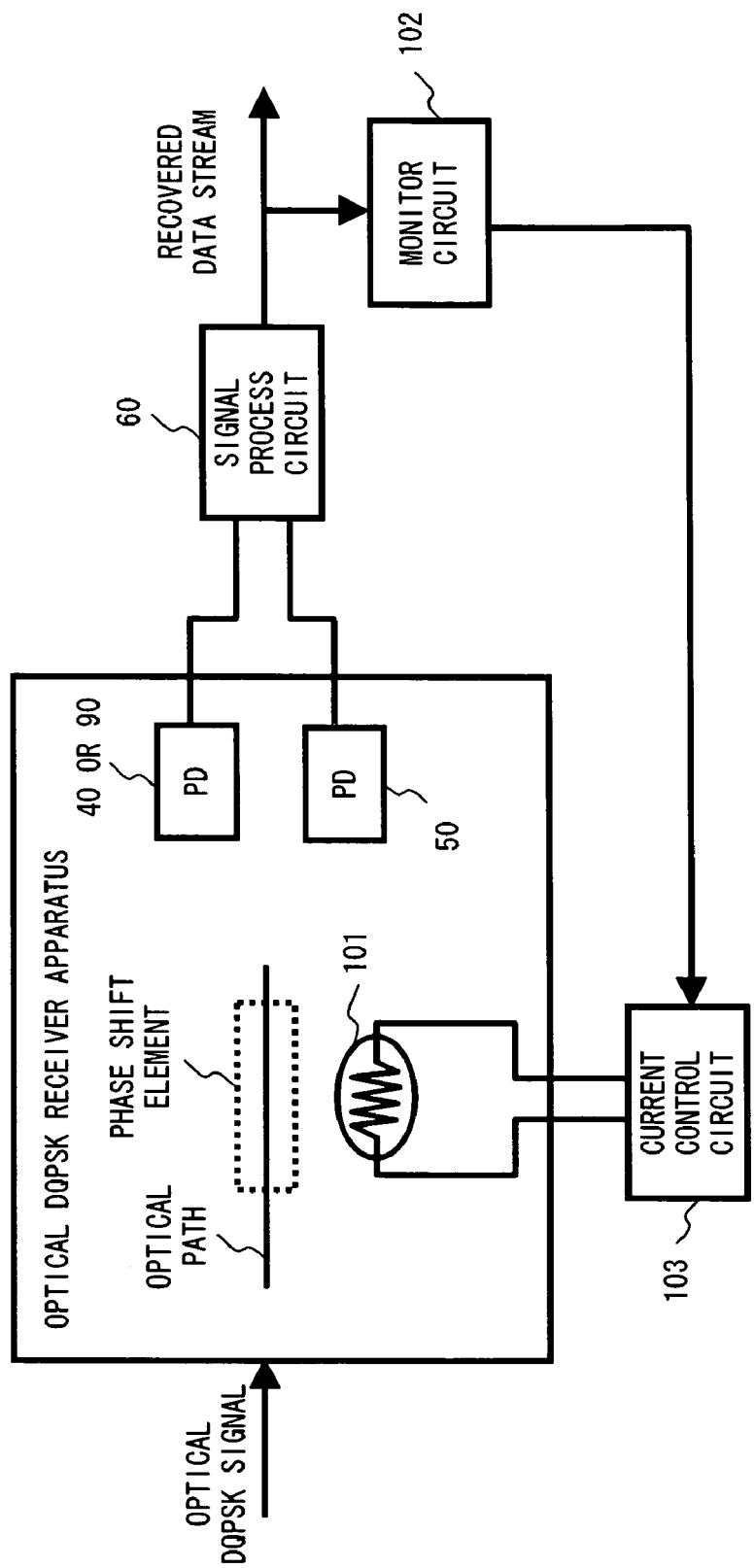
FIG. 35 is a diagram explaining the adjustment of the phase shift element.
Figure 36:
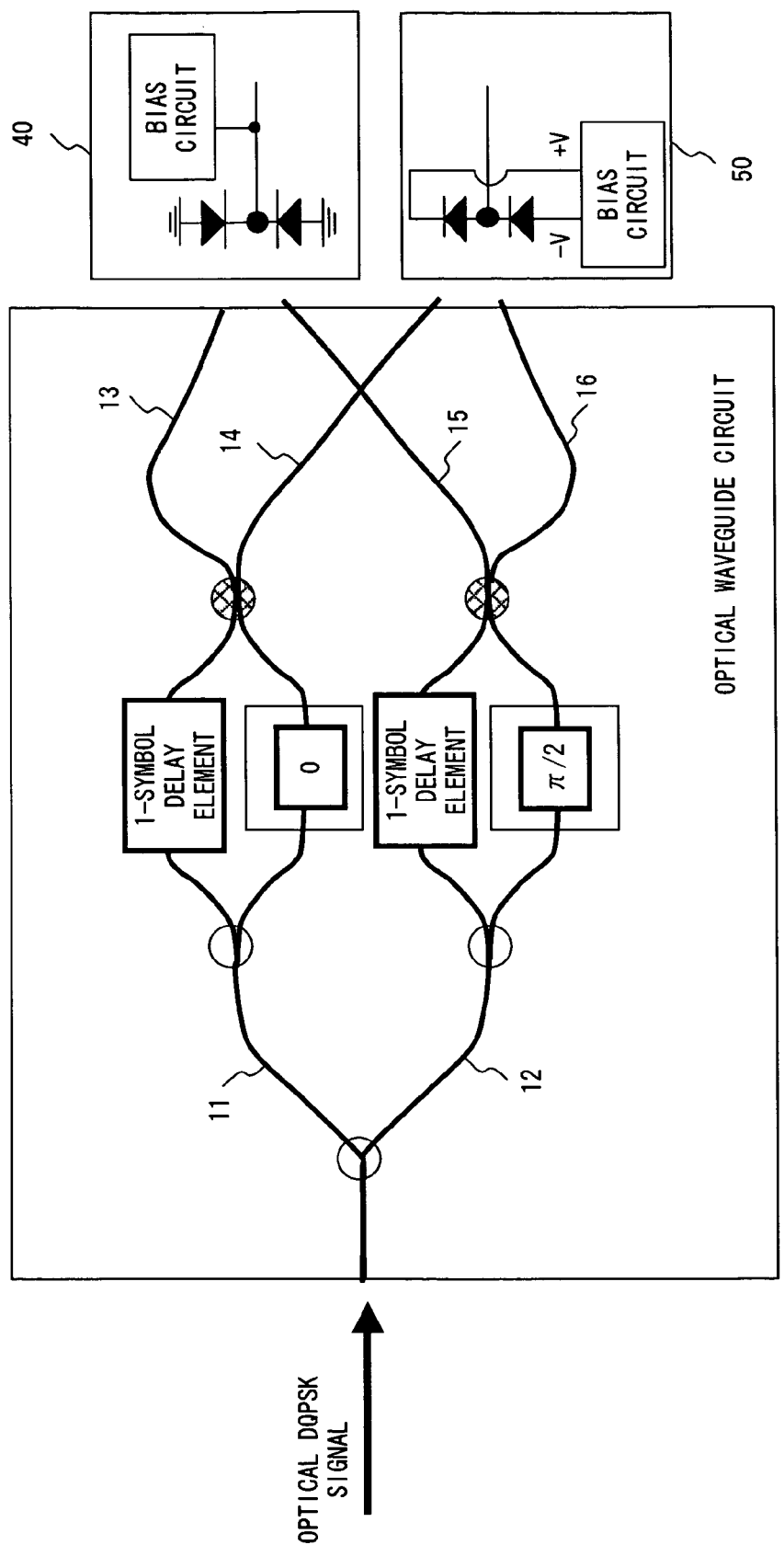
Figure 38:
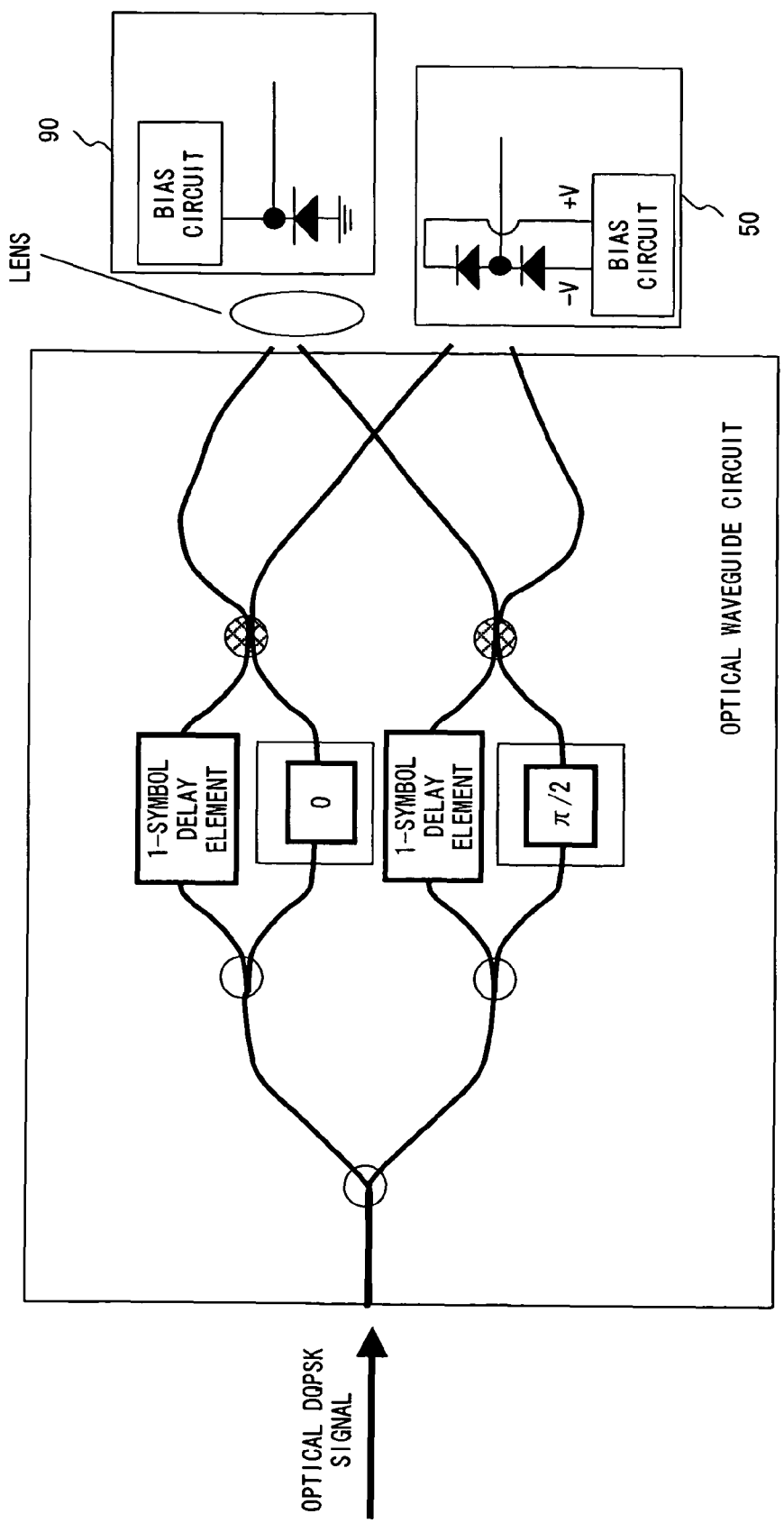
Figure 39:
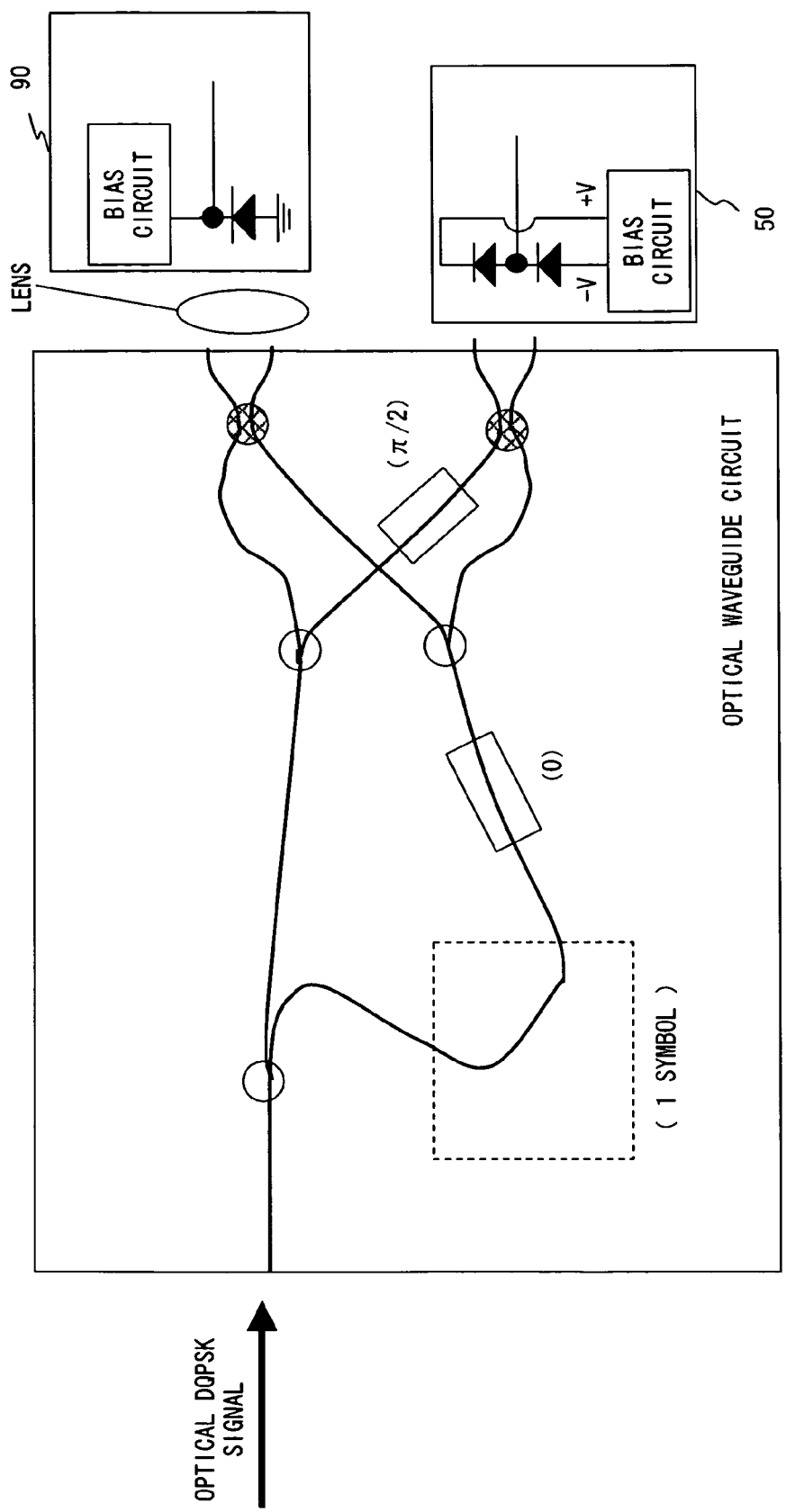

FIG. 35 is a diagram explaining the adjustment of the phase shift element. This drawing shows a feedback system for adjusting an optical path length of the phase shift element by using thermal change. In such a case, an adjustment element 101 is, for example, a heater generating heat by applying the current to a resistance. The adjustment element 101 is arranged in proximity to the corresponding phase shift element. A monitor circuit 102 monitors bit error rate of data stream output from the signal process circuit 60. At this point, if the optical path length (i.e. the amount of phase shift) of each phase shift element is appropriately adjusted, the error rate should be low. Thus, the monitor circuit 102 generates a command to lower the bit error rate of the recovered data stream. A current control circuit 103 controls current passing through the adjustment element 101 according to the command from the monitor circuit 102. By so doing, the optical path length of each phase shift element is optimized, and bit error rate of the recovered data steam is reduced. It should be noted that a control system for adjusting the phase shift element is practically useful; however, it is not required configuration for implementation of the present invention.

The adjustment element 101 is able to adjust the optical path length of the corresponding optical path by utilizing the thermal change in the volume and the refractive index of the optical path medium. In such a case, the adjustment element 101 can be realized by, for example, a heater using electrical resistance, a Peltier element, or a light irradiating element. The adjustment element 101 may adjust the optical path length of the corresponding optical path by electro-optical effect or refractive index change with respect to change of electron density in the semiconductor material. The adjustment element 101 is, for example, realized by a circuit for adjusting the refractive index of the corresponding optical path by using the electro-optical effect.

Also, in addition to the phase shift element, delay time of the 1-symbol delay element can be adjusted using the same method.

The optical circuit of the optical DQPSK receiver apparatus of the first and the second embodiments can be implemented by a two-dimensional optical waveguide circuit. The two-dimensional optical waveguide circuit is formed on the surface of approximate plain of the optical waveguide substrate. In the configuration shown in FIG. 5 etc., the optical paths 11-16, and interferometers 20 and 30 are formed by the two-dimensional optical waveguide circuit. In the configuration shown in FIG. 16 etc., optical splitters 1-3, the optical couplers 4 and 5, the optical paths 11-16, 71-74, the delay element, and the phase shift element are formed by two-dimensional optical waveguide circuit. If the optical DQPSK receiver apparatus is realized by the two-dimensional optical waveguide circuit, reduction in the size of the apparatus can be achieved.

Each of the optical DQPSK receiver apparatus shown in FIG. 36, FIG. 37, FIG. 38 and FIG. 39 has a configuration equivalent to the optical DQPSK receiver apparatus shown in FIG. 5, FIG. 16, FIG. 24 and FIG. 27. It should be noted that when realizing the optical DQPSK receiver apparatus of the embodiment is implemented by the two-dimensional optical waveguide, the optical paths 14 and 15 intersect on the same plane. However, a technology to avoid interference of the optical signal transmitted via the intersecting two optical waveguides is known to the public (for example, see Japanese Patent Published Application No. 2001-343542, Japanese Patent Published Application No. S57-88410, and Japanese Patent No. 3201554). In the configuration shown in FIG. 38 and FIG. 39, it is desirable to comprise a lens for adjusting a beam of the optical signal incident on the photodiode of the photo detector circuit 90.

PRACTICAL EXAMPLE

Figure 1:
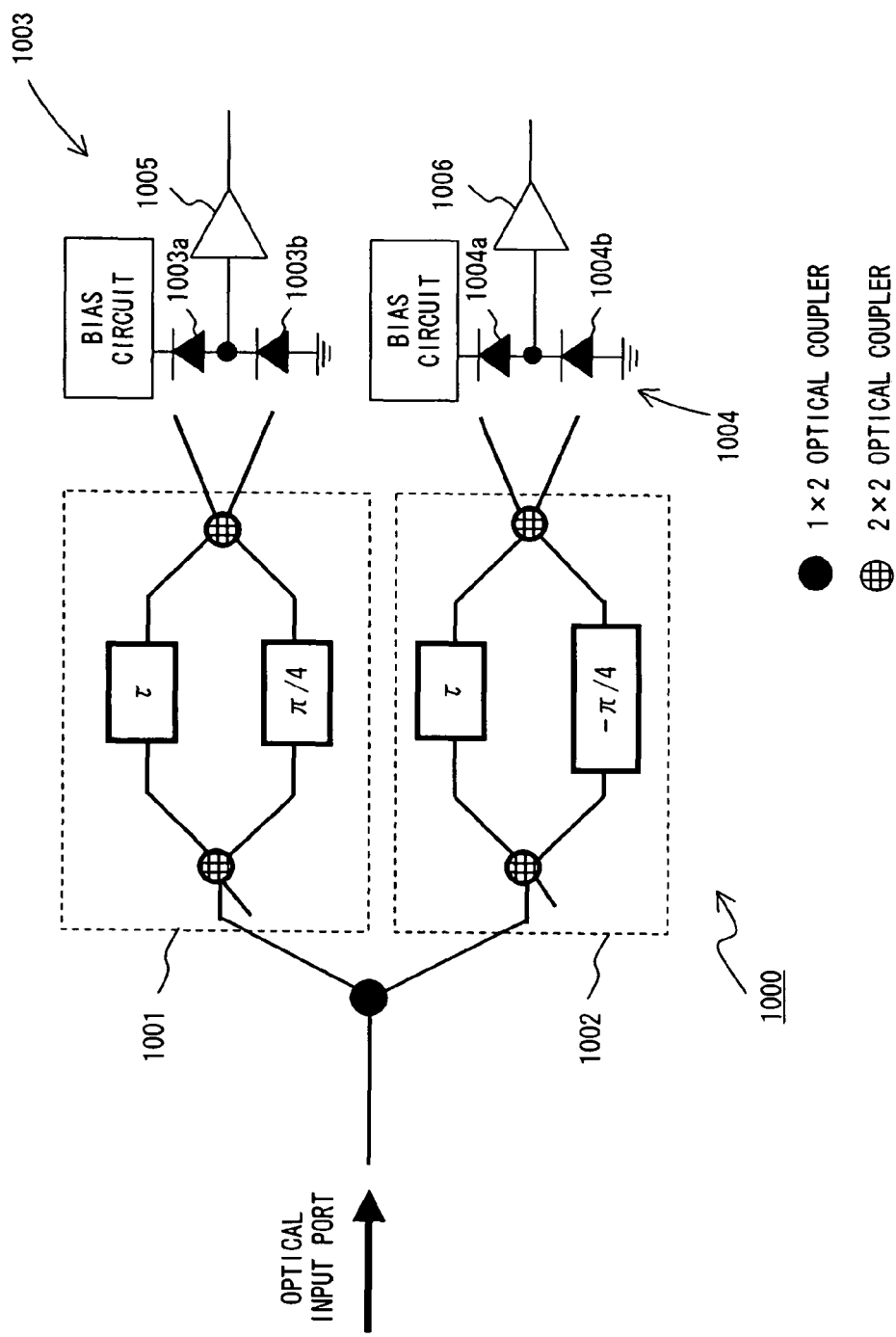
FIG. 1 is a diagram describing the configuration of an existing optical DQPSK receiver apparatus.
Figure 3:
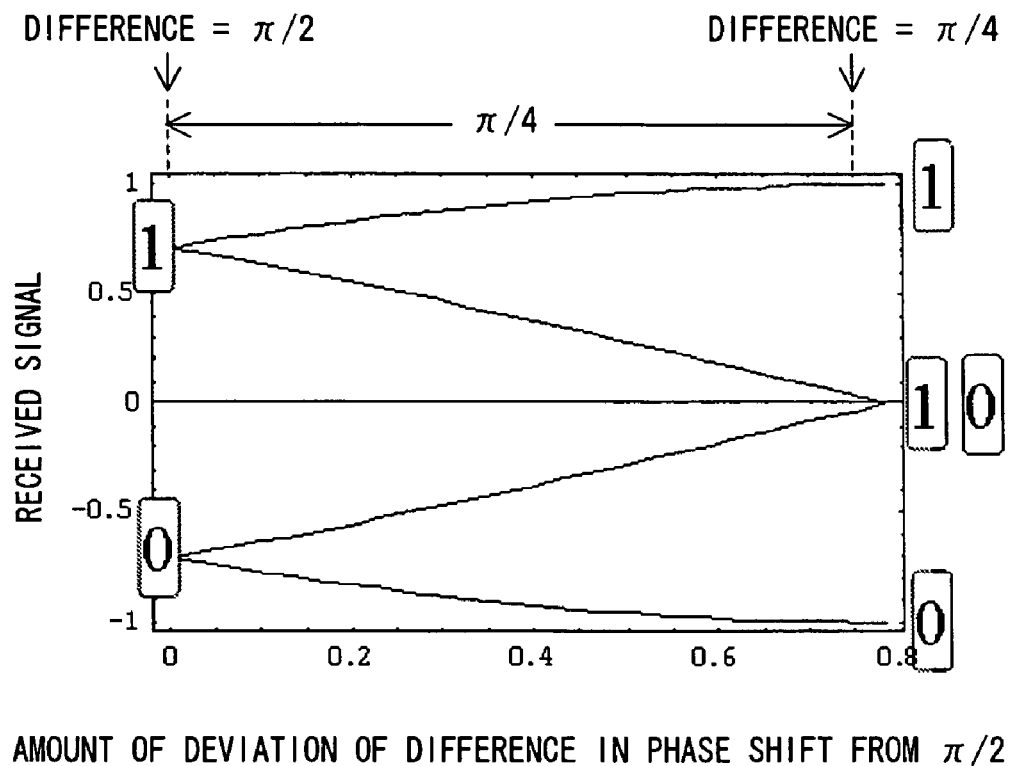
FIG. 3 is a diagram showing a relation between the difference in the amount of phase shift of a pair of interferometers and the recovered signal.
Figure 40A:
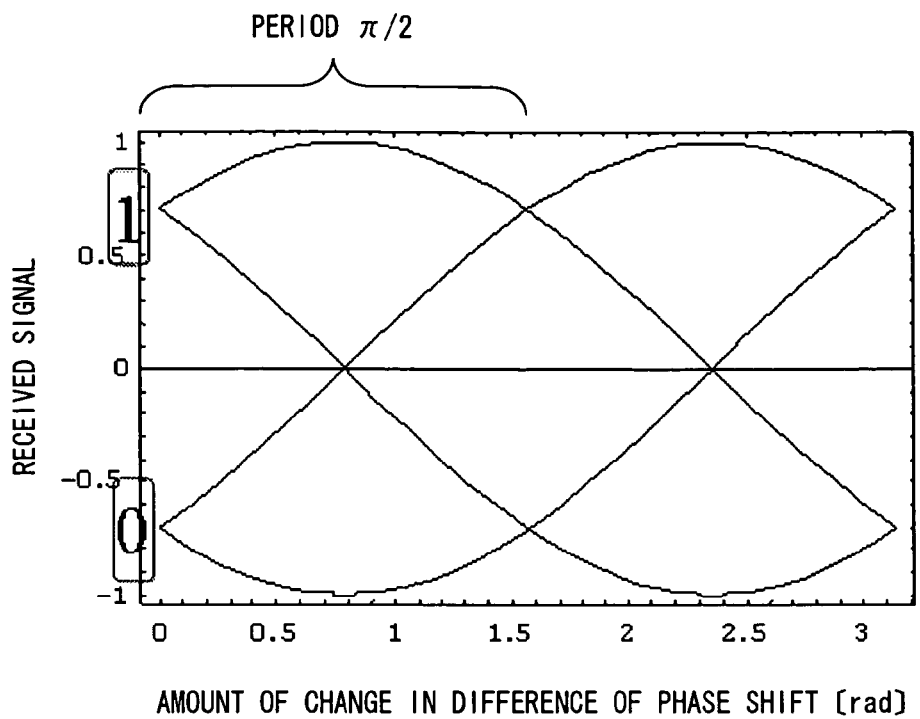
FIGS. 40A and 40B are diagrams showing a relation between the difference in the amount of phase shift in a pair of interferometers and the decision characteristics.

FIG. 40A is a diagram showing a relation between the difference in the amount of phase shift in a pair of interferometers and the decision characteristics in the conventional optical DQPSK receiver apparatus shown in FIG. 1. The decision characteristic of the optical DQPSK receiver apparatus changes periodically with respect to change in the difference of the amount of phase shift of a pair of interferometers. In the conventional optical DQPSK receiver apparatus, the period is $\pi/2$. Thus, when the difference in the amount of phase shift of a pair of interferometers deviates from the optimal value "$\pi/2$" due to the change in the amount of phase shift of the phase shift element, degradation of the signal decision characteristic is sharp. In other words, the amount of phase shift of each phase shift element must be adjusted in high accuracy to recover transmission data.

Figure 40B:
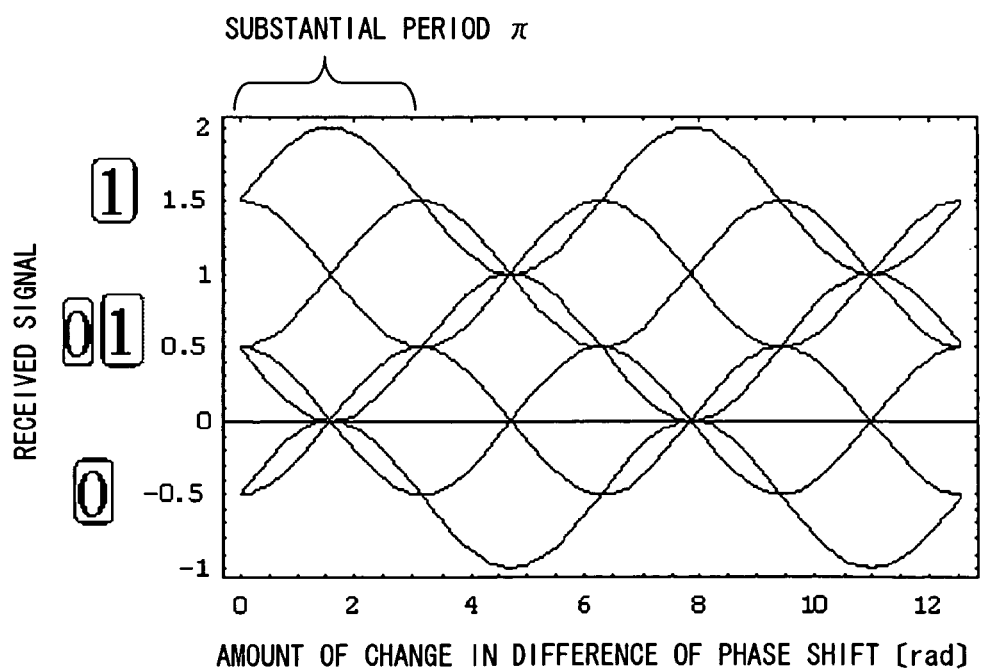

FIG. 40B is a diagram showing a relation between the difference in the amount of phase shift in a pair of interferometers and the decision characteristics in the optical DQPSK receiver apparatus of the present embodiment. In the optical DQPSK receiver apparatus of the embodiment, the period of changes in decision characteristics is $\pi$. Thus, when the difference in the amount of phase shift of a pair of interferometers deviates from the optimal value "$\pi/2$", degradation of the signal decision characteristic is moderate. In other words, even if the amount of phase shift of each phase shift element is not adjusted in high accuracy, transmission data can be recovered.

FIG. 41 to FIG. 46 are diagrams showing an output signal of the photo detector circuit when the amount of phase shift of the phase shift element changes. The horizontal axis of each drawing represents the phase difference between symbols of the input optical DQPSK signal. Here, there are first through fourth states (that is, the phase difference=0, $\pi/2$, $\pi$, or $3\pi/2$) as the state of input signal. The vertical axis represents the output level of the photo detector circuit.

The appropriate value of the difference in the amount of phase shift of the interferometers 20 and 30 is "$\pi/2$". In this example, assume that the appropriate value of the amount of phase shift of the phase shift element 22 of the interferometer 20 is "0", and the appropriate value of the amount of phase shift of the phase shift element 32 of the interferometer 30 is "$\pi/2$". A threshold for determining the logical value of the output signal of the photo detector circuit 40 (or the photo detector circuit 90) is "1", and a threshold for determining the logical value of the output signal of the photo detector circuit 50 is "0".

If the difference in the amounts of phase shift of the interferometers 20 and 30 is "$\pi/2$", the output level of the photo detector circuit 40, when the input signal is in any of the first through the fourth states, is "0.5", "1.5", "1.5" or "0.5", respectively, and the corresponding decision result is "0", "1", "1" or "0". In the similar way, the output level of the photo detector circuit 50, when the input signal is in any of the first through the fourth states, is "−0.5", "−0.5", "0.5" or "0.5", respectively, and the corresponding decision result is "0", "0", "1" or "1".

Figure 41:
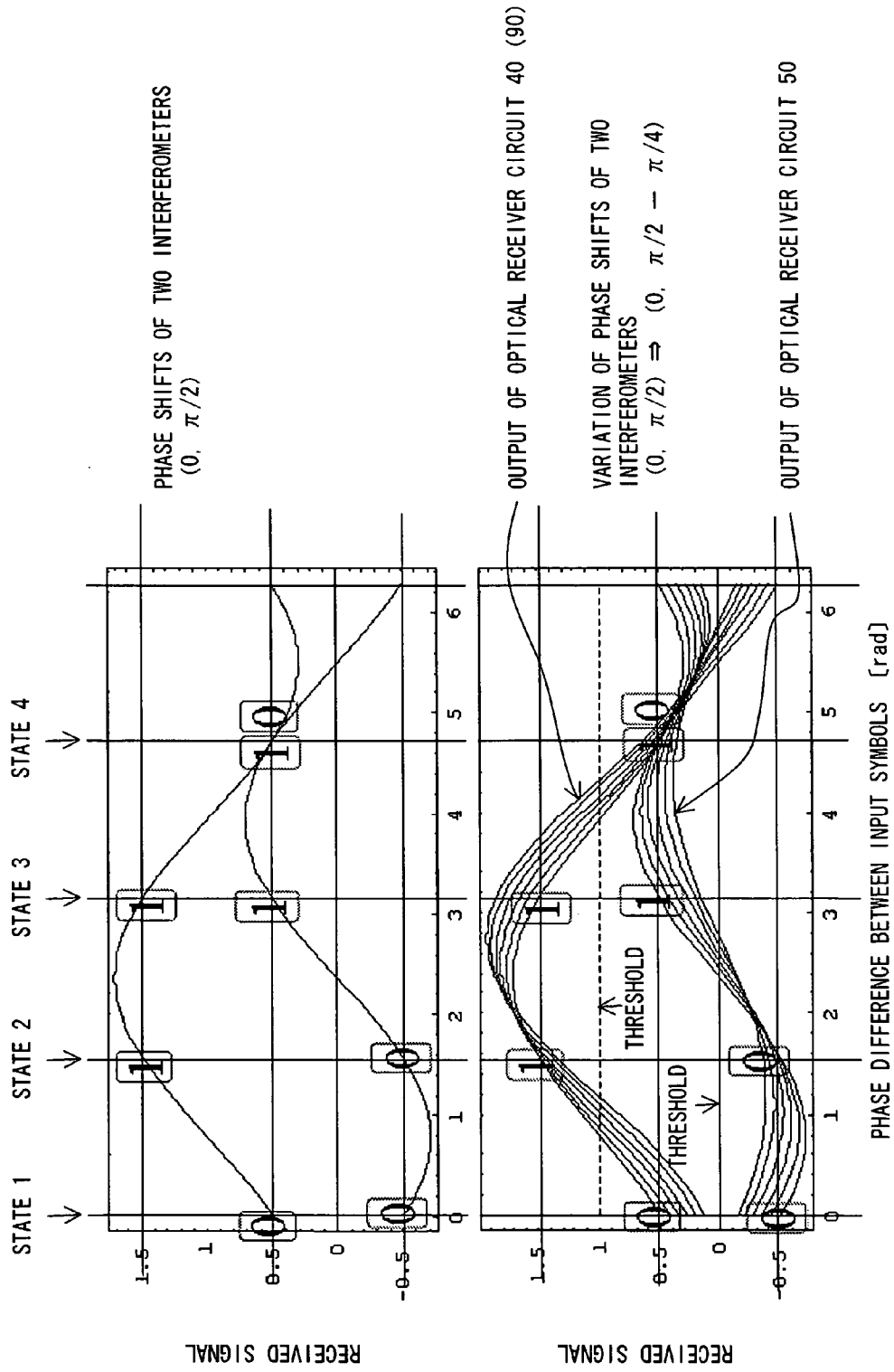

FIG. 41 shows the output level when the amount of phase shift of the interferometer 30 changes by $\pi/20$ from the appropriate value "$\pi/2$" to "$\pi/4$ ($=\pi/2-\pi/4$)". At that time, the difference of the amount of phase shift of a pair of the interferometers changes from "$\pi/2$" to "$\pi/4$". When the amount of phase shift of the interferometer 30 is "$\pi/4$", the output levels of the photo detector circuit 40 corresponding to the first through the fourth states are "0.15", "1.35", "1.85" and "0.65", respectively. Therefore, decision results corresponding to these four states are "0", "1", "1" and "0". Similarly, the output levels of the photo detector circuit 50 corresponding to the first through the fourth states are "−0.15", "−0.35", "0.15" and "0.35", respectively. Therefore, decision results corresponding to these four states are "0", "0", "1" and "1". Thus, even if the amount of phase shift of the phase shift element of the interferometer 30 changes from "$\pi/2$" to "$\pi/4$" (that is, the difference in the amount of phase shift of the interferometers 20 and 30 changes within a range from $\pi/4$ to $\pi/2$), transmission data can be recovered.

Figure 42:
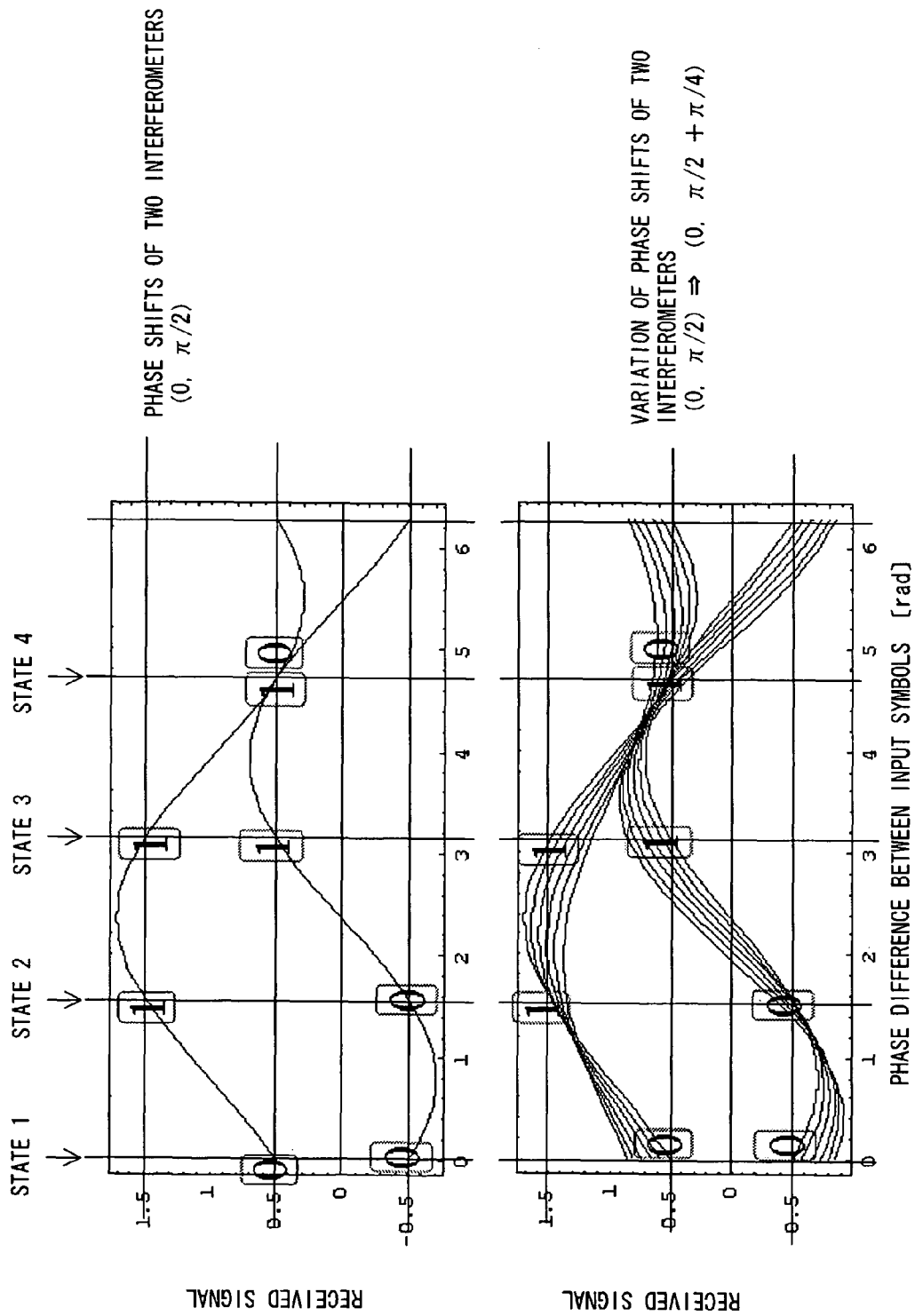

FIG. 42 shows the output level when the amount of phase shift of the interferometer 30 changes from the appropriate value "$\pi/2$" to "$3\pi/4$ ($=\pi/2+\pi/4$)". At that time, the difference of the amount of phase shift of a pair of the interferometers changes from "$\pi/2$" to "$3\pi/4$".

FIG. 43 shows the output level when the amount of phase shift of the interferometer 20 changes from the appropriate value "0" to "π/4 (=0+π/4)". At that time, the difference of the amount of phase shift of a pair of the interferometers changes from "π/2" to "π/4".

Figure 44:
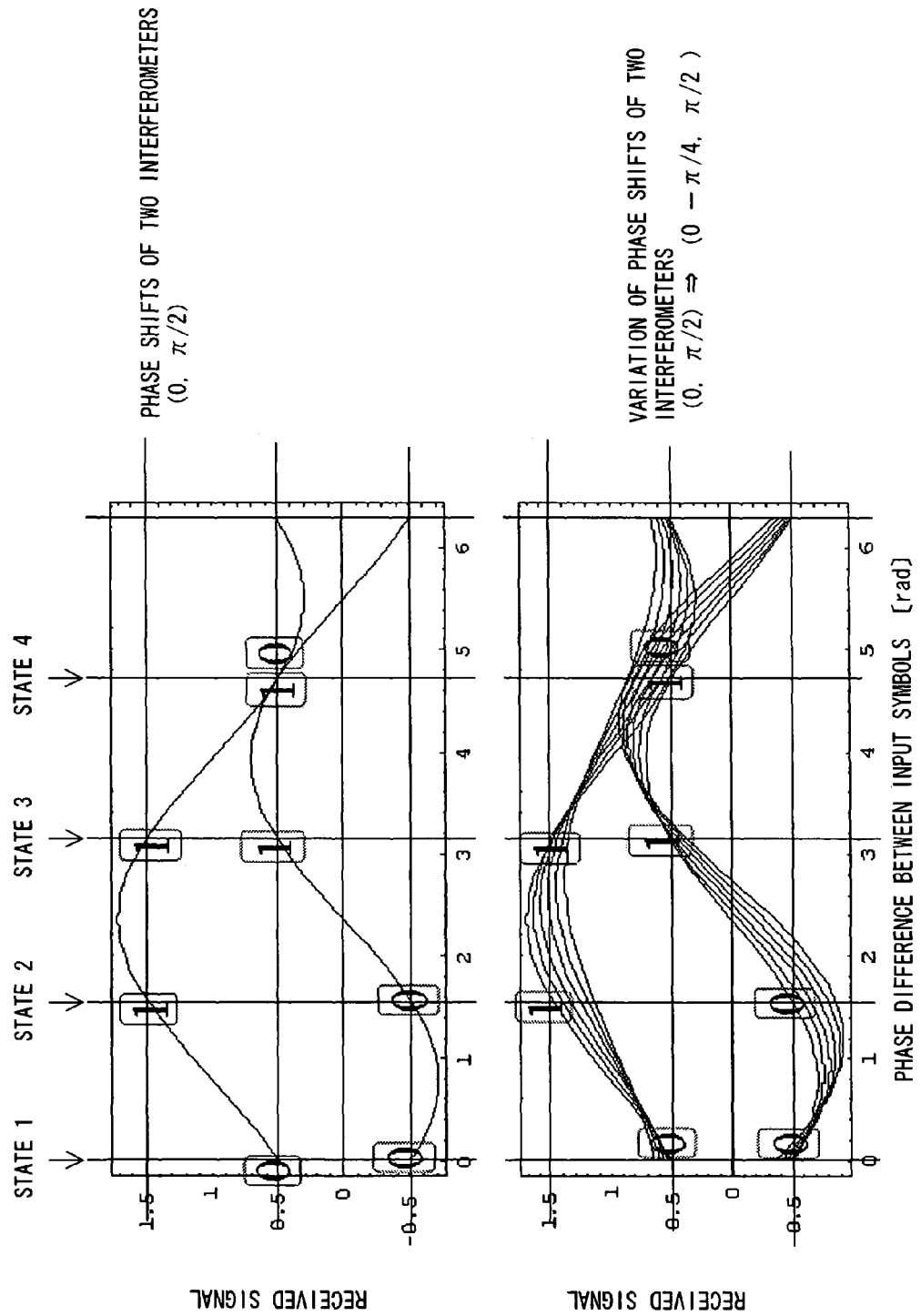

FIG. 44 shows the output level when the amount of phase shift of the interferometer 20 changes from the appropriate value "0" to "−π/4 (=0−π/4)". At that time, the difference of the amount of phase shift of a pair of the interferometers changes from "π/2" to "3π/4".

Figure 45:
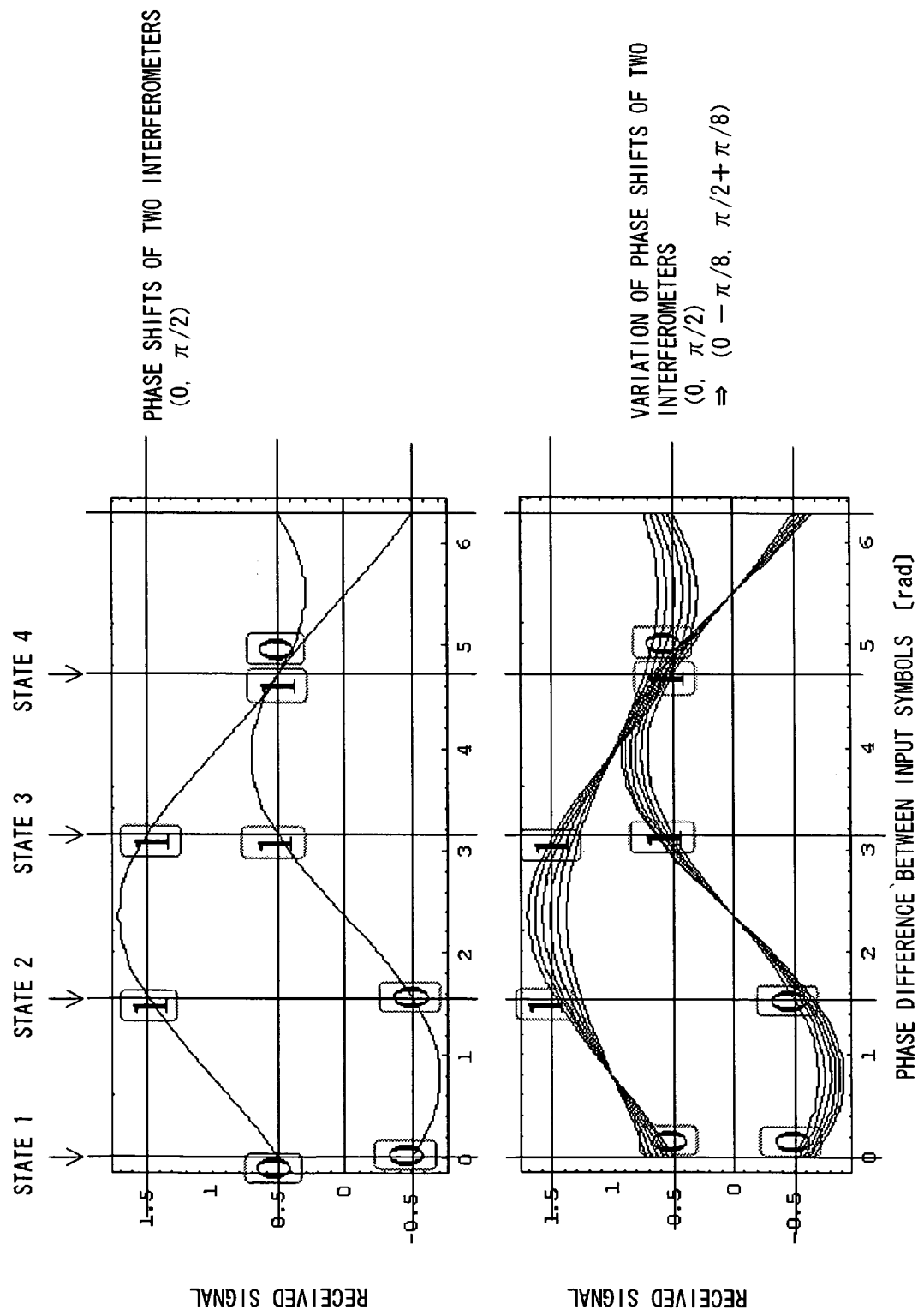

FIG. 45 shows the output level when the amount of phase shift of the interferometer 20 changes from the appropriate value "0" to "−π/8 (=0−π/8)" and the amount of phase shift of the interferometer 30 changes from the appropriate value "π/2" to "5π/8 (=π/2+π/8)". At that time, the difference of the amount of phase shift of a pair of the interferometers changes from "π/2" to "3π/4".

Figure 46:
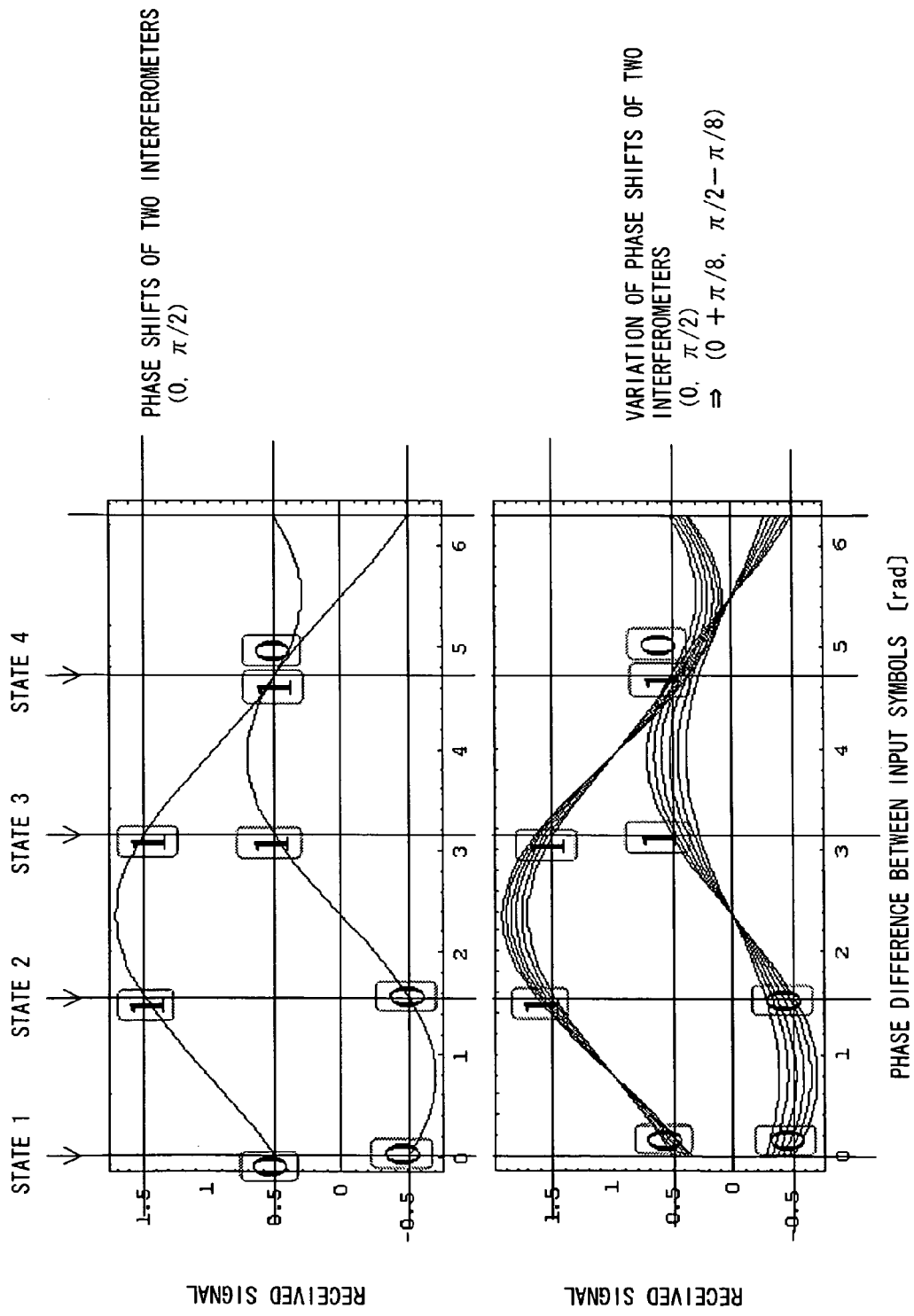

FIG. 46 shows the output level when the amount of phase shift of the interferometer 20 changes from the appropriate value "0" to "π/8 (=0+π/8)" and the amount of phase shift of the interferometer 30 changes from the appropriate value "π/2" to "3π/8 (=π/2−π/8)". At that time, the difference of the amount of phase shift of a pair of the interferometers changes from "π/2" to "3π/4". Transmission data is correctly recovered in each state shown in FIG. 42 to FIG. 46.

According to the results shown in FIG. 41 and FIG. 42, when the amount of phase shift of the interferometer 20 is maintained at "0", if the difference in the amounts of phase shift of a pair of interferometers falls within a range of π/4 to 3π/4, it is possible to recover transmission data. In the same manner, according to the results shown in FIG. 43 and FIG. 44, when the amount of phase shift of the interferometer 30 is maintained at "π/2", if the difference in the amounts of phase shift of a pair of interferometers falls within a range of π/4 to 3π/4, it is possible to recover transmission data. Additionally, according to the results shown in FIG. 45 and FIG. 46, when the amounts of phase shift of the interferometers 20 and 30 are not fixed, if the difference in the amounts of phases shift of a pair of interferometers falls within a range of π/4 to 3π/4, it is possible to recover transmission data. Therefore, summary of these results shows that if the difference in the amount of phase shift of a pair of interferometers falls within a range of π/4 to 3π/4, transmission data can be recovered.

What is claimed is:

1. An optical DQPSK receiver apparatus, comprising:
   an optical splitter for splitting an optical DQPSK signal and for guiding the signal to a first optical path and a second optical path;
   a first interferometer, connected to the first optical path, comprising a first delay element, and outputting a first optical signal and a second optical signal;
   a second interferometer, connected to the second optical path, comprising a second delay element, and outputting a third optical signal and a fourth optical signal;
   a first photo detector circuit for outputting a signal indicating a sum of current corresponding to the first optical signal and current corresponding to the third optical signal; and
   a second photo detector circuit for outputting a signal indicating a difference between current corresponding to the second optical signal and current corresponding to the fourth optical signal.

2. The optical DQPSK receiver apparatus according to claim 1, wherein
   said first photo detector circuit comprises a first photo detector and a second photo detector connected in parallel with each other,
   said second photo detector circuit comprises a third photo detector and a fourth photo detector connected in series with each other,
   the first optical signal is provided to the first photo detector,
   the second optical signal is provided to the third photo detector,
   the third optical signal is provided to the second photo detector, and
   the fourth optical signal is provided to the fourth photo detector.

3. The optical DQPSK receiver apparatus according to claim 1, wherein
   said first photo detector circuit comprises a first photo detector to which the first optical signal is provided, a first amplifier for amplifying current generated by the first photo detector, a second photo detector to which the third optical signal is provided, a second amplifier for amplifying current generated by the second photo detector, and an adder circuit for summing up outputs of the first and second amplifiers.

4. The optical DQPSK receiver apparatus according to claim 1, wherein
   said second photo detector circuit comprises a third photo detector to which the second optical signal is provided, a third amplifier for amplifying current generated by the third photo detector, a fourth photo detector to which the fourth optical signal is provided, a fourth amplifier for amplifying current generated by the fourth photo detector, and a subtracting circuit for generating a difference between outputs of the third and the fourth amplifiers.

5. The optical DQPSK receiver apparatus according to claim 1, wherein
   said first photo detector circuit comprises one photo detector,
   said second photo detector circuit comprises one pair of photo detectors connected in series with each other,
   the first optical signal and the third optical signal are provided to the photo detector of the first photo detector circuit,
   the second optical signal and the fourth optical signal are provided to each of the pair of the photo detectors of the second photo detector circuit.

6. The optical DQPSK receiver apparatus according to claim 1, wherein said first and the second interferometers are comprised of a two-dimensional optical waveguide circuit.

7. An optical DQPSK receiver apparatus, comprising:
   an optical splitter for splitting an optical DQPSK signal and for guiding the signal to a first optical path and a second optical path;
   a first interferometer, connected to the first optical path, comprising a first delay element and a first phase shift element with the amount of phase shift α, and outputting a first optical signal and a second optical signal;
   a second interferometer, connected to the second optical path, comprising a second delay element and a second phase shift element with the amount of phase shift β, and outputting a third optical signal and a fourth optical signal;
   a first photo detector circuit for outputting a signal indicating a sum of current corresponding to the first optical signal and current corresponding to the third optical signal; and
   a second photo detector circuit for outputting a signal indicating a difference between current corresponding to the second optical signal and current corresponding to the fourth optical signal, wherein a difference between α and β is π/4 or more and 3π/4 or less.

8. The optical DQPSK receiver apparatus according to claim 7, wherein α is zero or approximately zero.

9. The optical DQPSK receiver apparatus according to claim 7, wherein β is π/2 or approximately π/2.

10. The optical DQPSK receiver apparatus according to claim 7, wherein either one of α and β is zero or approximately zero, and the other one of α and β is π2 or approximately π/2.

11. The optical DQPSK receiver apparatus according to claim 7, further comprises an adjustment unit for adjusting the amount of phase shift of the first and second phase shift elements.

12. An optical DQPSK receiver apparatus, comprising:
an optical splitter for splitting an optical DQPSK signal and for guiding the signal to a first optical path and a second optical path;
a first interferometer, connected to the first optical path, comprising a first delay element and a first phase shift element with the amount of phase shift α, and outputting a first optical signal and a second optical signal;
a second interferometer, connected to the second optical path, comprising a second delay element and a second phase shift element with the amount of phase shift β, and outputting a third optical signal and a fourth optical signal;
a first photo detector circuit comprising a first photo detector and a second photo detector connected in parallel with each other; and
a second photo detector circuit comprising a third photo detector and a fourth photo detector connected in series with each other,
wherein a difference between α and β is π/4 or more and 3π/4 or less,
the first optical signal is provided to the first photo detector,
the second optical signal is provided to the third photo detector,
the third optical signal is provided to the second photo detector, and
the fourth optical signal is provided to the fourth photo detector.

13. An optical DQPSK receiver apparatus, comprising:
an optical splitter for splitting an optical DQPSK signal and for guiding the signal to a first optical path and a second optical
a first interferometer, connected to the first optical path, comprising a first delay element for delaying an optical signal propagating via one of a pair of arms by integral multiple of one symbol time excluding zero and a first phase shift element for generating a relative phase shift α between a pair of optical signals propagating via a pair of the arms, for outputting a first and second optical signals;
a second interferometer, connected to the second optical path, comprising a second delay element for delaying an optical signal propagating via one of a pair of arms by integral multiple of one symbol time excluding zero and a second phase shift element for generating a relative phase shift β between a pair of optical signals propagating via a pair of the arms, for outputting a third and fourth optical signals;
a first photo detector circuit for outputting a signal indicating a sum of current corresponding to the first optical signal and current corresponding to the third optical signal; and
a second photo detector circuit for outputting a signal indicating a difference between current corresponding to the second optical signal and current corresponding to the fourth optical signal,
wherein a difference between α and β is π/4 or more and 3π/4 or less.

14. An optical DQPSK receiver apparatus, comprising:
an optical circuit for outputting first through fourth optical signals, the first and second optical signals being obtained as a result of interference between an optical DQPSK signal and its delayed optical signal, in which the optical DQPSK signal is delayed by integral multiple except for zero of one symbol time, with a phase difference α, the third and fourth optical signals being obtained as a result of interference between the optical DQPSK signal and its delayed optical signal, in which the optical DQPSK signal is delayed by integral multiple except for zero of one symbol time, with a phase difference β;
a first photo detector circuit for outputting a signal indicating a sum of current corresponding to the first optical signal and current corresponding to the third optical signal; and
a second photo detector circuit for outputting a signal indicating a difference between current corresponding to the second optical signal and current corresponding to the fourth optical signal,
wherein a difference between α and β is π/4 or more and 3π/4 or less.

* * * * *

UNITED STATES PATENT AND TRADEMARK OFFICE
CERTIFICATE OF CORRECTION

PATENT NO. : 7,751,721 B2
APPLICATION NO. : 11/392754
DATED : July 6, 2010
INVENTOR(S) : Takeshi Hoshida et al.

It is certified that error appears in the above-identified patent and that said Letters Patent is hereby corrected as shown below:

Column 23, Line 9, in Claim 10, delete "pi2" and insert --pi/2--, therefor.

Column 23, Line 46, in Claim 13, after "second optical" insert --path;--.

Signed and Sealed this
Fourth Day of January, 2011

David J. Kappos
*Director of the United States Patent and Trademark Office*